(12) United States Patent
Yang et al.

(10) Patent No.: US 12,614,735 B2
(45) Date of Patent: Apr. 28, 2026

(54) COMPOSITION OF AND METHOD FOR OPTIMIZING A CATALYTIC REACTION

(71) Applicant: University of Central Florida Research Foundation, Inc., Orlando, FL (US)

(72) Inventors: Yang Yang, Orlando, FL (US); Jinfa Chang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 780 days.

(21) Appl. No.: 17/830,816

(22) Filed: Jun. 2, 2022

(65) Prior Publication Data

US 2023/0061520 A1      Mar. 2, 2023

Related U.S. Application Data

(60) Provisional application No. 63/260,768, filed on Aug. 31, 2021.

(51) Int. Cl.
| | |
|---|---|
| *H01M 4/92* | (2006.01) |
| *H01M 4/86* | (2006.01) |
| *H01M 4/88* | (2006.01) |

(52) U.S. Cl.
CPC ......... H01M 4/926 (2013.01); H01M 4/8668 (2013.01); H01M 4/8817 (2013.01); H01M 4/8842 (2013.01); H01M 4/8882 (2013.01)

(58) Field of Classification Search
CPC .. H01M 4/926; H01M 4/8668; H01M 4/8817; H01M 4/8842; H01M 4/8882; B01J 21/02; B01J 27/12; B01J 27/02; B01J 27/14; B01J 27/24
See application file for complete search history.

(56) References Cited

U.S. PATENT DOCUMENTS

| | | | | |
|---|---|---|---|---|
| 4,908,198 A | * | 3/1990 | Weinberg | C01B 32/10 |
| | | | | 502/181 |
| 2011/0244012 A1 | * | 10/2011 | Iida | B01J 21/063 |
| | | | | 424/618 |
| 2013/0071761 A1 | * | 3/2013 | Amine | H01M 4/925 |
| | | | | 429/405 |
| 2016/0329571 A1 | * | 11/2016 | Matsumoto | B01J 31/28 |

OTHER PUBLICATIONS

Xinyuan Li et al. "Modulating the local coordination environment of single-atom catalysts for enhanced catalytic performance" Review Article, Mar. 11, 2020. 13(7): 1842-1855, Nano Research. Beijing, China.
Jinqiang Zhang et al. "Tuning the Coordination Environment in Single-Atom Catalysts to Achieve Highly Efficient Oxygen Reduc-
tion Reactions" Journal of the American Chemical Society, Dec. 5, 2019. vol. 141, pp. 20118-20126, ACS Publications.
Claudio Bianchini et al. "Palladium-Based Electrocatalysts for Alcohol Oxidation in Half Cells and in Direct Alcohol Fuel Cells" Mar. 12, 2009, vol. 109, No. 9, pp. 4183-4206. Chemical Reviews.
Nagappan Ramaswamy et al. "Alkaline Anion-Exchange Membrane Fuel Cells: Challenges in Electrocatalysis and Interfacial Charge Transfer" Nov. 8, 2019. vol. 119, pp. 11945-11979, Chemical Reviews. Boston, United States.
Zhao Li et al. "Boosting alkaline hydrogen evolution: the dominating role of interior modification in surface electrocatalysis" Journal of Royal Society of Chemistry. Jul. 31, 2020, vol. 13, pp. 3110-3118. Energy & Environmental Science. Orlando, USA.
Zhao Li et al. "Stabilizing atomic Pt with trapped interstitial F in alloyed PtCo nanosheets for high-performance zinc-air batteries" Journal of Royal Society of Chemistry. Nov. 22, 2019. pp. 1-12. Energy & Environmental Science. Orlando, USA.
Wenhan Niu et al. "Surface-Modified Porous Carbon Nitride Composites as Highly Efficient Electrocatalyst for Zn-Air Batteries" 2018, vol. 8, 1701642. Advanced Energy Materials. Orlando, USA.
Gang Wu et al. "High-Performance Electrocatalysts for Oxygen Reduction Derived from Polyaniline, Iron, and Cobalt" Apr. 2, 2011. vol. 332, pp. 443-447. American Association for the Advancement of Science, Washington, DC. USA.
Tao Sun et al. "Design of Local Atomic Environments in Single-Atom Electrocatalysts for Renewable Energy Conversions" 2020, 2003075. Advanced Science News, Singapore.
Kai Yuan et al. "Boosting Oxygen Reduction of Single Iron Active Sites via Geometric and Electronic Engineering: Nitrogen and Phosphorus Dual Coordination" Journal of the American Chemical Society, 2020, vol. 142, pp. 2404-2412, JACS. USA.
Jintao Zhang et al. "Nitrogen, Phosphorus, and Fluorine Tri-doped Graphene as a Multifunctional Catalyst for Self-Powered Electrochemical Water Splitting" 2016, vol. 55, pp. 13296-13300. Angewandte Communications Chemie International Edition. Cleveland, OH (USA).

(Continued)

*Primary Examiner* — Stuart L Hendrickson
(74) *Attorney, Agent, or Firm* — Anton J. Hopen; Trenam Law

(57) ABSTRACT

Described, herein, relates to a fluorinated electrocatalyst and a method of optimizing a catalytic reaction within an electrochemical cell, in which fluorine atoms may be introduced to the local coordination environment sites to weaken the carbon-nonmetal bonds and drive the nonmetallic chemical elements towards metallic chemical elements. The method may include introducing fluorine atoms to the metal-nonmetal-carbon catalysts to occupy the LCE site within the catalysts in order prevent the nonmetallic chemical elements from occupying the LCE sites, thereby driving the nonmetallic chemical element to form a nonmetallic chemical element layer on a surface of the metallic chemical elements. The nonmetallic chemical element layer may also inhibit the agglomeration and migration of the metallic chemical elements about the LCE site, optimizing catalyst activity through the regulation of the LCE site. The resulting fluorine-doped high-performance catalysts may be usable within electrochemical cells, with long-term stability and reduced degradation.

12 Claims, 51 Drawing Sheets

(56) References Cited

OTHER PUBLICATIONS

Yuxuan Wang et al. "Advanced Electrocatalysts with Single-Metal-Atom Active Sites". 2020, vol. 120, pp. 12217-12314. ACS Publications, USA.

A. Kowal et al. "Ternary Pt/Rh/SnO2 electrocatalysts for oxidizing ethanol to CO2" Nature Materials Journal. Apr. 2009, vol. 8, pp. 325-330. Letters, USA.

Zhixiu Liang et al. "Direct 12-Electron Oxidation of Ethanol on a Ternary Au(core)- PtIr(Shell) Electrocatalyst" Journal of the American Chemical Society. 2019, vol. 141, pp. 9629-9636. ACS Publications, USA.

In Kim et al. "Catalytic Reactions in Direct Ethanol Fuel Cells**" 2011, vol. 50, pp. 2270-2274. Angewandte Chemie International Edition, Korea.

Richard Kavanagh et al. "Origin of Low CO2 Selectivity on Platinum in the Direct Ethanol Fuel Cell**" 2012, vol. 51, pp. 1572-1575. Angewandte Chemie International Edition, UK.

Xiao Xia Wang et al. "Achievements, challenges and perspectives on cathode catalysts in proton exchange membrane fuel cells for transportation" Journal, Jul. 2019, vol. 2, pp. 578-589. Nature Catalysis, New York, Buffalo, NY, United States.

Yuyan Shao et al. "PGM-Free Cathode Catalysts for PEM Fuel Cells: A Mini-Review on Stability Challenges" 2019, vol. 31, 1807615. Advanced Materials News, Weinheim, Germany.

Tingting Zheng et al. "Large-Scale and Highly Selective CO2 Electrocatalytic Reduction on Nickel Single-Atom Catalyst" Jan. 2019, Joule 3, pp. 265-278. CallPress. Cambridge, MA. USA.

Yinhua Zhou et al. "A Universal Method to Produce Low-Work Function Electrodes for Organic Electronics" Apr. 20, 2012, vol. 336, pp. 327-332. Reports. Washington, DC.

C. G. Vayenas et al. "Dependence of catalytic rates on catalyst work function" Feb. 15, 1990, vol. 343, pp. 625-627. Nature Publishing Group. Patras, Greece.

Na Tian et al. "Synthesis of Tetrahexahedral Platinum Nanocrystals with High-Index Facets and High Electro-Oxidation Activity" May 4, 2007, vol. 316, pp. 732-735. Science. Washington, DC. USA.

Lina Chong et al. "Ultralow-loading platinum-cobalt fuel cell catalysts derived from imidazolate frameworks" Dec. 14, 2018, vol. 362, pp. 1276-1281. Science, Lemont, IL. USA.

Mingchuan Luo et al. "PdMo bimetallene for oxygen reduction catalysis" Oct. 3, 2019, vol. 574, pp. 81-97. Nature, Beijing, China.

Byungkwon Lim et al. "Pd—Pt Bimetallic Nanodendrites with High Activity for Oxygen Reduction" Jun. 5, 2009, vol. 324, pp. 1302-1305. Science, USA.

Maoyu Wang et al. "In Situ X-ray Absorption Spectroscopy Studies of Nanoscale Electrocatalysts" Jun. 3, 2019, 11:47, 18 pages. Nano-Micro Letters.

Yunfei Wang et al. "Oxygen Reduction Electrocatalysis on Ordered Intermetallic Pd—Bi Electrodes Is Enhanced by a Low Coverage of Spectator Species" Feb. 3, 2020, vol. 124, pp. 5220-5224. The Journal of Physical Chemistry C. USA.

Hanbin Liao et al. "A Multisite Strategy for Enhancing the Hydrogen Evolution Reaction on a Nano-Pd Surface in Alkaline Media" Aug. 7, 2017, vol. 7, 1701129. Advanced Energy Materials, Singapore.

H. Funke et al. "Wavelet analysis of extended x-ray absorption fine structure data" Mar. 30, 2005. vol. 71, pp. 094110-1-094110-6. The American Physical Society. France.

Yan Liu et al. "A Highly Efficient Metal-Free Electrocatalyst of F-Doped Porous Carbon toward N2Electroreduction" Apr. 29, 2020, vol. 32, 1907690. Advanced Science News. China.

Mufan Li et al. "Single-atom tailoring of platinum nanocatalysts for high-performance multifunctional electrocatalysis" May 20, 2019, vol. 2, pp. 495-503. Nature Catalysis, CA, USA.

Xiao Zhao et al. "Enhanced activity of Pt nano-crystals supported on a novel TiO2@N-doped C nano-composite for methanol oxidation reaction" Aug. 2012, vol. 22, pp. 19718-19725. The Royal Society of Chemistry 2012. Michigan, USA.

Xiaomei Chen et al. "Synthesis of "Clean" and Well-Dispersive Pd Nanoparticles with Excellent Electrocatalytic Property on Graphene Oxide" Journal Of The American Chemical Society. Feb. 24, 2011, vol. 133, pp. 3693-3695. ACS Publications. USA.

Harald Funke et al. "A new FEFF-based wavelet for EXAFS data analysis" Journal of Synchrotron Radiation, Jun. 29, 2007, vol. 14, pp. 426-432. Research papers, Singapore.

Xinlong Tian et al. "Engineering bunched Pt—Ni alloy nanocages for efficient oxygen reduction in practical fuel cells" Nov. 15, 2019, vol. 366, pp. 850-856. Research. China.

Jinfa Chang et al. "Ni2P enhances the activity and durability of the Pt anode catalyst in direct methanol fuel cells" Journal of the The Royal Society of Chemistry, Feb. 11, 2014, vol. 7, pp. 1628-1632, vol. 7. Energy & Environmental Science.

Alexander von Weber et al. "Size-dependent electronic structure controls activity for ethanol electro-oxidation at Ptn/indium tin oxide (n = 1 to 14)" Owner Societies 2015, vol. 17, pp. 17601-17610. Royal Society of Chemistry. Utah.

Zhi Li et al. "Iridium single-atom catalyst on nitrogen-doped carbon for formic acid oxidation synthesized using a general host—guest strategy" Jun. 15, 2020, 11 pages, Nature Chemistry.

Hoon T Chung et al. "Direct atomic-level insight into the active sites of a high-performance PGM-free ORR catalyst" Aug. 4, 2017, vol. 357, pp. 479-484, American Association for the Advancement of Science, USA.

Department of Energy "DOE Technical Targets for PolymerElectrolyte Membrane Fuel CellComponents" https://www.energy.gov/eere/fuelcells/doe-technical-targets-polymer-electrolyte-membrane-fuel-cell-components (2020). Accessed Aug. 24, 2022.

Huajun Tian et al. "Stable, high-performance, dendrite-free, seawater-based aqueous batteries" Jan. 11, 2021, 12:237, Nature Communications. USA.

J. Greeley et al. "Alloys of platinum and early transition metals as oxygen reduction electrocatalysts" Nature Chemistry Journal, Oct. 2009, vol. 1, pp. 552-556. Macmillan Publishers Limited. USA.

* cited by examiner

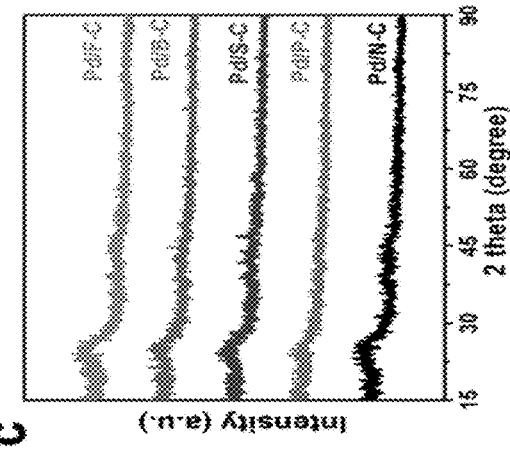
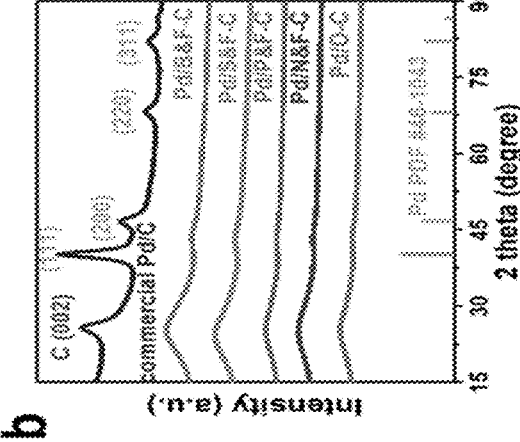
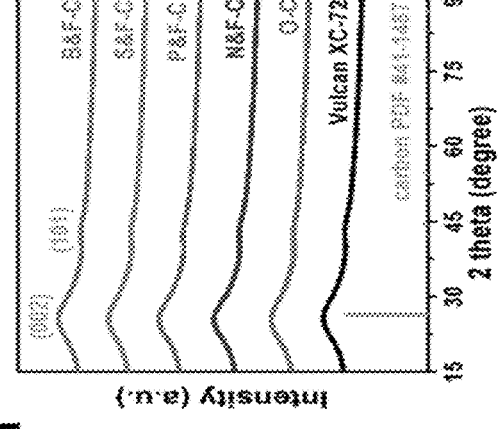
*FIGS. 4A — 4C*

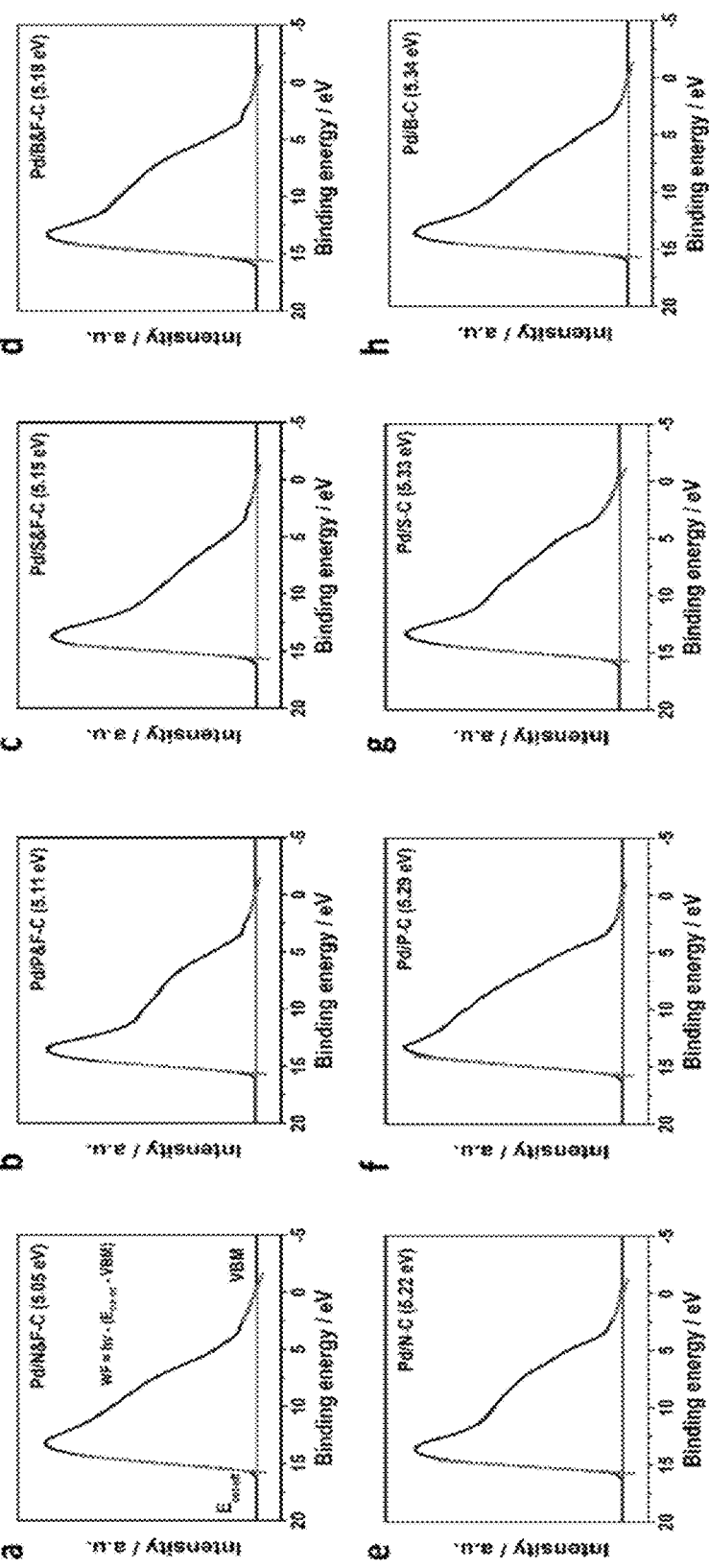
*FIGS. 5A — 5H*

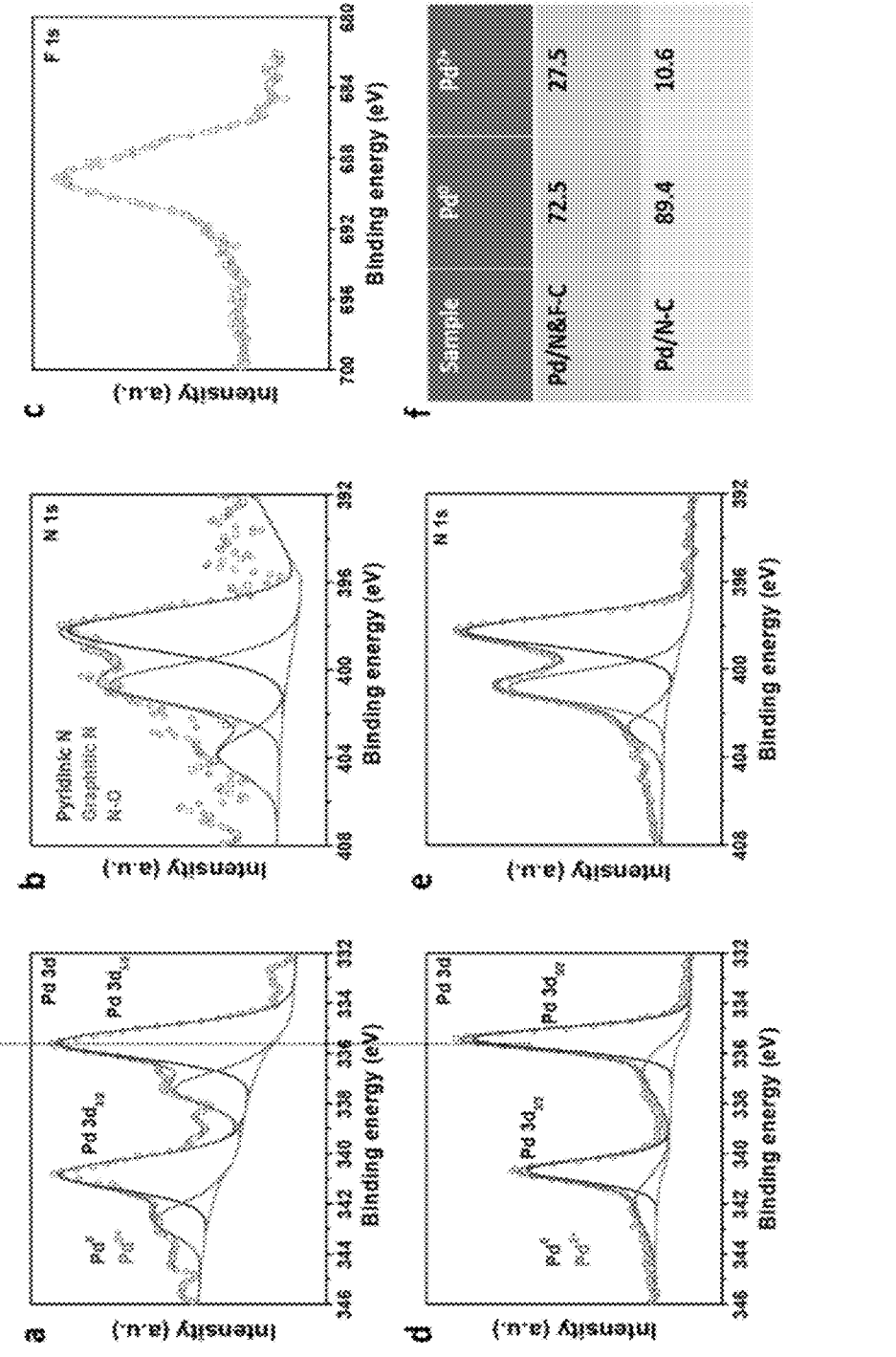
*FIGS. 6A — 6F*

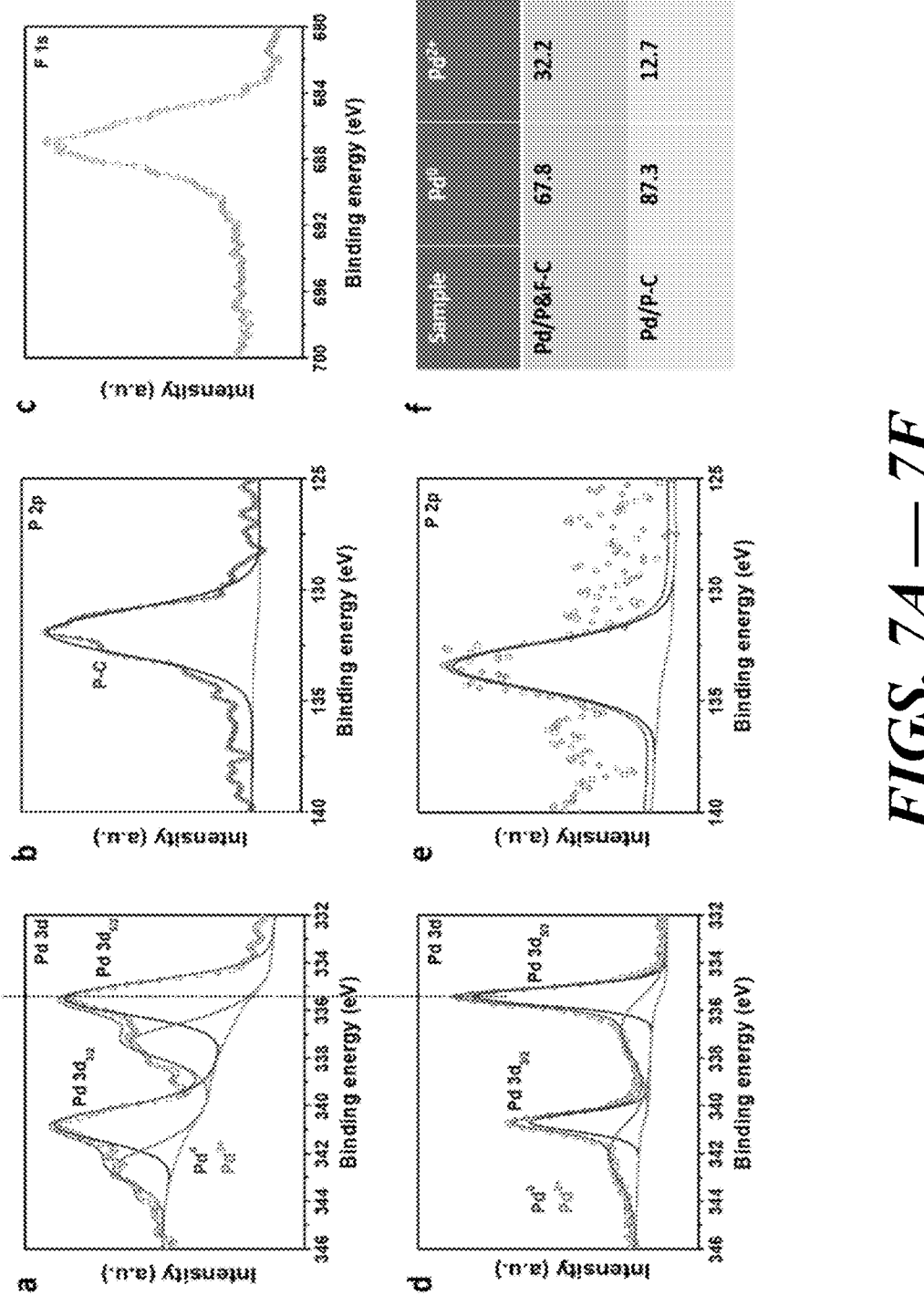
FIGS. 7A — 7F

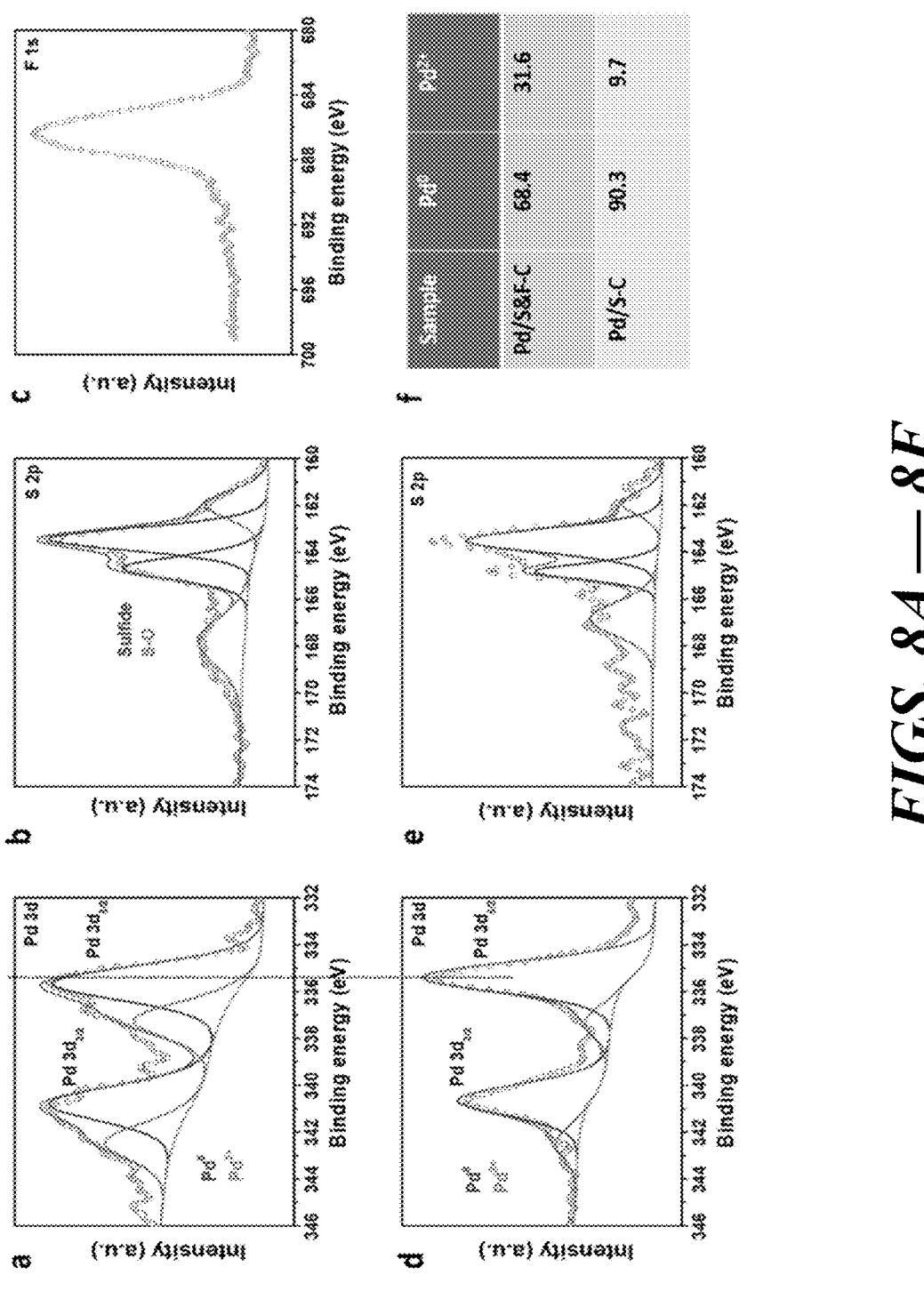
*FIGS. 8A — 8F*

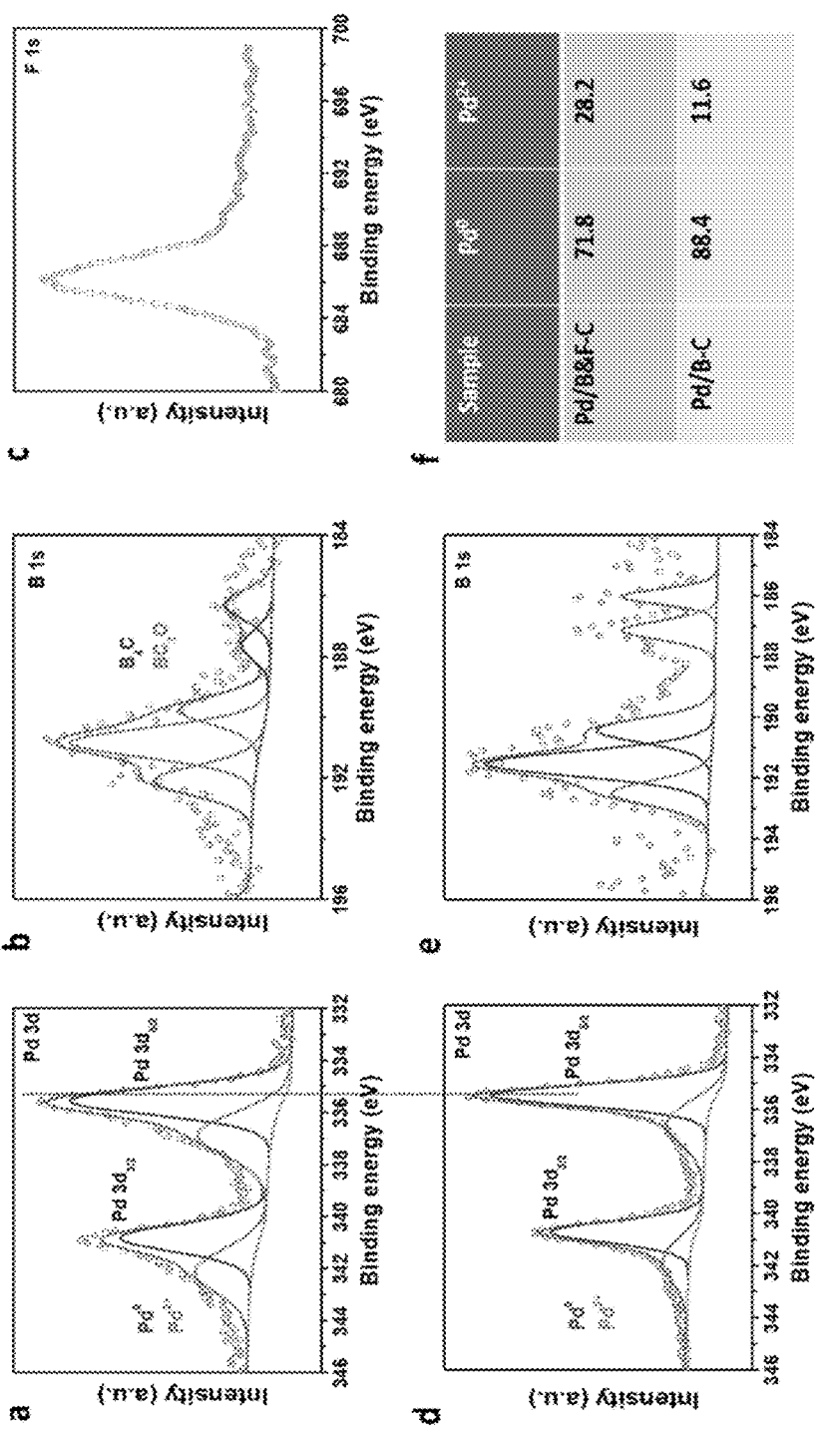
*FIGS. 9A — 9F*

*FIGS. 10A — 10L*

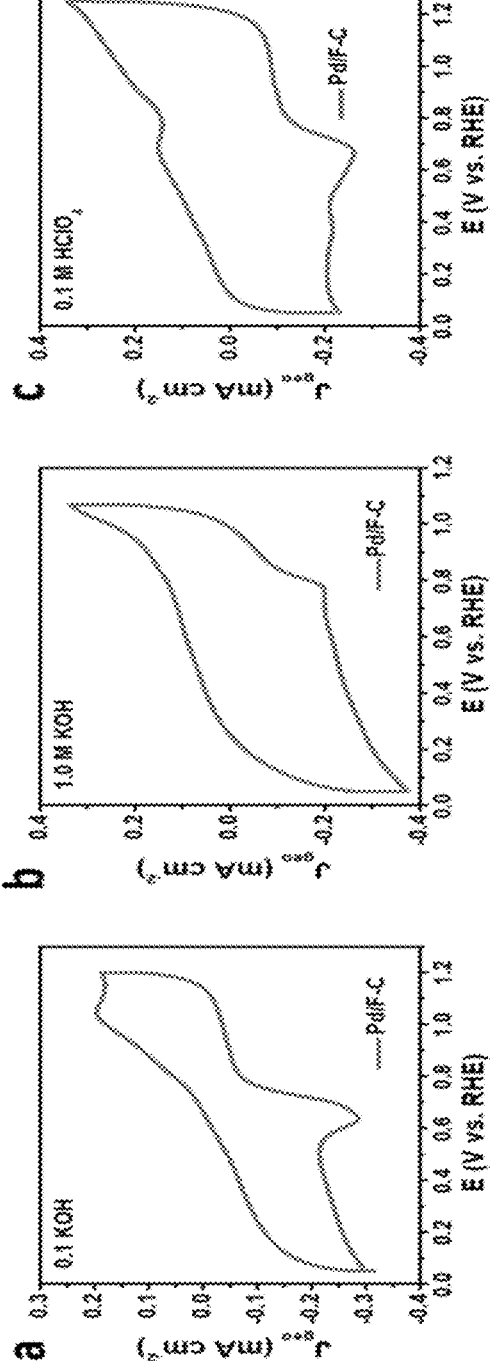
*FIGS. 11A — 11C*

FIGS. 12A — 12K

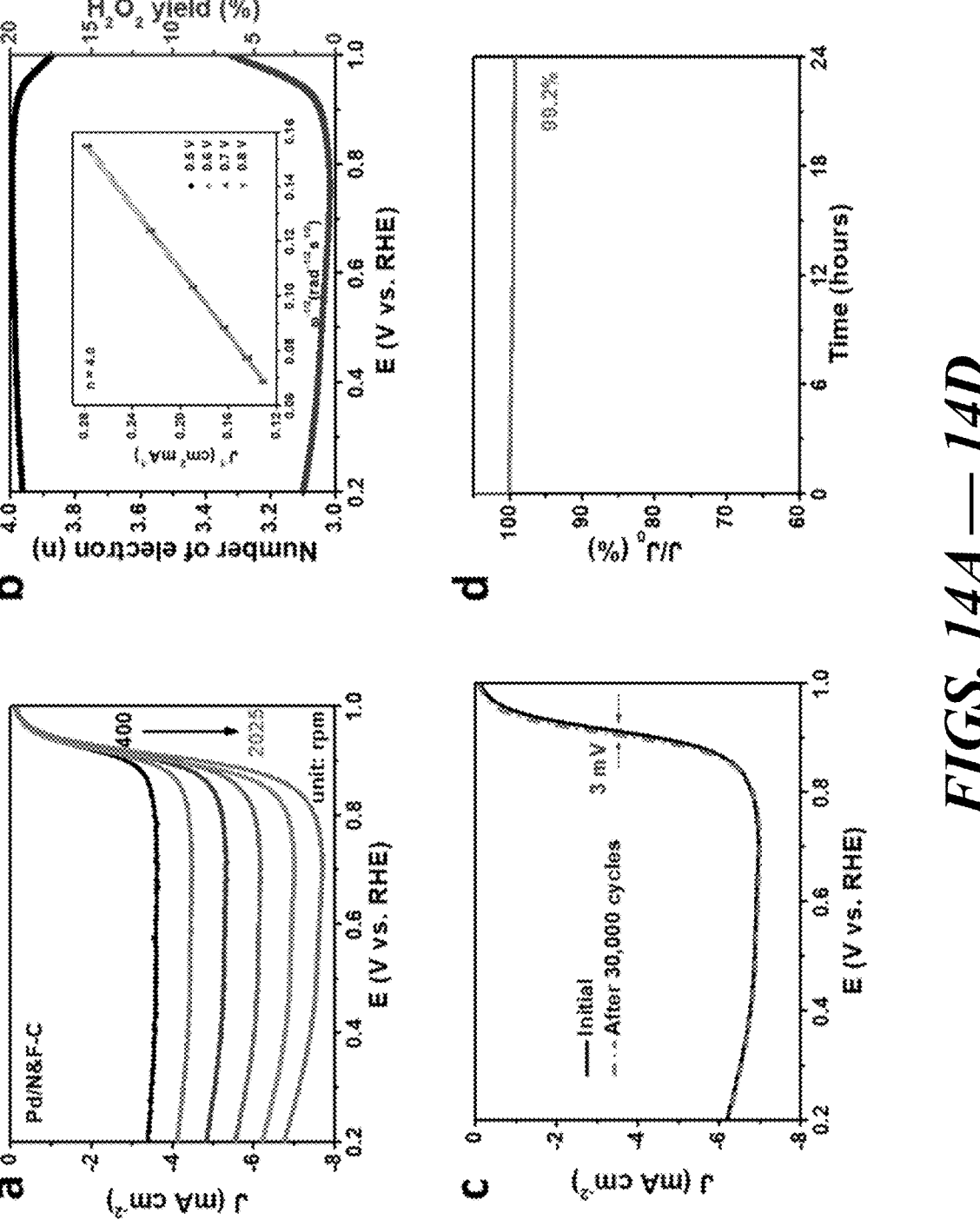
*FIGS. 14A — 14D*

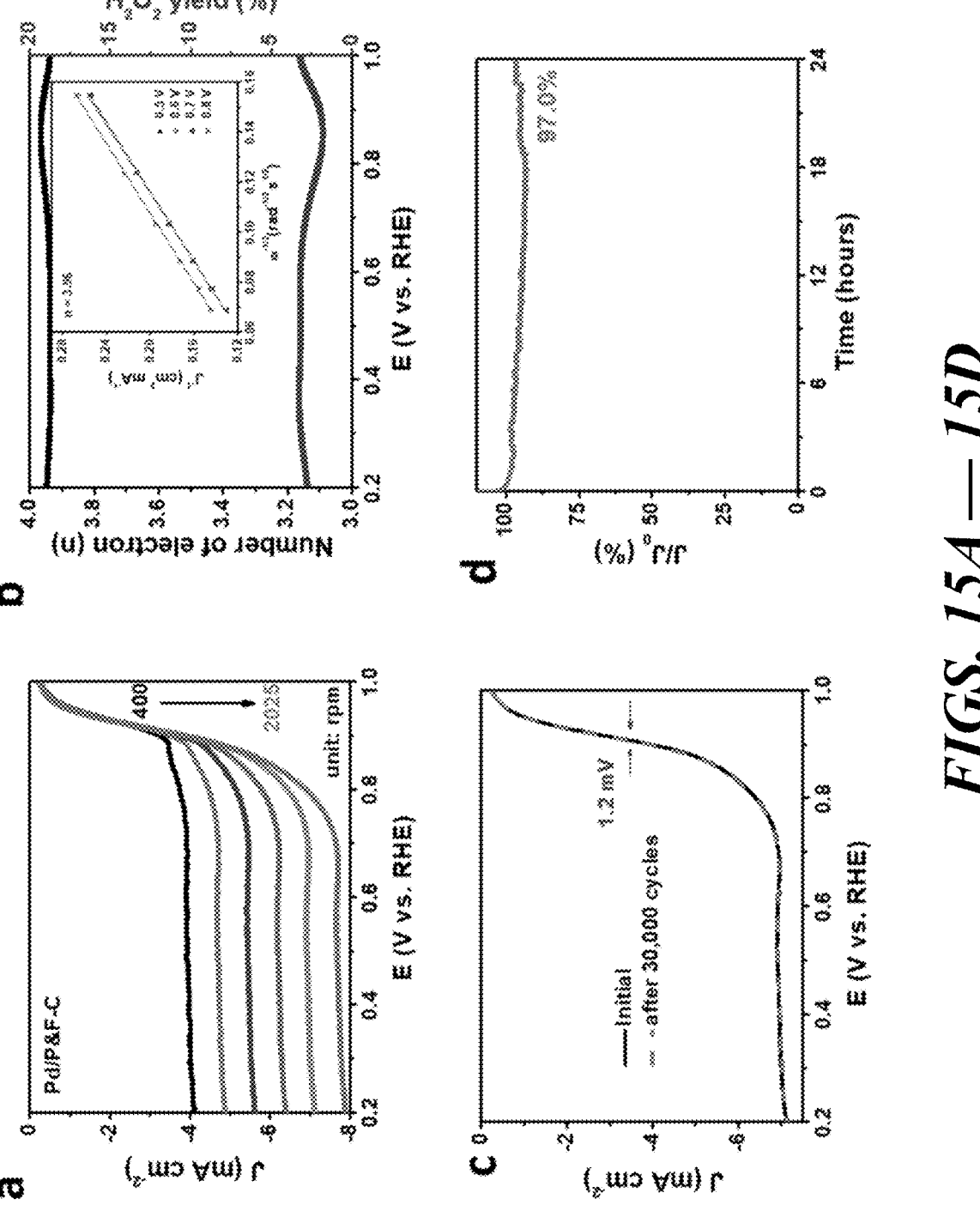
*FIGS. 15A — 15D*

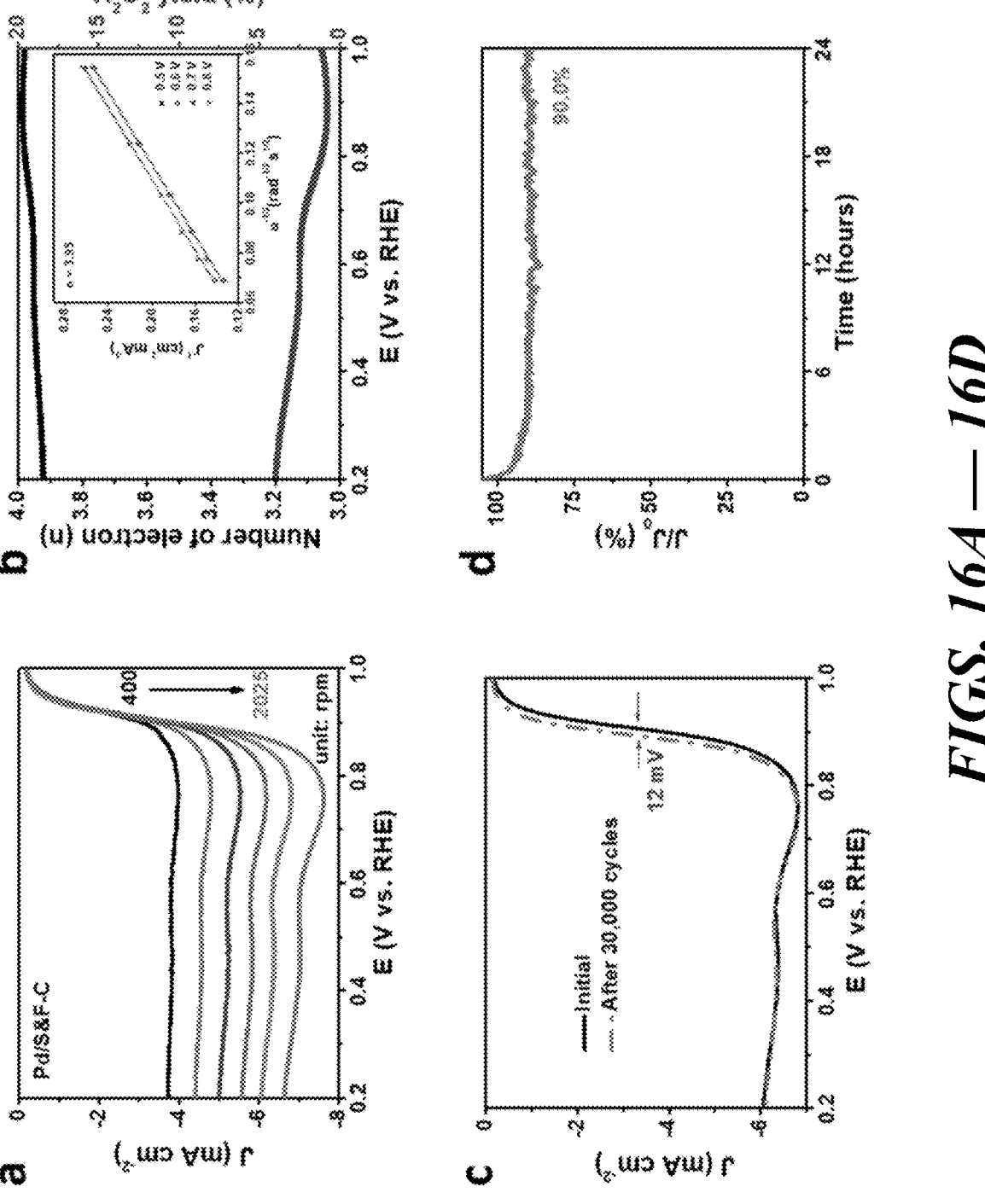
*FIGS. 16A — 16D*

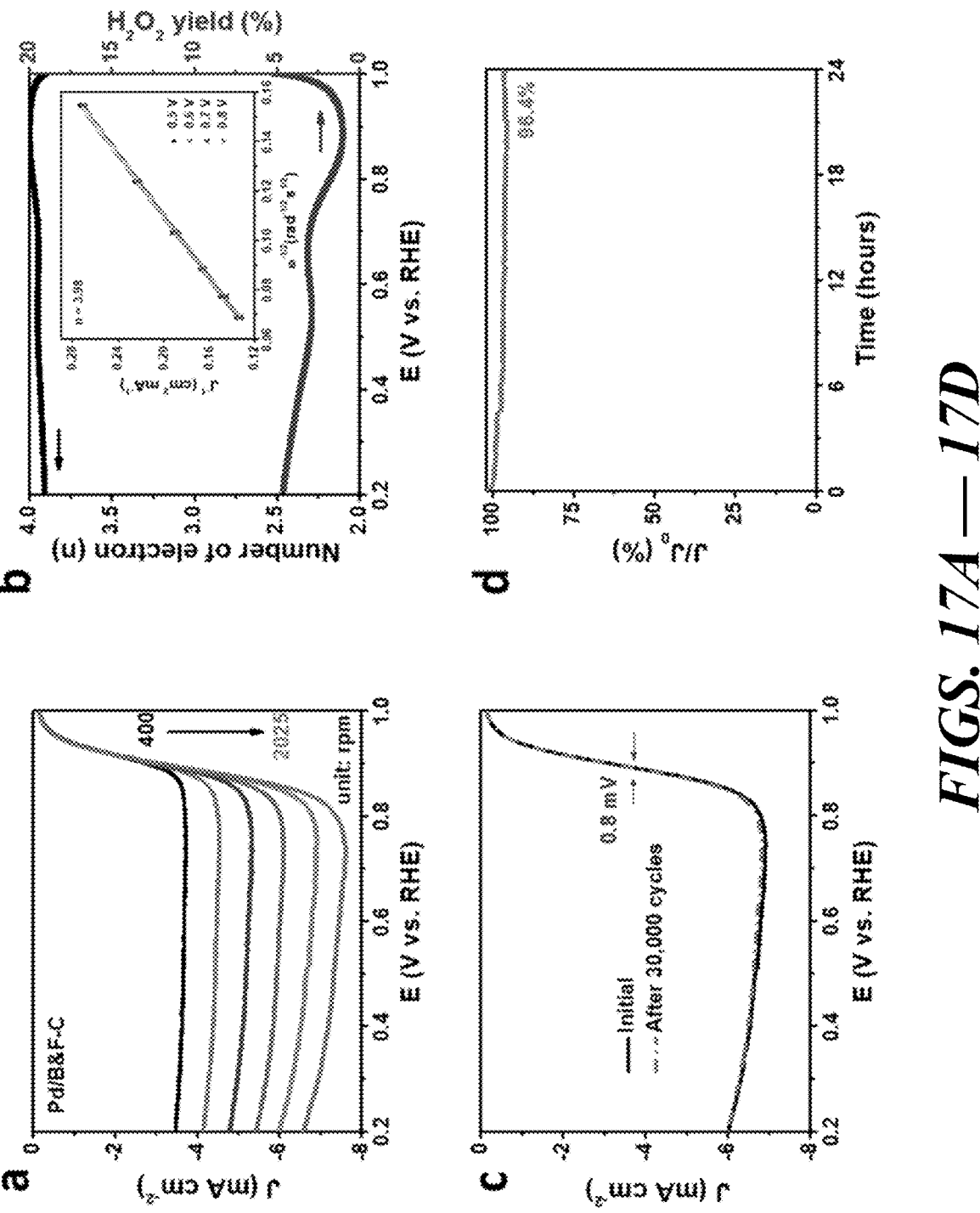
*FIGS. 17A — 17D*

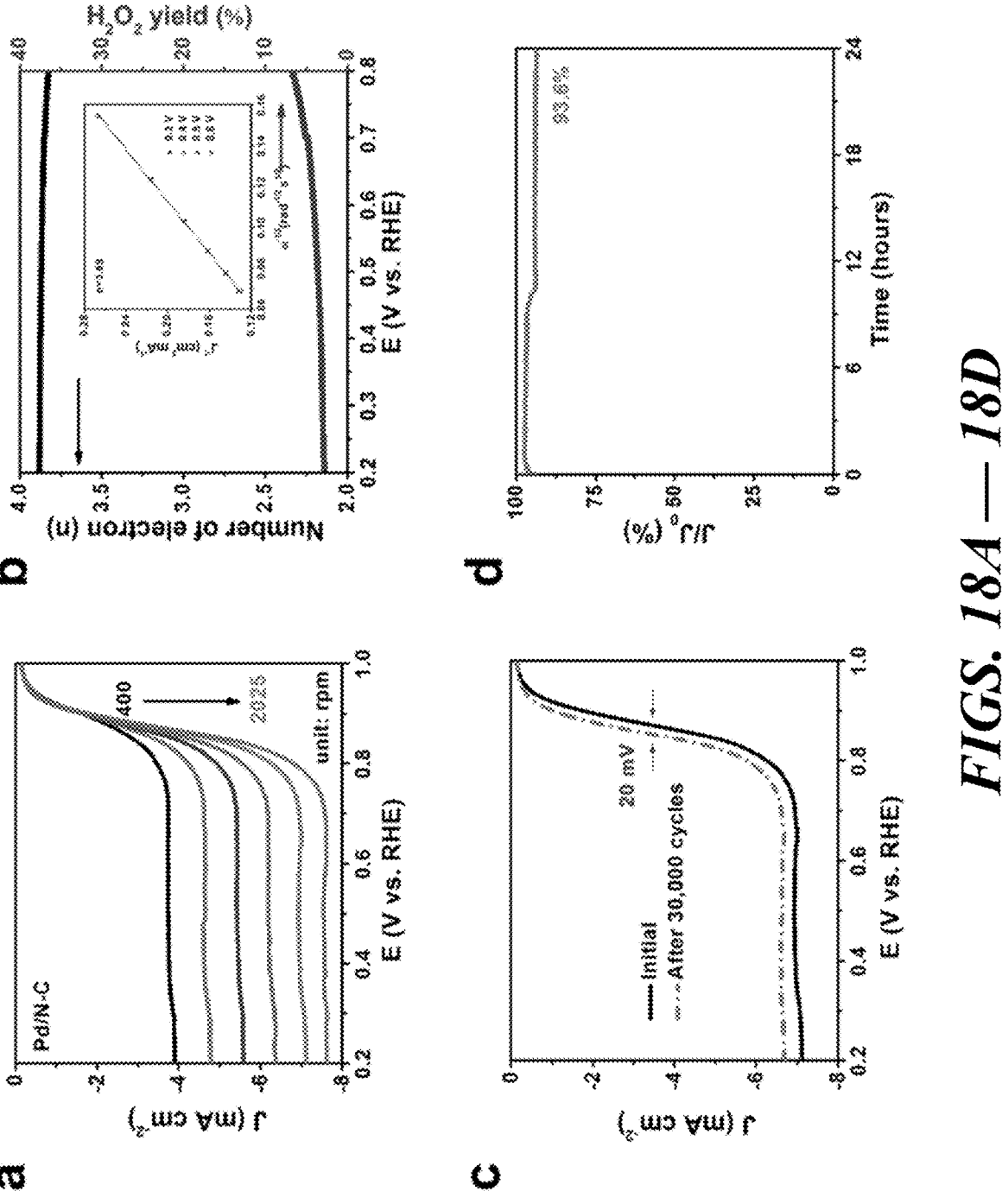
*FIGS. 18A — 18D*

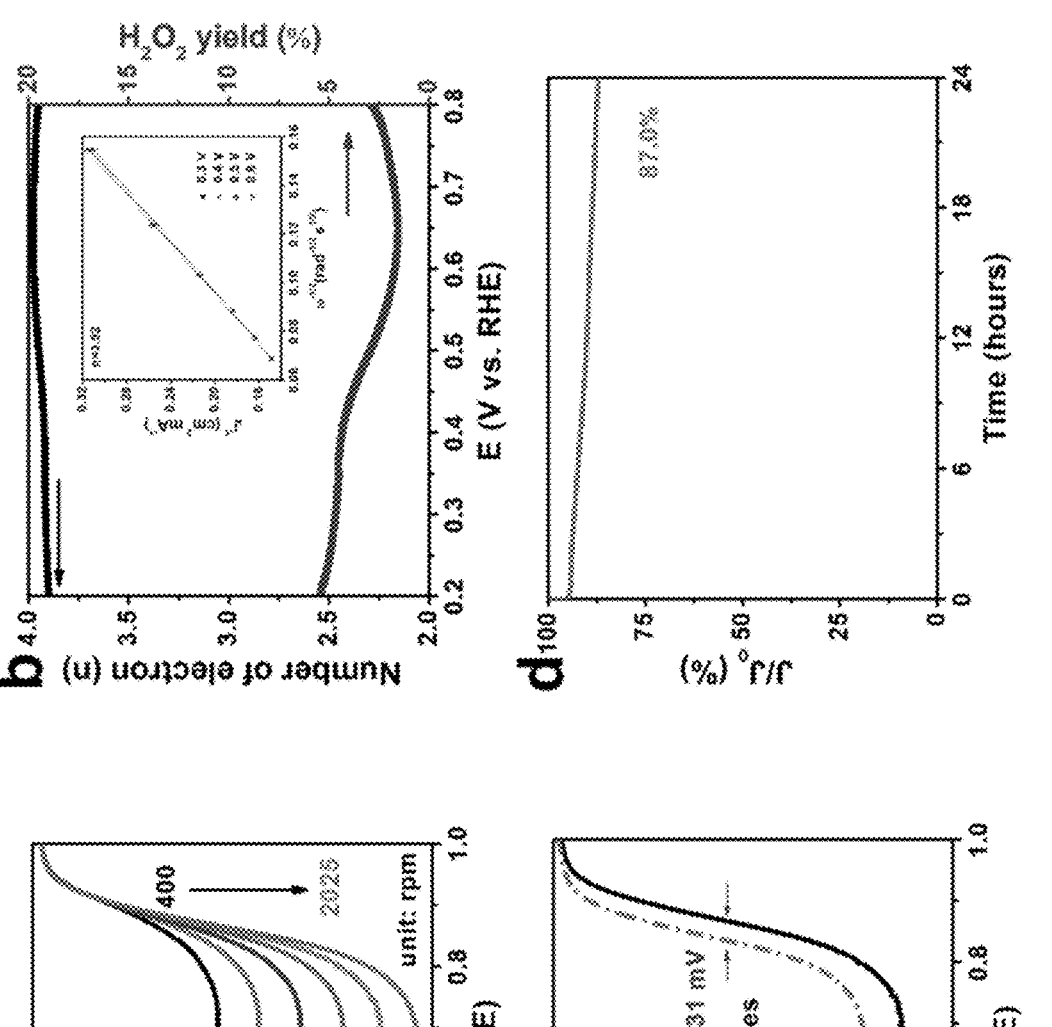
*FIGS. 19A — 19D*

*FIGS. 20A — 20D*

*FIGS. 21A — 21D*

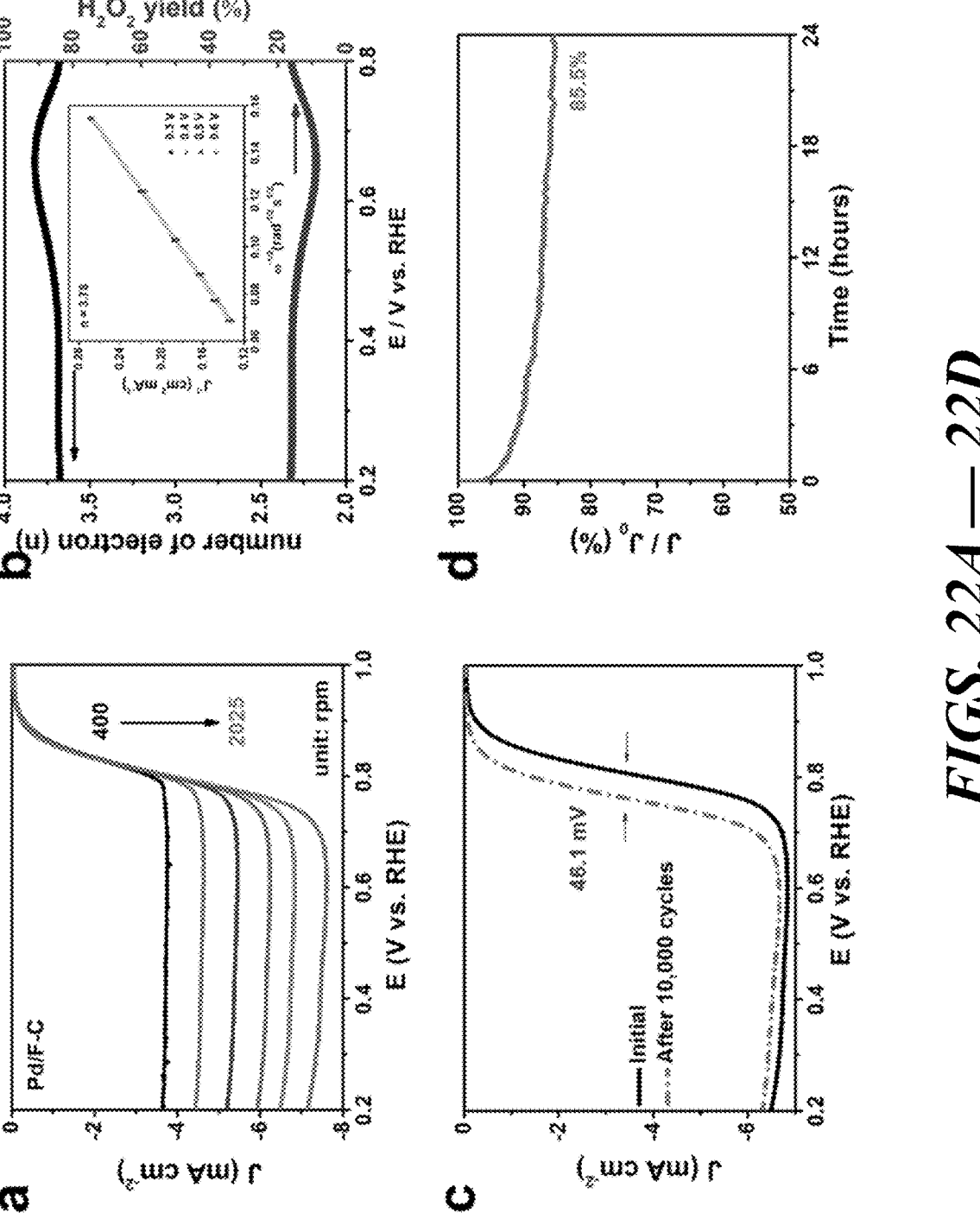
*FIGS. 22A — 22D*

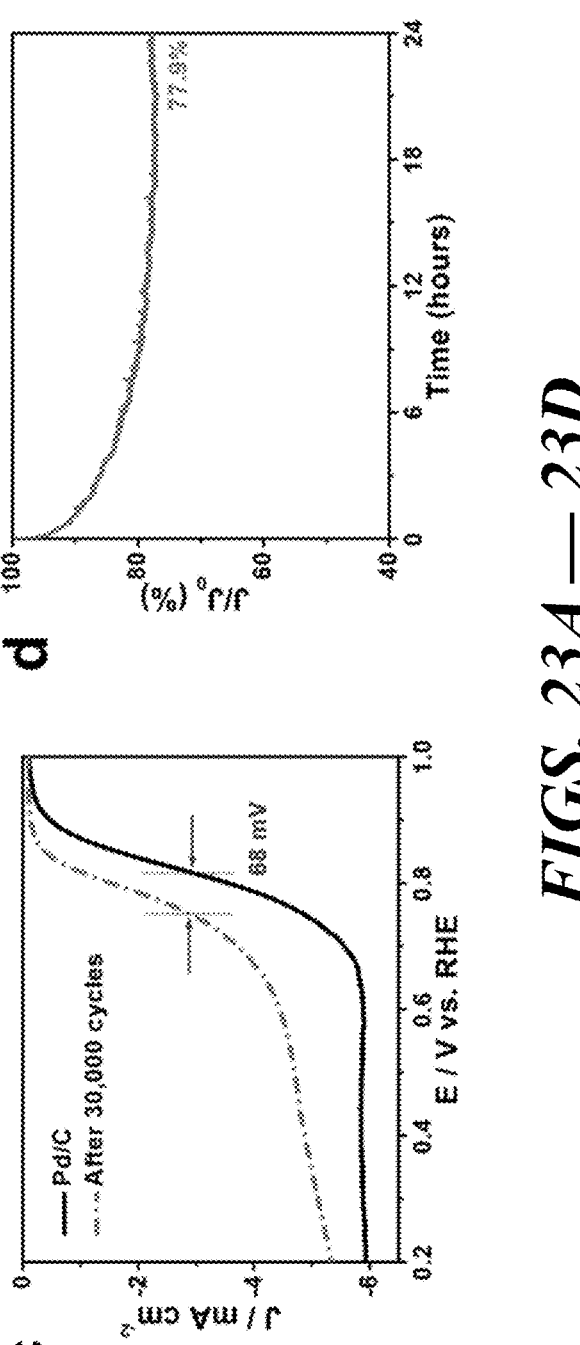
*FIGS. 23A — 23D*

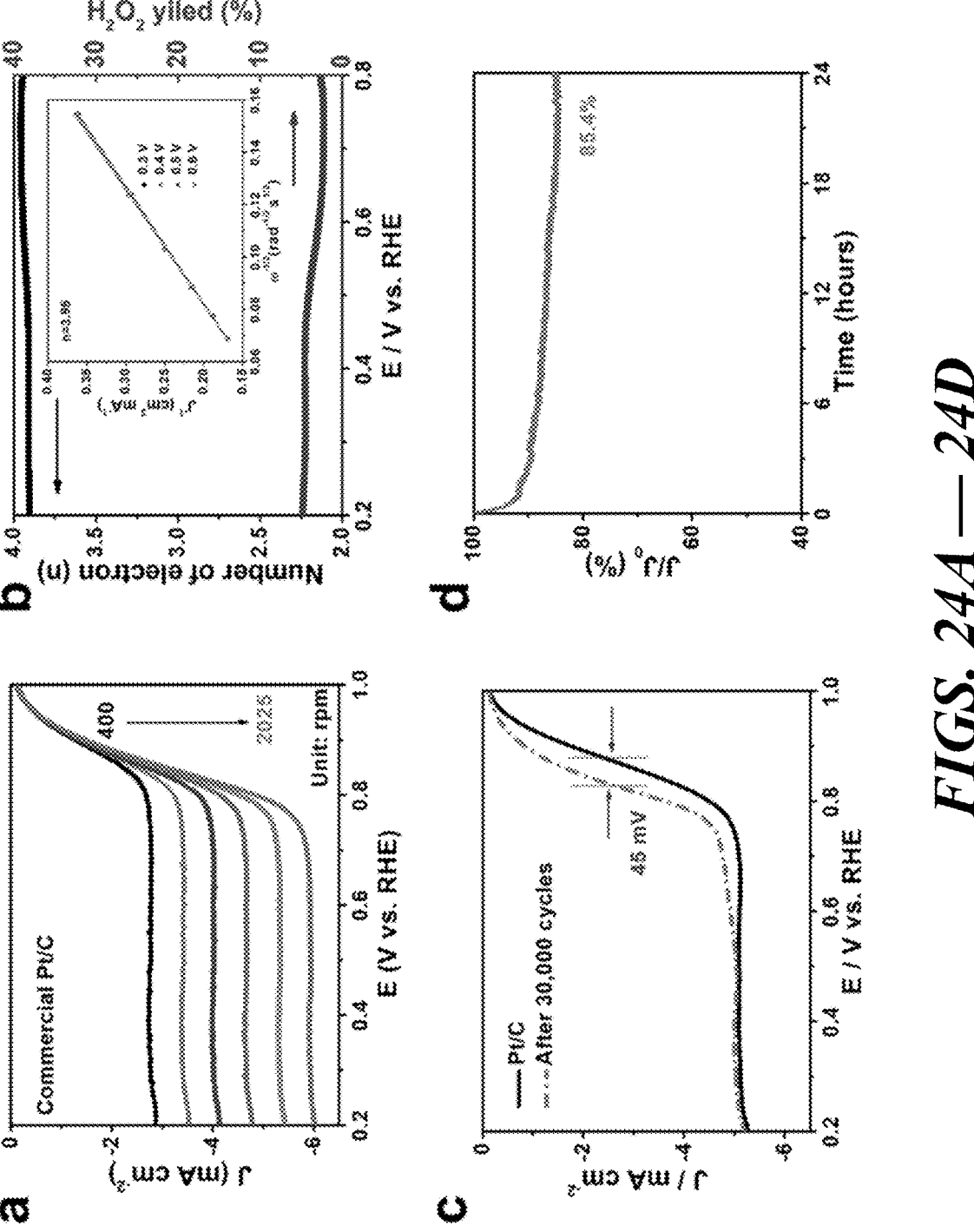
*FIGS. 24A — 24D*

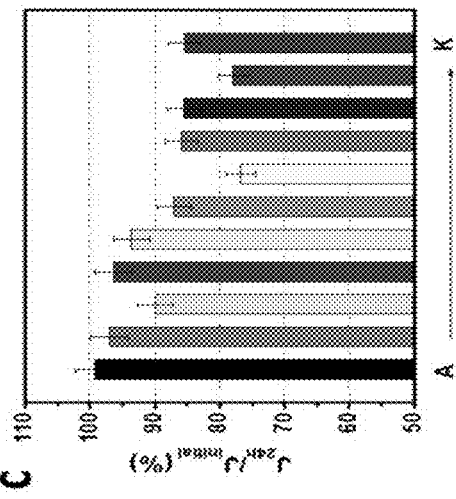
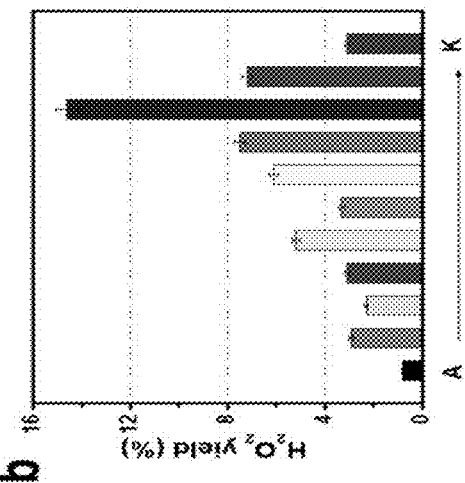
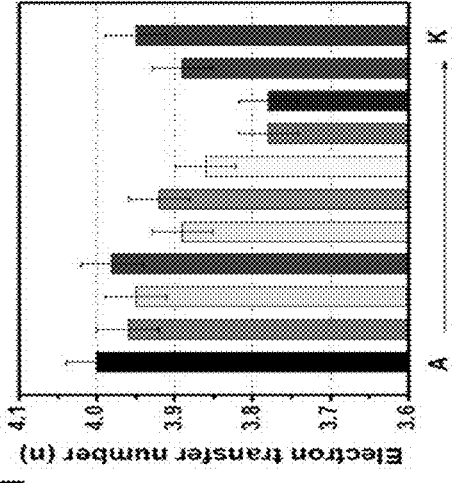
*FIGS. 26A — 26C*

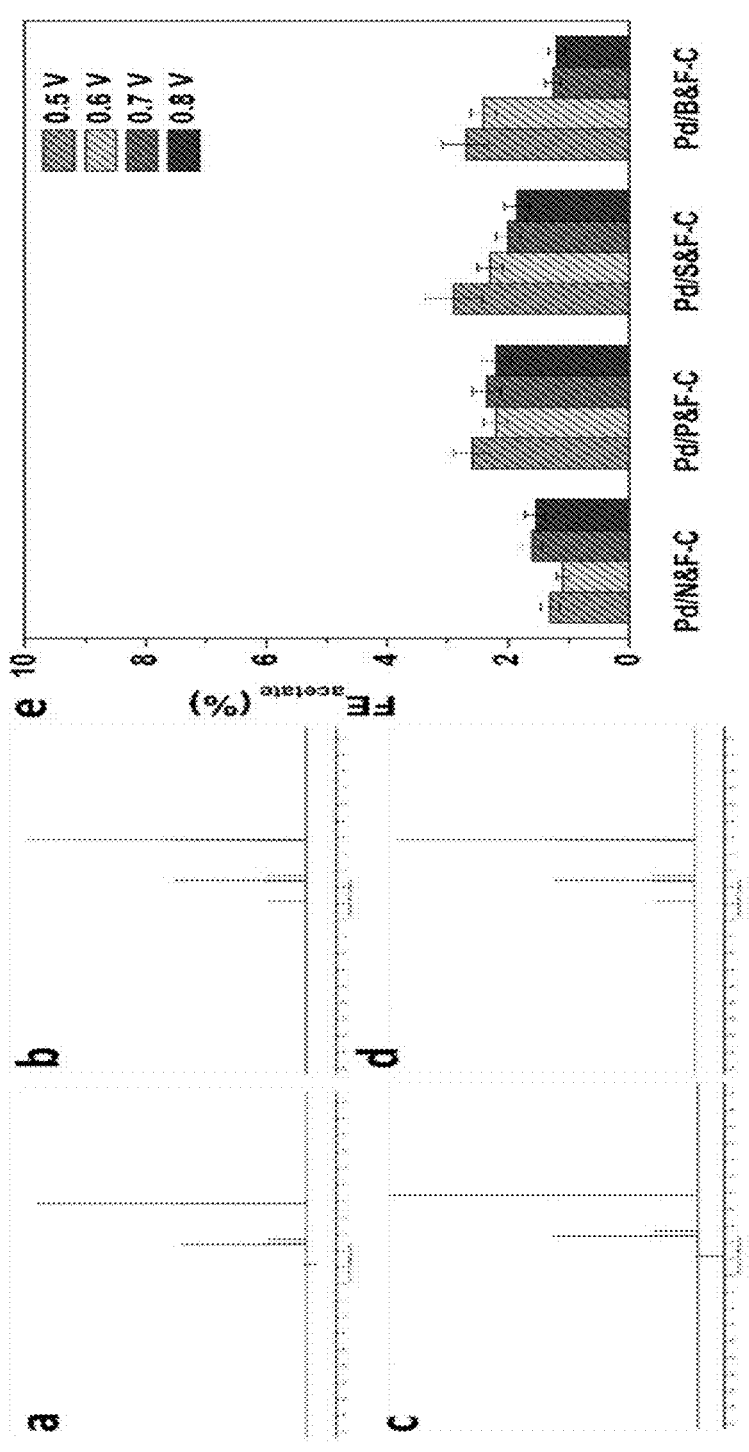
FIGS. 35A — 35E

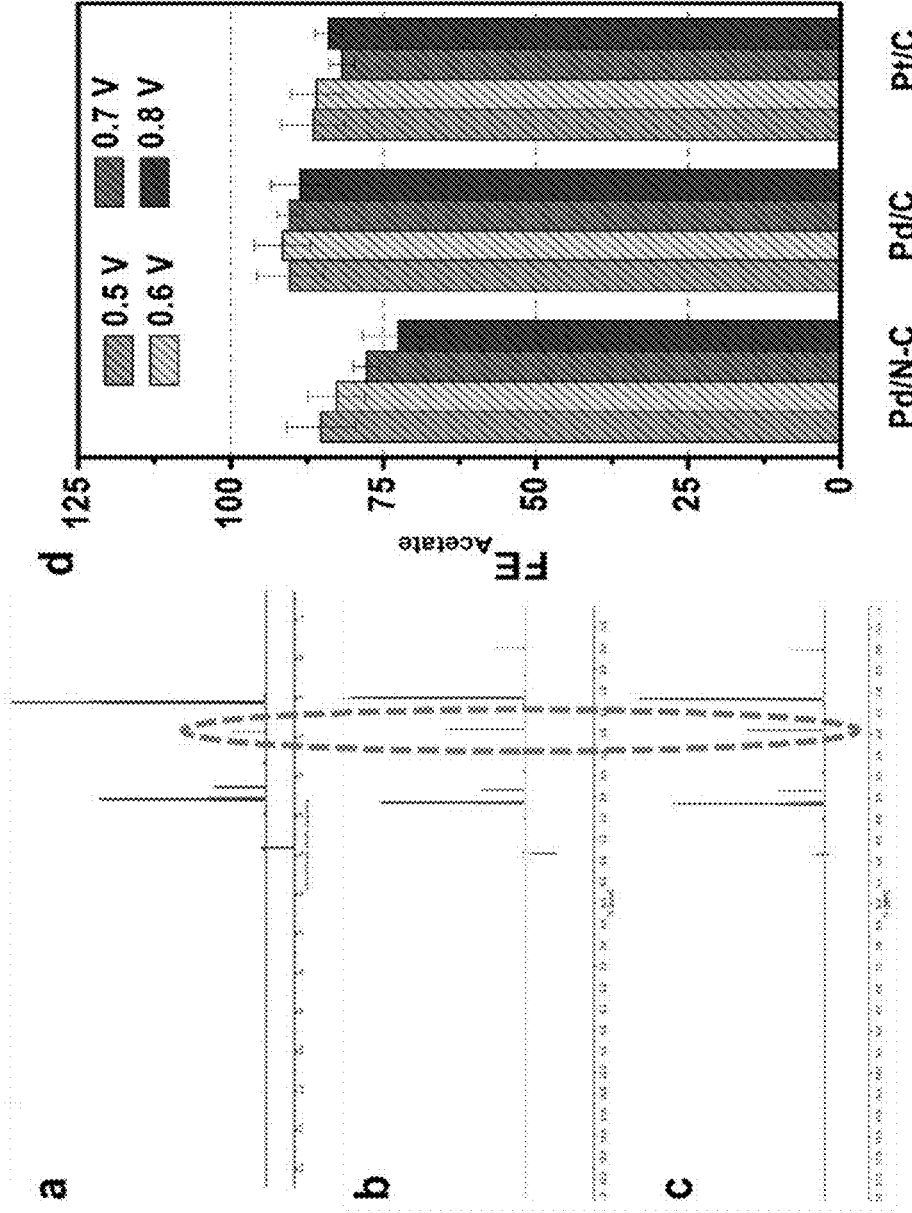
*FIGS. 36A — 36D*

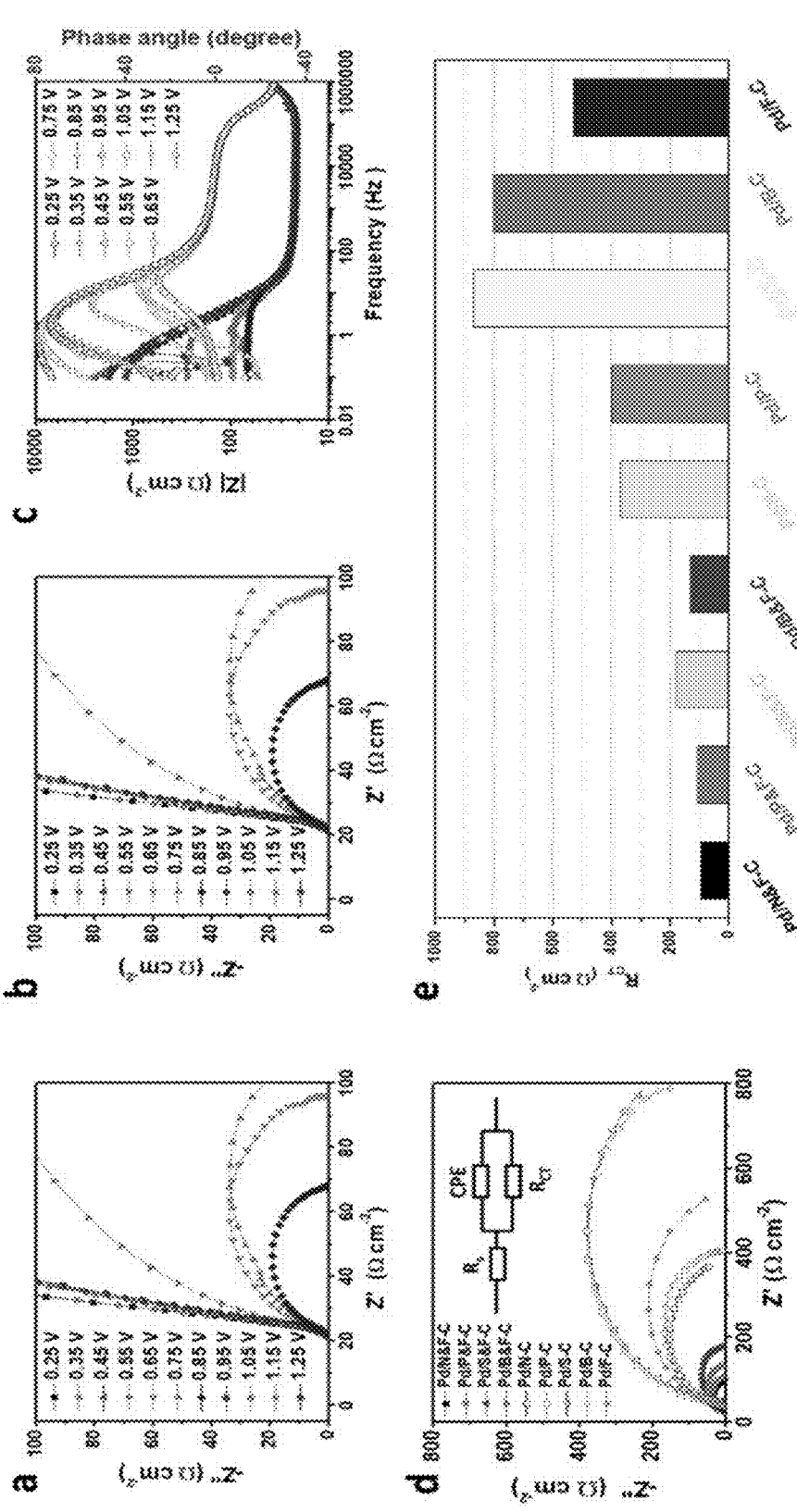
*FIGS. 37A — 37E*

*FIGS. 38A—38E*

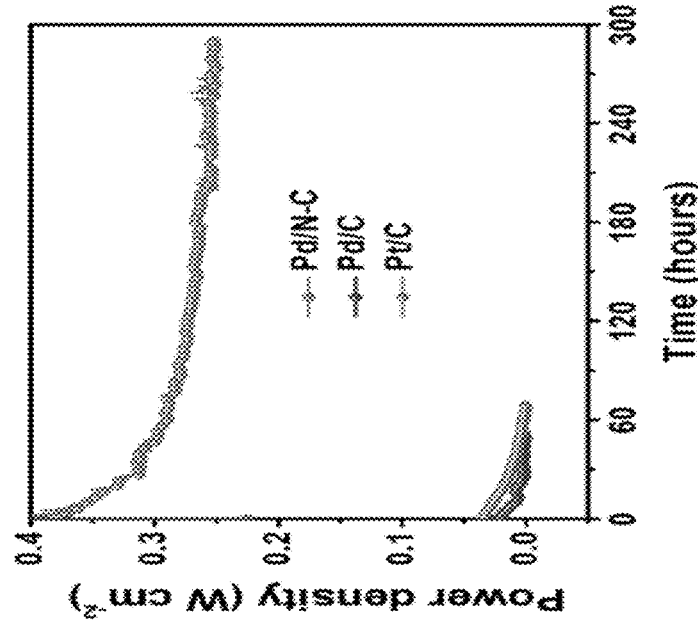
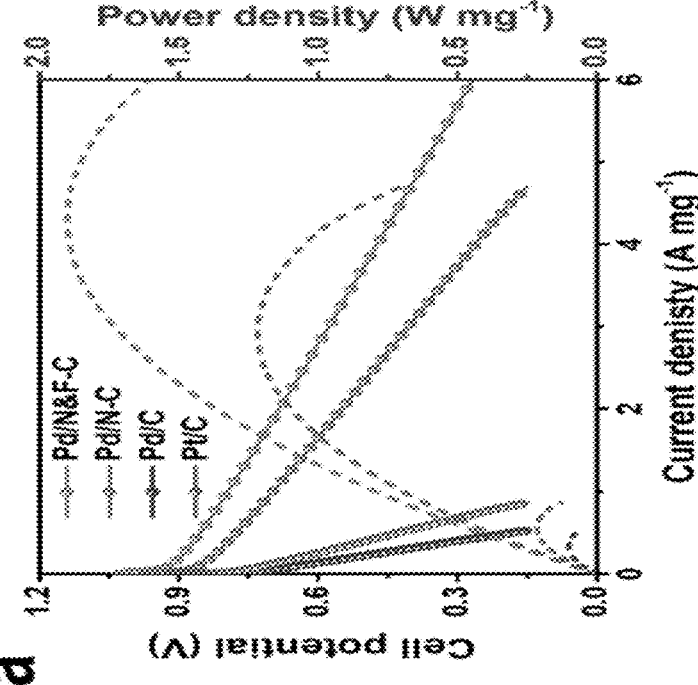
*FIGS. 39A — 39B*

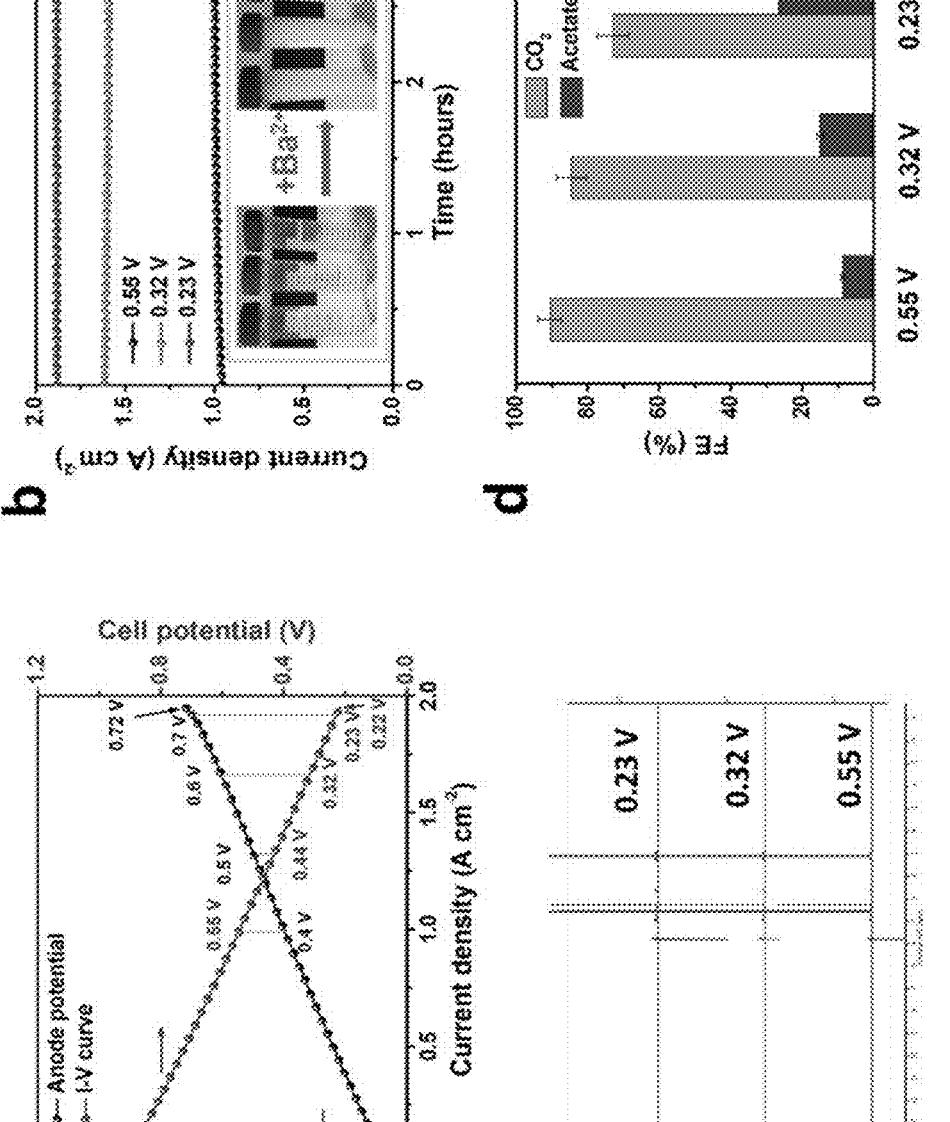
*FIGS. 40A — 40D*

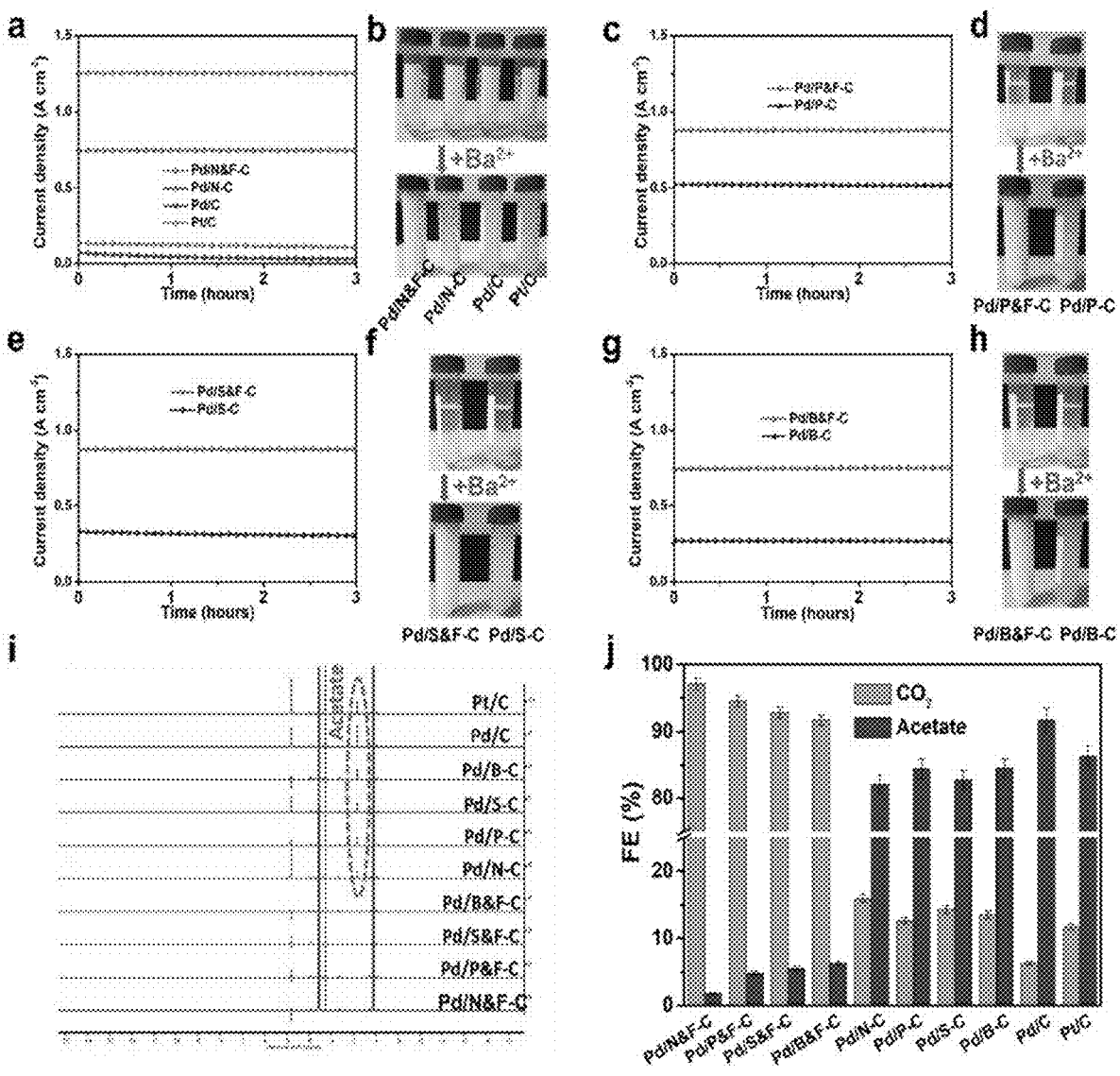
FIGS. 43A — 43J a
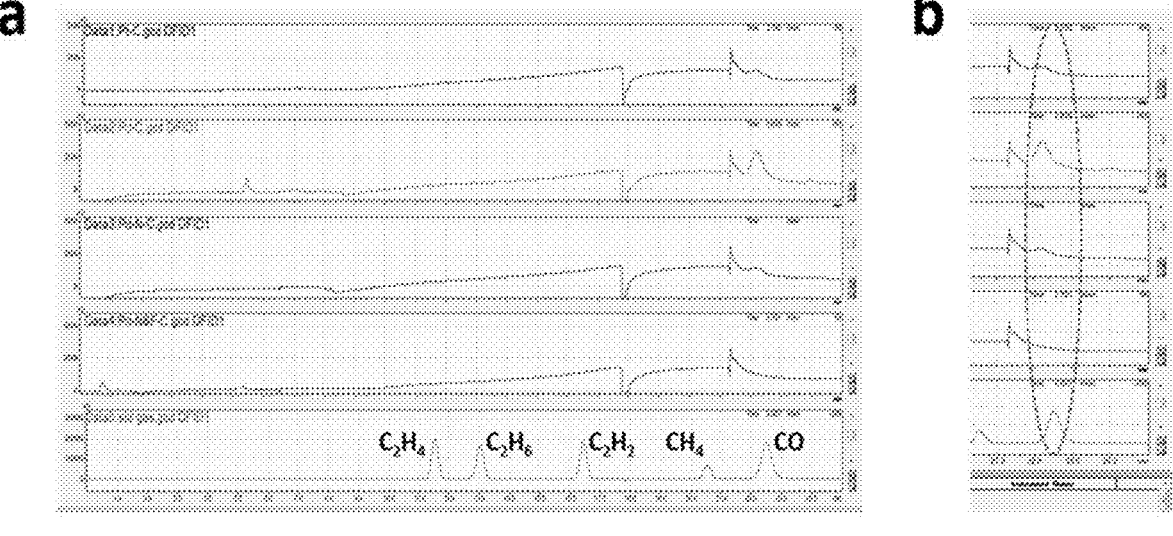
C₂H₄    C₂H₆    C₂H₂    CH₄    CO
b
c
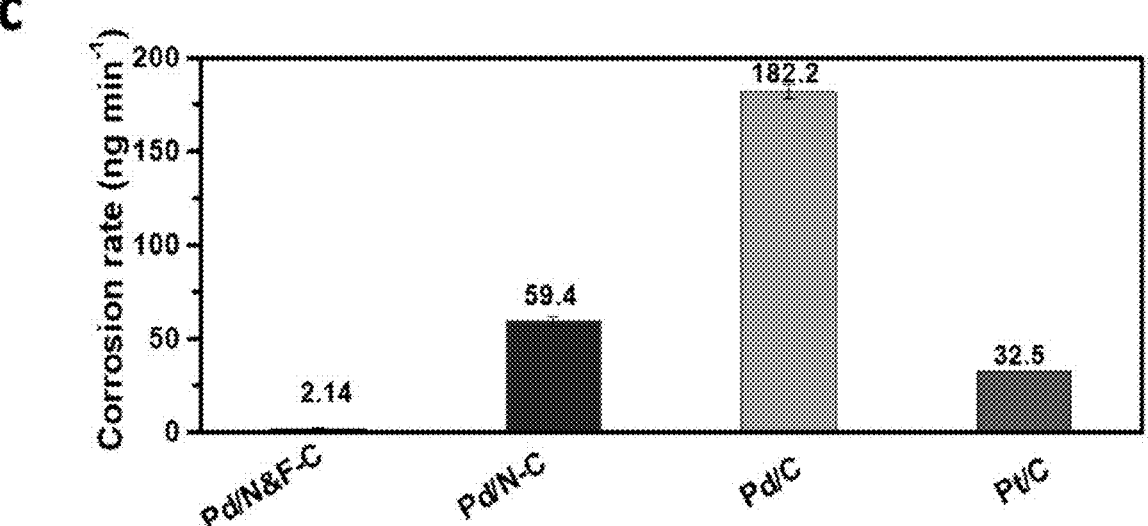
FIGS. 44A — 44C

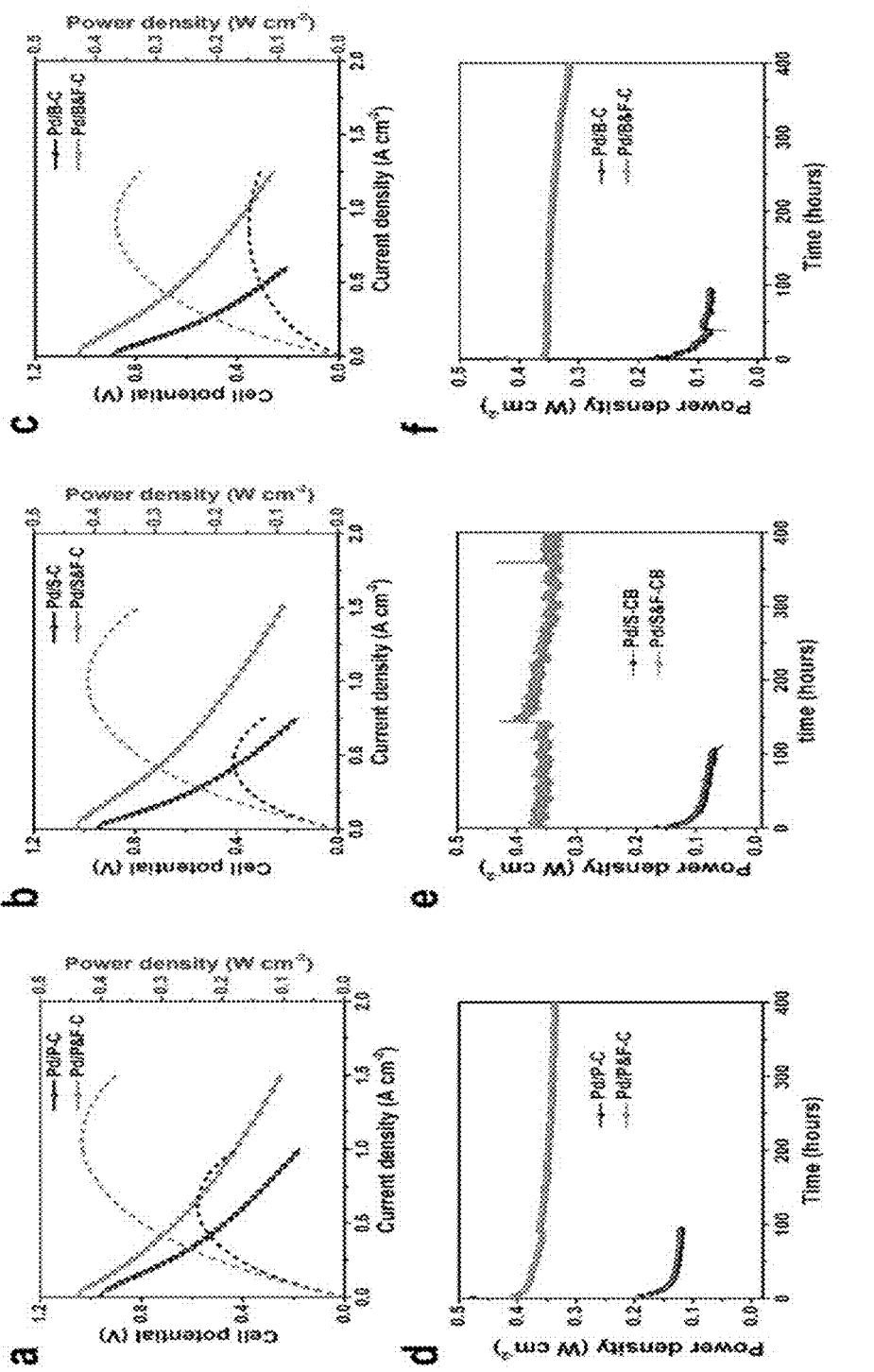
*FIGS. 45A — 45F*

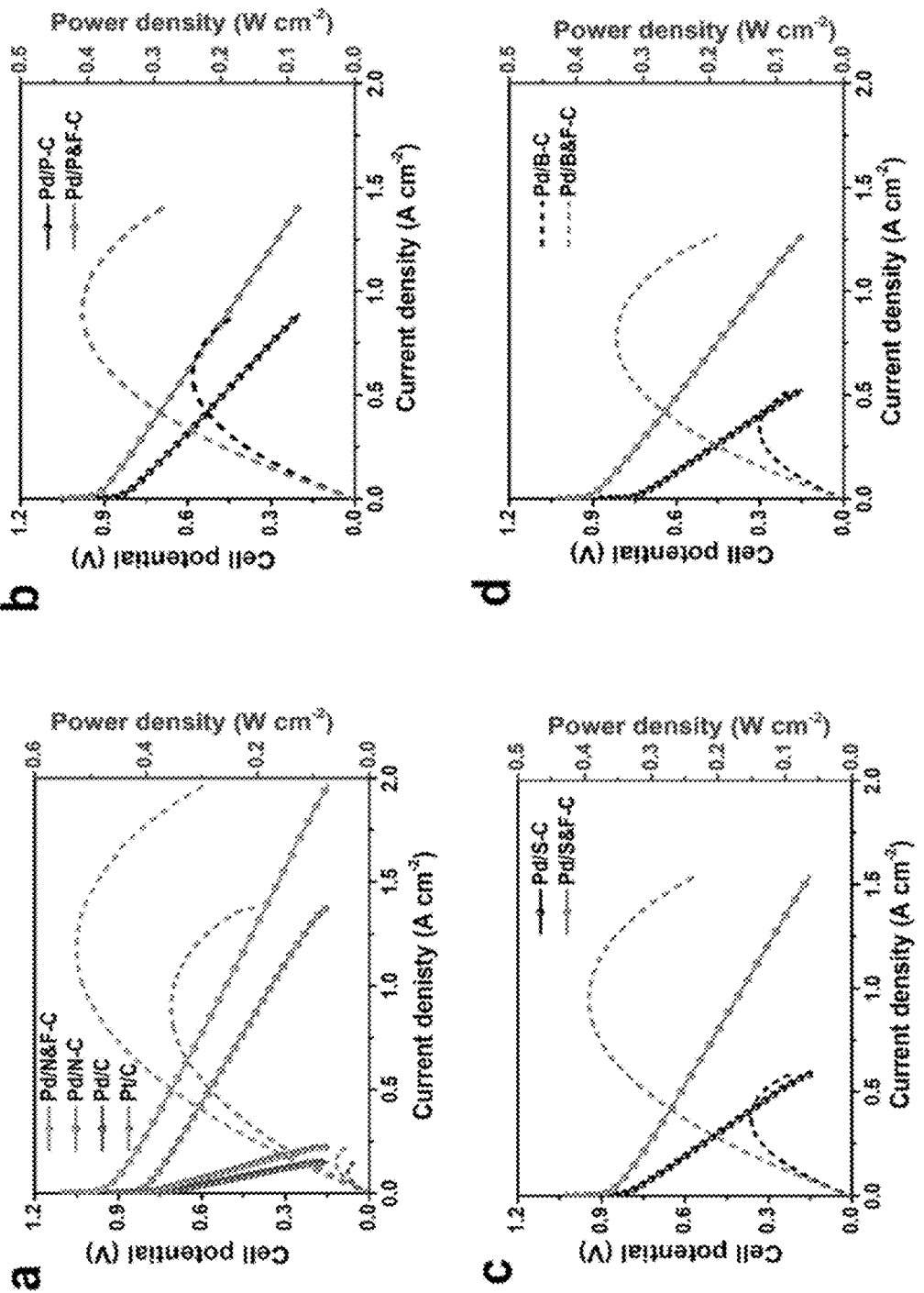
*FIGS. 46A — 46D*

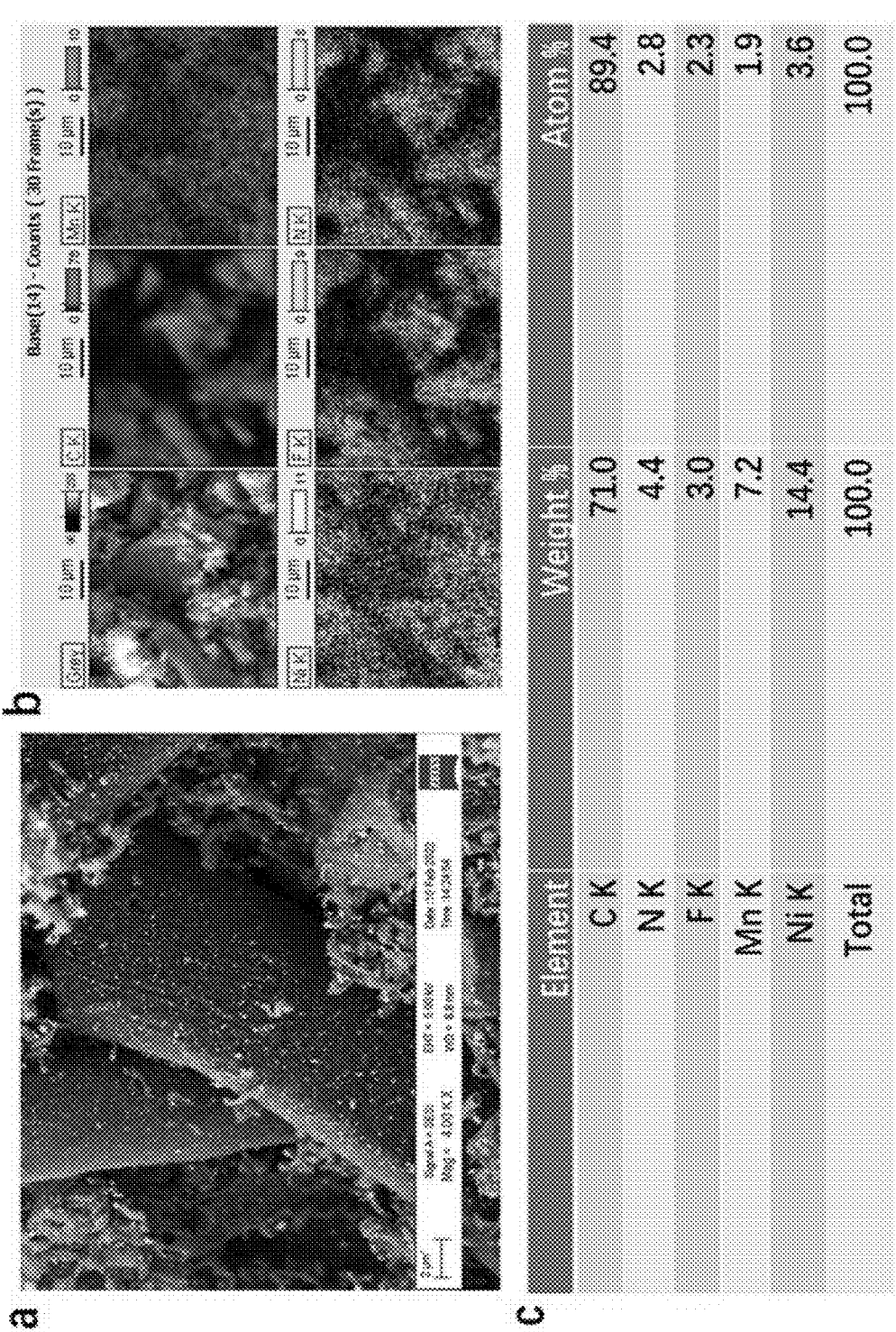
| Element | Weight % | Atom % |
|---|---|---|
| C K | 71.0 | 89.4 |
| N K | 4.4 | 2.8 |
| F K | 3.0 | 2.3 |
| Mn K | 7.2 | 1.9 |
| Ni K | 14.4 | 3.6 |
| Total | 100.0 | 100.0 |
*FIGS. 49A — 49C*

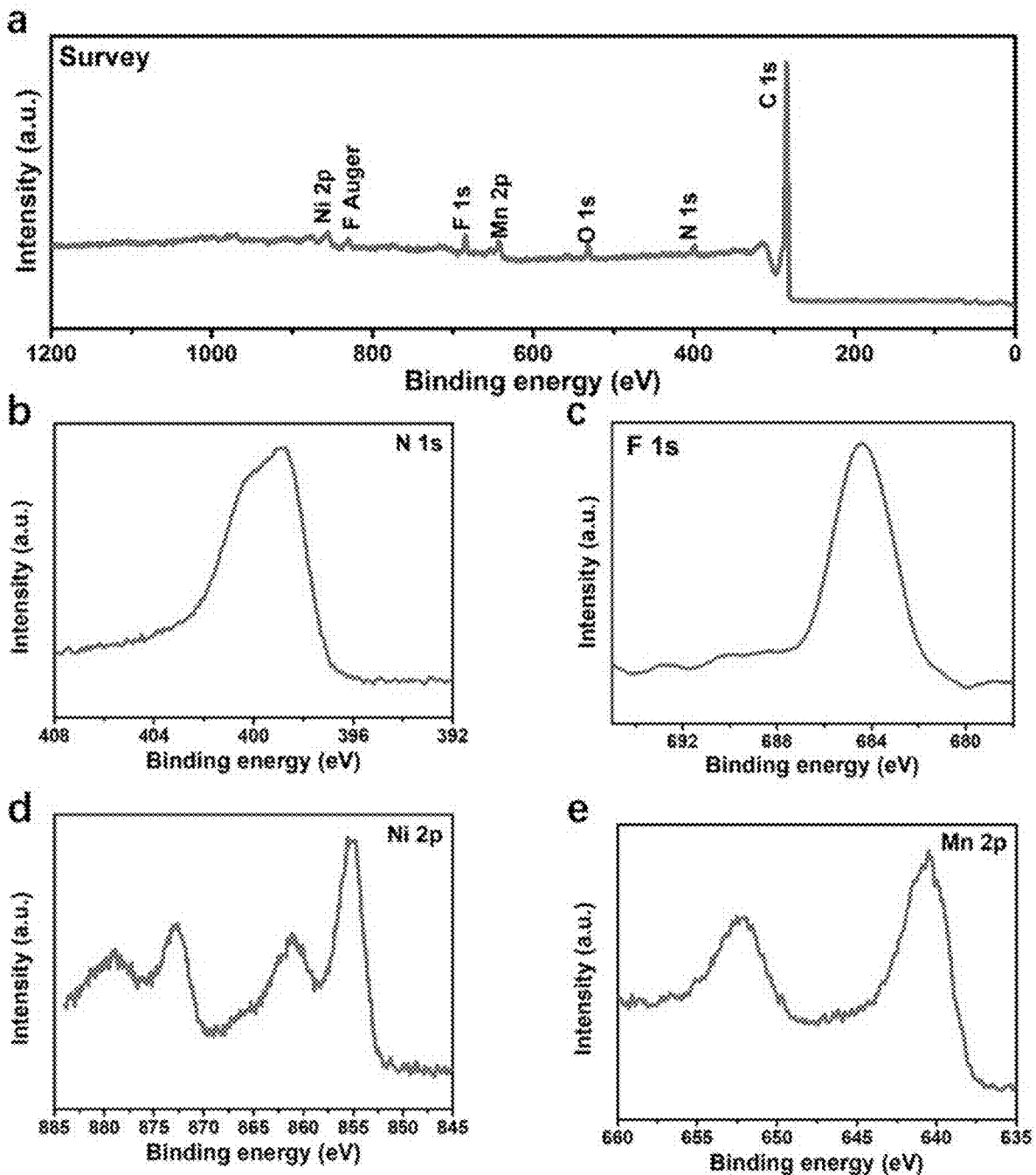
*FIGS. 50A — 50E*

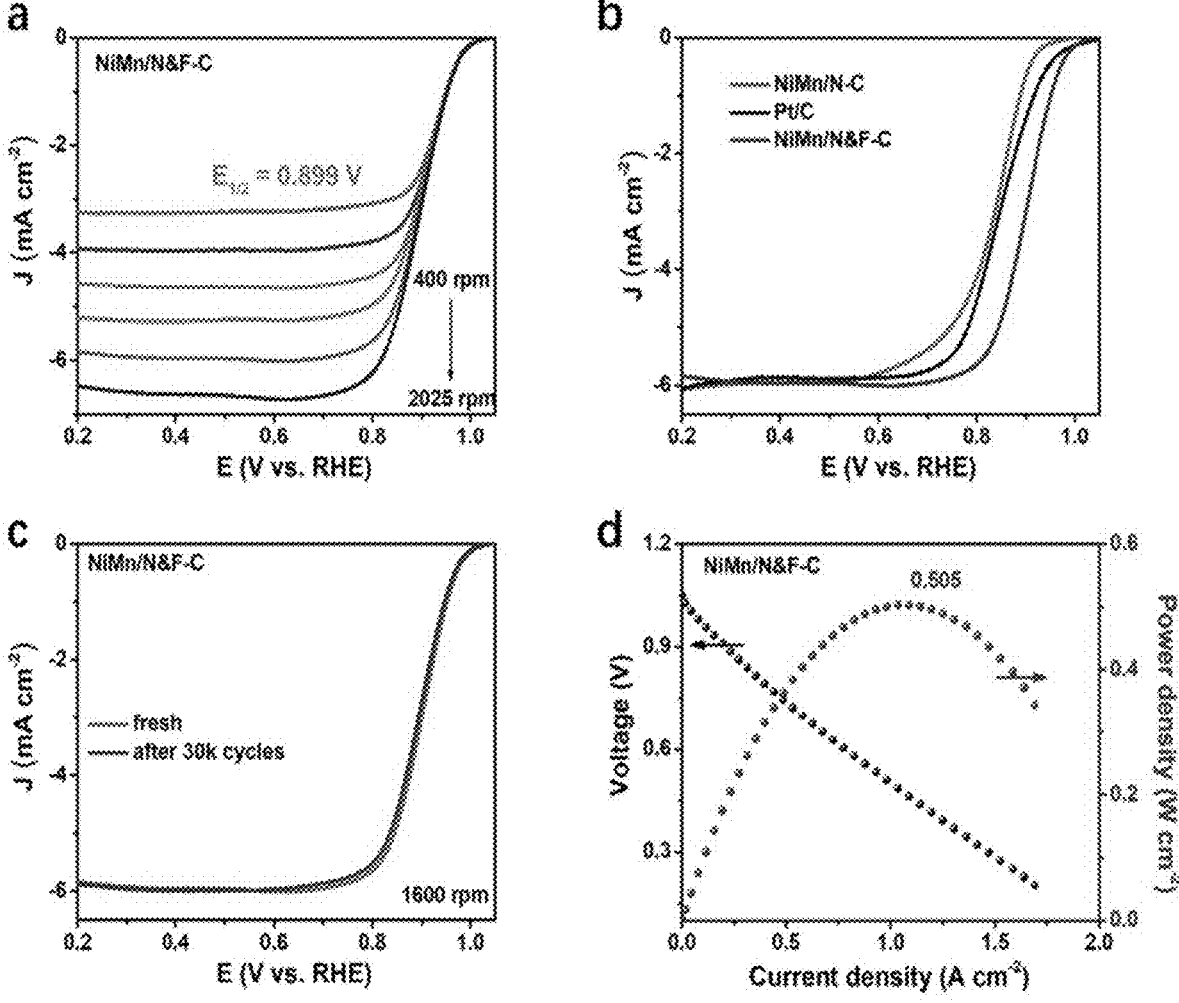
FIGS. 51A — 51D

COMPOSITION OF AND METHOD FOR OPTIMIZING A CATALYTIC REACTION

CROSS-REFERENCE TO RELATED APPLICATIONS

This nonprovisional application claims the benefit of U.S. Provisional Application No. 63/260,768 entitled "FLUORINATED ELECTROCATALYST AND METHODS OF REGULATING A LOCAL COORDINATION ENVIRONMENT OF ATOMS WITHIN A FUEL CELL," filed Aug. 31, 2021 by the same inventors, all of which is incorporated herein by reference in its entirety.

BACKGROUND OF THE INVENTION

1. Field of the Invention

This invention relates, generally, to improving catalyst activity within an electrochemical cell. More specifically, it relates to a fluorinated electrocatalyst and a method of optimizing a catalytic reaction within an electrochemical cell.

2. Brief Description of the Prior Art

The local coordination environment ("LCE") site of atoms within an electrochemical cell has recently been unveiled to play a vital role in increasing the kinematic reactions in many emerging electrocatalytic systems that are traditionally considered to include slower reactions, often referred to as "sluggish" systems. For instance, the widespread implementations of high-energy direct ethanol fuel cells (hereinafter "DEFCs") are always impeded by the "sluggish" 12-electron (e) ethanol oxidation reaction (hereinafter "EOR") and 4-e oxygen reduction reaction (hereinafter "ORR"). A classic design is to improve the ORR kinetics by embedding metal-nitrogen (M-N) active moieties within the conducting carbon supports, forming M-N-C coordination within the electrochemical cell. Other heteroatoms (hereinafter "X") (e.g., phosphorus (P), sulfur (S), boron (B), and similar atoms) have also shown success being embedded into carbon supports, each forming M-X-C coordinations to improve the ORR kinetics, such as via interatomic synergism.

The LCE of atoms is suggested to be a prominent regulator of low-dimension catalysts, such as single atomic site catalysts owing to their high sensitivities to LCE. However, the implementation of the concept of LCE in large-dimension catalysts (i.e., nanomaterials and commercially available materials) and complex reactions, such as 12-e EOR, remains a challenge. For example, the prerequisite for EOR that there are at least three continuous atomic sites makes it difficult to controllably regulate the LCE. Traditional methods to control LCE can only fabricate M-X-C structures, in which the heteroatom X prefers to coordinate strongly with carbon instead of forming catalytic M-X moieties. Moreover, the inferior stability of the catalysts caused by the oxidative corrosion of carbon limits the commercial promise of emerging energy devices.

Accordingly, what is needed is a highly-efficient fluorinated electrocatalyst and a method of optimizing a catalytic reaction within an electrochemical cell. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for a highly efficient fluorinated electrocatalyst and a method of optimizing a catalytic reaction by creating metal-nonmetal ("M-X") moieties within a metal-nonmetal-carbon ("M-X-C") catalyst is now met by a new, useful, and nonobvious invention.

An aspect of the present disclosure pertains to a fluorinated electrocatalyst comprising a at least one carbon atom. In an embodiment, the at least one carbon atom may be chemically bonded to at least one nonmetallic chemical element, such that a nonmetal-carbon ("X-C") structure is formed. Additionally, in this embodiment, at least one fluorine atom may be chemically bonded to the X-C structure, forming a fluorine-doped nonmetal-carbon ("X&F-C") structure. In this manner, at least one metallic chemical may be metallically bonded to the X&F-C structure, forming a fluorine-doped metal-nonmetal-carbon ("M/X&F-C") construct. Accordingly, in this embodiment, at least one metal-nonmetal ("M-X") moiety may be disposed on the surface of the M/X&F-C construct. As such, the at least one fluorine atom may occupy a local coordination environment ("LCE") site of the M/X&F-C construct, preventing the at least one nonmetallic chemical element from occupying the LCE site.

In some embodiments, the at least one nonmetallic chemical element may include but is not limited to nitrogen, phosphorus, sulfur, carbon, boron, or any nonmetallic chemical element known in the art which may stably bond to a metallic chemical element and a carbon. In this manner, the at least one metallic chemical element may include but are not limited to palladium, platinum, nickel, and manganese, or any metallic chemical element known in the art that may stably bond to a nonmetallic chemical element and a carbon. Moreover, in this embodiment, the M/X&F-C construct may comprise weak metal-oxide bonds, such that the surface area of the electrochemical cell with which the fluorinated electrocatalyst interacts is increased.

In an embodiment, the M/X&F-C construct may be electrochemically stable. Accordingly, the M/X&F-C construct may be configured to retain a MA of at least 70% after at least 20,000 cycles, and in addition, the M/X&F-C construct may be configured to operate continuously in the electrochemical cell for at least 2,500 hours.

Further, in an embodiment, the M/X&F-C construct may be configured to execute complete electron transfer within a redox reaction. In this manner, in some embodiments the M/X&F-C construct may be configured to be anti-corrosive. As follows, the M/X&F-C construct may produce negligible byproducts after a catalytic reaction, such that a nucleophilic attack of at least one carbon atom in the M/X&F-C construct may be inhibited.

Another aspect of the present disclosure pertains to a method of optimizing a catalytic reaction within an electrochemical cell. In an embodiment, the method may comprise the following step: (a) incorporating a fluorinated electrocatalyst into the electrochemical cell. In this embodiment the fluorinated electrocatalyst may comprise the following: (1) at least one carbon atom, wherein the at least one carbon atom is chemically bonded to at least one nonmetallic chemical element, thereby forming a nonmetal-carbon ("X-C") structure; (2) at least one fluorine atom, wherein the at least one fluorine atom is chemically bonded to the X-C structure forming a fluorine-doped nonmetal-carbon ("X&F-

C") structure; (3) at least one metallic chemical element, wherein the at least one metallic chemical element is metallically bonded to the X&F-C structure, thereby forming a fluorine-doped metal-nonmetal-carbon ("M/X&F-C") construct; and (4) at least one metal-nonmetal ("M-X") moiety, wherein the at least one M-X moiety is disposed about the surface of the M/X&F-C construct. Additionally, In this embodiment, the at least one fluorine atom may occupy a local coordination environment ("LCE") site of the M/X&F-C construct, such that at least one nonmetallic chemical element is prevented from occupying the LCE site. Accordingly, the administration of the fluorinated electrocatalyst to the electrochemical cell thereof may optimize the catalytic reaction within the electrochemical cell.

Moreover, in an embodiment, the present disclosure may further include the step of weakening at least one metal-oxide bond, via fluorine repulsion, such that the surface area of the electrochemical cell with which the fluorinated electrocatalyst interacts is increased. In some embodiments, the M/X&F-C construct may comprise a negligible carbon oxidation rate, increasing bond stability within the M/X&F-C construct.

Furthermore, another aspect of the present disclosure pertains to a method of synthesizing a fluorinated electrocatalyst. In an embodiment, the method may comprise the following steps: (a) pretreating a carbon catalyst support comprised of at least one carbon atom; (b) chemically bonding at least one nonmetallic chemical element to the at least one carbon atom to form a nonmetal-carbon ("X-C") structure; (c) chemically bonding at least one fluorine atom into the X-C structure to form a fluorine-doped nonmetal-carbon ("X&F-C") structure; and (d) metallically bonding at least one metallic chemical element to the X&F-C structure to form the fluorinated electrocatalyst which is a fluorine-doped metal-nonmetal-carbon ("M/X&F-C") construct.

Additionally, in an embodiment, sonification may be used to pretreat the at least one carbon atom. The sonification may comprise ultrasound, or any sound treatment known in the art to pretreat a carbon atom. Moreover, in this embodiment, the method may comprise an additional step of, after pretreating the carbon catalyst support comprised of at least one carbon atom, refluxing the carbon catalyst support comprise of the at least one carbon atom. In some embodiments, heat treatment may be used to reflux the carbon catalyst support comprised of at least one carbon atom. In some embodiments, heat treatment may be used to chemically bond the at least one nonmetallic chemical element to the at least one carbon atom. Accordingly, heat treatment may comprise pyrolysis, or any heat application known in the art to chemically bond a nonmetallic chemical element to a carbon atom. Further, in some embodiments, heat treatment may be used to chemically bond the at least one fluorine atom into the X-C structure. Finally, in some embodiments, microwave reduction may be used to metallically bond the at least one metallic chemical element to the X&F-C structure. The microwave reduction may comprise any method known in the art which uses microwaves to metallically bond a metallic chemical element to a X&F-C structure.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1A depicts a schematic illustration of the fluorination-driven rearrangement of LCE. FIG. 1B depicts a photograph of the catalyst prepared by the gram-scale approach. FIG. 1C depicts Fourier-transform infrared spectra ("FT-IR") of C, O-C, N-C, and N&F-C. FIG. 1D depicts the electrical conductivity of the catalysts. FIG. 1E depicts the work function of the catalysts estimated from the ultraviolet photoemission spectroscopy ("UPS").

FIG. 2A depicts an ECSA of the catalysts with and without F-doping. FIG. 2B depicts an ORR half-wave potential ("$E_{1/2}$") and mass activity ("MA") of Pd/N&F-C, Pd/N-C, commercial Pd/C, and Pt/C at 0.9 $V_{iR-free}$. FIG. 2C depicts an ORR $E_{1/2}$ and MA of Pd/P&F-C, Pd/S&F-C, and Pd/B&F-C at 0.9 $V_{iR-free}$. FIG. 2D depicts an ORR MA retention (%) and $E_{1/2}$ loss after 30,000 cycles. FIG. 2E depicts an EOR MA and the corresponding retention after 10,000 cycles of Pd/N&F-C, Pd/P&F-C, Pd/S&F-C, Pd/B&F-C, Pd/C, and Pt/C. FIG. 2F depicts a Faraday efficiency ("FE") of ethanol to $CO_2$ in half-cell on Pd/N&F-C, Pd/N-C, Pd/C, and Pt/C at different potentials in 1 M KOH with 1 M ethanol solutions. FIG. 2G depicts a steady-state DEFCs polarization and power density curves of Pd/N&F-C, Pd/N-C, Pd/C, and Pt/C (the anode electrolyte is 1 M KOH+2 M ethanol with a flow rate of 20 mL min⁻¹, and cathode was fed with oxygen with 200 mL min⁻¹ without backpressure. FIG. 2H depicts a DEFCs stability test of Pd/N&F-C at 0.45 V. The error bars in FIGS. 2A-2F represent a standard deviations of at least three independent tests. FIG. 2I depicts a power densities of Pd/N&F-C and FIG. 2J depicts the durability of Pd/N&F-C with benchmarking catalysts.

FIGS. 4A-4C depict an X-ray diffraction ("XRD") pattern, according to an embodiment of the present disclosure. FIG. 4A depicts XRD patterns for pristine carbon, O-C, and X&F-C(X=N, P, S, and B). FIG. 4B depicts XRD patterns for Pd/X&F-C and commercial Pd/C. FIG. 4C depicts X-ray diffraction XRD patterns for Pd/X-C. The Pd loading amounts in the Pd/X&F-C and Pd/X-C were too low to be detected, while the commercial Pd/C showed obvious Pd diffraction peaks due to its high Pd content.

FIGS. 5A-5H depict a UPS spectra, according to an embodiment of the present disclosure. FIG. 5A depicts an UPS spectra for Pd/N&F-C. FIG. 5B depicts an UPS spectra for Pd/P&F-C. FIG. 5C depicts an UPS spectra for Pd/S&F-

C. FIG. 5D depicts an UPS spectra for Pd/B&F-C. FIG. 5E depicts an UPS spectra for Pd/N-C. FIG. 5F depicts an UPS spectra for Pd/P-C. FIG. 5G depicts an UPS spectra for Pd/S-C. FIG. 5H depicts an UPS spectra for Pd/B-C. The blue and red lines mark the baselines and tangents of the curves, respectively, and the photo energy $E_{He-I}$=21.22 eV.

FIGS. 6A-6F depict an X-ray photoelectron spectroscopy ("XPS") analyses of Pd/N&F-C and Pd/N-C, according to an embodiment of the present disclosure. FIG. 6A depicts an XPS analyses, with Pd 3d for Pd/N&F-C. FIG. 6B depicts an XPS analyses, with 1s for Pd/N&F-C. FIG. 6C depicts an XPS analyses, with F Is for Pd/N&F-C. FIG. 6D depicts an XPS analyses, with Pd 3d for Pd/N-C. FIG. 6E depicts an XPS, with N 1s for Pd/N-C. The contents (percentages) of $Pd^0$ and $Pd^{2+}$ in the Pd/N&F-C. FIG. 6F depicts an XPS analyses of Pd/N-C. The higher $Pd^{2+}$ content in the Pd/N&F-C than Pd/N-C indicates the formation of more coordination sites after F-doping.

FIGS. 7A-7F depict an XPS analyses of Pd/P&F-C and Pd/P-C, according to an embodiment of the present disclosure. FIG. 7A depicts an XPS analyses, with Pd 3d for Pd/P&F-C. FIG. 7B depicts an XPS analyses, with 2p for Pd/P&F-C. FIG. 7C depicts an XPS analyses, with F Is for Pd/P&F-C. FIG. 7D depicts an XPS analyses, with Pd 3d for Pd/P-C. FIG. 7E depicts an XPS analyses, with P 2p for Pd/P-C. FIG. 7F depicts a content (percentage) of $Pd^0$ and $Pd^{2+}$ in the Pd/P&F-C and Pd/P-C. The F-doping helps to regulate the local coordination environments of Pd.

FIGS. 8A-8F depict an XPS analyses of Pd/S&F-C and Pd/S-C, according to an embodiment of the present disclosure. FIG. 8A depicts XPS analyses with Pd 3d for Pd/S&F-C. FIG. 8B depicts XPS analyses with 2p for Pd/S&F-C. FIG. 8C depicts XPS analyses with F Is for Pd/S&F-C. FIG. 8D depicts XPS analyses with Pd 3d for Pd/S-C. FIG. 8E depicts XPS analyses with S 2p for Pd/S-C. FIG. 8F depicts a content (percentage) of $Pd^0$ and $Pd^{2+}$ in the Pd/S&F-C and Pd/S-C.

FIGS. 9A-9F depict an XPS analyses of Pd/B&F-C and Pd/B-C. FIG. 9A depicts an XPS analyses with Pd 3d for Pd/B&F-C FIG. 9B depicts an XPS analyses with B 2p for Pd/B&F-C. FIG. 9C depicts an XPS analyses with F Is for Pd/B&F-C. FIG. 9D depicts an XPS analyses with Pd 3d for Pd/B-C. FIG. 9E depicts an XPS analyses with B 2p for Pd/B-C. FIG. 9F depicts a content (percentage) of $Pd^0$ and $Pd^{2+}$ in the Pd/B&F-C and Pd/B-C.

FIGS. 10A-10L depict a Cyclic voltammograms ("CVs") of the catalysts in different $N_2$-saturated electrolytes, according to an embodiment of the present disclosure. FIG. 10A, FIG. 10E, and FIG. 10I depict a CVs of the catalysts in different $N_2$-saturated electrolytes with Pd/N&F-C and Pd/N-C. FIG. 10B, FIG. 10F, and FIG. 10J depict a CVs of the catalysts in different $N_2$-saturated electrolytes with Pd/P&F-C and Pd/P-C. FIG. 10C, FIG. 10G, and FIG. 10K depict a CVs of the catalysts in different $N_2$-saturated electrolytes with Pd/S&F-C and Pd/S-C. FIG. 10D, FIG. 10H, and FIG. 10L depict a CVs of the catalysts in different $N_2$-saturated electrolytes with Pd/B&F-C and Pd/B-C. The scan rate was 50 mV s$^{-1}$ with a Pd loading of 8 µg cm$^{-2}$. The hydrogen underpotential deposition ("$H_{upd}$") and double-layer capacitance ("$C_{dl}$") peaks of the Pd/X&F-C are much larger than those of the Pd/X-C, indicating that the F-coordination enhances utilization efficiency of Pd by creating more active surfaces. In addition, positive shifts in the hydroxide adsorption and oxide reduction peaks of the Pd/X&F-C compared with Pd/X-C confirm the weakened Pd-O binding due to the F-coordination.

FIGS. 11A-11C depict CVs of Pd/F-C in different $N_2$-saturated electrolytes, according to an embodiment of the present disclosure. FIG. 11A depicts CVs of Pd/F-C in different $N_2$-saturated electrolytes including 0.1 M KOH. FIG. 11B depicts CVs of Pd/F-C in different $N_2$-saturated electrolytes including 1.0 M KOH. FIG. 11C depicts CVs of Pd/F-C in different $N_2$-saturated electrolytes including 0.1 M $HClO_4$. The scan rate was 50 m V s$^{-1}$ with a Pd loading of 8 µg cm$^{-2}$.

FIGS. 12A-12K depict a carbon monoxide ("CO") stripping voltammograms, according to an embodiment of the present disclosure. FIG. 12A depicts a CO stripping Pd/N&F-C. FIG. 12B depicts a CO stripping Pd/P&F-C. FIG. 12C depicts a CO stripping Pd/S&F-C. FIG. 12D depicts a CO stripping Pd/B&F-C. FIG. 12E depicts a CO stripping Pd/N-C. FIG. 12F depicts a CO stripping Pd/P-C. FIG. 12G depicts a CO stripping Pd/S-C. FIG. 12H depicts a CO stripping Pd/B-C. FIG. 12I depicts a CO stripping commercial Pd/C. FIG. 12J depicts a CO stripping commercial Pt/C. FIG. 12K depicts the derived onset and peak potentials (P1 and P2) for CO stripping from FIGS. 12A-12I. The CVs were conducted in 0.1 M $HClO_4$ at a scan rate of 20 mV s$^{-1}$ with a Pd (Pt) loading of 8 µg cm$^{-2}$. The ECSA of each catalyst was estimated from the charge integration of CO stripping. The much lower onset and peak potentials of Pd/N&F-C for CO oxidation indicate the weaker CO adsorption on the catalyst surface after F-doping. Also, only one CO oxidation peak was found from the samples without F-coordination. In contrast, two CO oxidation peaks (P1 and P2) were found from the catalysts with F-coordination. The peak at ~1.01 V can be solidly attributed to the Pd (111), while the second peak at ~0.87 V may be attributed to the Pd-X (X=N, P, S, B) on the Pd (111) surface. In particular, the F-coordination in the Pd/N&F-C results in the surface enrichment of N on Pd, which enables the oxidation removal of poisoned CO at low potential and delivers clean and highly active Pd surfaces.

FIGS. 14A-14D depict an ORR performance of Pd/N&F-C, according to an embodiment of the present disclosure. FIG. 14A depicts an ORR performance of Pd/N&F-C including linear sweep voltammetry curves ("LSVs") at various rotating speeds. FIG. 14B depicts an ORR performance of Pd/N&F-C including electron transfer numbers and peroxide yields at 1600 rpm. FIG. 14C depicts an ORR performance of Pd/N&F-C including LSVs of initial and after 30,000 cycles. FIG. 14D depicts an ORR performance of Pd/N&F-C including current-time (i-t) curves at 0.8 V. After 30,000 cycles, the half-wave potential shows only a 3.0 mV negative shift compared with the initial LSVs, indicating robust stability and durability of the catalysts.

FIGS. 15A-15D depict an ORR performance of Pd/P&F-C, according to an embodiment of the present disclosure. FIG. 15A depicts an ORR performance of Pd/P&F-C including LSVs at various rotating speeds. FIG. 15B depicts an ORR performance of Pd/P&F-C including electron transfer numbers and peroxide yields at 1600 rpm. FIG. 15C depicts an ORR performance of Pd/P&F-C including LSVs of initial and after 30,000 cycles. FIG. 15D depicts the i-t curves at 0.8 V.

FIG. 16A-16D depict an ORR performance of Pd/S&F-C, according to an embodiment of the present disclosure. FIG. 16A depicts an ORR performance of Pd/S&F-C including LSVs at various rotating speeds. FIG. 16B depicts an ORR performance of Pd/S&F-C including electron transfer numbers and peroxide yields at 1600 rpm. FIG. 16C depicts an ORR performance of Pd/S&F-C including LSVs of initial and after 30,000 cycles. FIG. 16D depicts the i-t curves at 0.8 V.

FIGS. 17A-17D depict an ORR performance of Pd/B&F-C, according to an embodiment of the present disclosure. FIG. 17A depicts an ORR performance of Pd/B&F-C including LSVs at various rotating speeds. FIG. 17B depicts an ORR performance of Pd/B&F-C including electron transfer numbers and peroxide yields at 1600 rpm. FIG. 17C depicts an ORR performance of Pd/B&F-C including LSVs of initial and after 30,000 cycles. FIG. 17D depicts the i-t curves at 0.8 V.

FIGS. 18A-18D depict an ORR performance of Pd/N-C without F-coordination, according to an embodiment of the present disclosure. FIG. 18A depicts an ORR performance of Pd/N-C without F-coordination including LSVs at various rotating speeds. FIG. 18B depicts an ORR performance of Pd/N-C without F-coordination including electron transfer numbers and peroxide yields at 1600 rpm. FIG. 18C depicts an ORR performance of Pd/N-C without F-coordination including the LSVs of initial and after 30,000. FIG. 18D depicts the i-t curves at 0.8 V.

FIGS. 19A-19D depict an ORR performance of Pd/P-C without F-coordination, according to an embodiment of the present disclosure. FIG. 19A depicts an ORR performance of Pd/P-C without F-coordination including LSVs at various rotating speeds.

FIG. 19B depicts an ORR performance of Pd/P-C without F-coordination including electron transfer numbers and peroxide yields at 1600 rpm. FIG. 19C depicts an ORR performance of Pd/P-C without F-coordination including the LSVs of initial and after 30,000 cycles. FIG. 19D depicts the i-t curves at 0.8 V.

FIGS. 20A-20D depict an ORR performance of Pd/S-C without F-coordination, according to an embodiment of the present disclosure. FIG. 20A depicts an ORR performance of Pd/S-C without F-coordination including LSVs at various rotating speeds. FIG. 20B depicts an ORR performance of Pd/S-C without F-coordination including electron transfer numbers and peroxide yields at 1600 rpm. FIG. 20C depicts an ORR performance of Pd/S-C without F-coordination including the LSVs of initial and after 30,000 cycles. FIG. 20D depicts the i-t curves at 0.8 V.

FIGS. 21A-21D depict an ORR performance of Pd/B-C without F-coordination, according to an embodiment of the present disclosure. FIG. 21A depicts an ORR performance of Pd/B-C without F-coordination including LSVs at various rotating speeds. FIG. 21B depicts an ORR performance of Pd/B-C without F-coordination including electron transfer numbers and peroxide yields at 1600 rpm. FIG. 21C depicts an ORR performance of Pd/B-C without F-coordination including the LSVs of initial and after 30,000. FIG. 21D depicts the i-t curves at 0.8 V.

FIGS. 22A-22D depict an ORR performance of Pd/F-C, according to an embodiment of the present disclosure. FIG. 22A depicts an ORR performance of Pd/F-C including LSVs at various rotating speeds. FIG. 22B depicts an ORR performance of Pd/F-C including electron transfer numbers and peroxide yields at 1600 rpm. FIG. 22C depicts an ORR performance of Pd/F-C including the LSVs of initial and after 30,000 cycles. FIG. 22D depicts the i-t curves at 0.8 V.

FIGS. 23A-23D depict an ORR performance of commercial Pd/C, according to an embodiment of the present disclosure. FIG. 23A depicts an ORR performance of Pd/C including LSVs at various rotating speeds. FIG. 23B depicts an ORR performance of Pd/C including electron transfer numbers and peroxide yields at 1600 rpm. FIG. 23C depicts an ORR performance of Pd/C including the LSVs of initial and after 30,000 cycles. FIG. 23D depicts the i-t curves at 0.8 V.

FIGS. 24A-24D depict an ORR performance of commercial Pt/C, according to an embodiment of the present disclosure. FIG. 24A depicts an ORR performance of Pt/C including LSVs at various rotating speeds. FIG. 24B depicts an ORR performance of Pt/C including electron transfer numbers and peroxide yields at 1600 rpm. FIG. 24C depicts an ORR performance of Pt/C including the LSVs of initial and after 30,000 cycles. FIG. 24D depicts the i-t curves at 0.8 V.

FIGS. 26A-26C graphically depict an ORR performance of the catalysts, according to an embodiment of the present disclosure. FIG. 26A graphically depicts an ORR performance of the catalysts including electron transfer number (n). FIG. 26B graphically depicts an ORR performance of the catalysts including $H_2O_2$ yield (%). FIG. 26C graphically depicts an ORR performance of the catalysts including current density retention (%) after a 24 hours i-t test. The "A-K" in (a-c) represent Pd/N&F-C, Pd/P&F-C, Pd/S&F-C, Pd/B&F-C, Pd/N-C, Pd/P-C, Pd/S-C, Pd/B-C, Pd/F-C, commercial Pd/C, and Pt/C, respectively.

FIG. 28A depicts an ORR performance of heteroatom X-doped carbon supports with LSVs curves in the $O_2$-saturated 0.1 M $HClO_4$ at 1600 rpm shown. FIG. 28B depicts an ORR performance of heteroatom X-doped carbon supports with LSVs curves in the $O_2$-saturated 0.1 M KOH with 5 mV s$^{-1}$ at 1600 rpm. A superior ORR performance of the catalysts is from immobilized Pd catalysts, while the doped carbon supports provide favorable local coordination environments to boost a catalytic activity of Pd.

FIG. 29A and FIG. 29B depict an ORR performance of commercial Pt/C and Pd/C after N&F coordination including LSVs at various rotating speeds. FIG. 29C depicts an ORR performance of commercial Pt/C and Pd/C after N&F coordination including LSVs at 1600 rpm. FIG. 29D depicts an ORR performance of commercial Pt/C and Pd/C after N&F coordination including a comparison of half-wave potential ($E_{1/2}$) and corresponding $E_{1/2}$ enhancement factor ($\chi$, %).

FIG. 30A depicts an EOR activity of the catalysts including CVs of the samples with F-coordination. FIG. 30B depicts an EOR activity of the catalysts including without F-coordination. FIG. 30C depicts an EOR activity of the catalysts including CVs of commercial Pd/C and Pt/C. FIG. 30D depicts an EOR activity of the catalysts including EOR onset potential. FIG. 30E depicts an EOR activity of the catalysts including a peak potential. FIG. 30F depicts an EOR activity of the catalysts including a peak current density. The "A-K" in (d-e) represent Pd/N&F-C, Pd/P&F-C, Pd/S&F-C, Pd/B&F-C, Pd/N-C, Pd/P-C, Pd/S-C, Pd/B-C, Pd/F-C, commercial Pd/C, and Pt/C, respectively.

FIG. 31A graphically depicts an EOR stability tests of the catalysts with F-coordination, with the CVs of the initial stability test and the stability test after 10,000 cycles for Pd/N&F-C. FIG. 31B graphically depicts an EOR stability tests of the catalysts with F-coordination, with the CVs of the initial stability test and the stability test after 10,000 cycles for Pd/P&F-C. FIG. 31C graphically depicts an EOR stability tests of the catalysts with F-coordination, with the CVs of the initial stability test and the stability test after 10,000 cycles for Pd/S&F-C. FIG. 31D graphically depicts an EOR stability tests of the catalysts with F-coordination, with the CVs of the initial stability test and the stability test after 10,000 cycles for Pd/B&F-C. FIG. 31E graphically depicts an EOR stability tests of the catalysts with F-coordination, with the CVs of the initial stability test and the stability test after 10,000 cycles for commercial Pd/C. FIG. 31F graphically depicts an EOR stability tests of the catalysts with F-coordination, with the CVs of the initial stability test and the stability test after 10,000 cycles for commercial Pt/C.

FIG. 32A depicts an EOR stability tests of the catalysts without F-coordination, with the CVs of the initial stability test and the stability test after 10,000 cycles for Pd/N-C. FIG. 32B depicts an EOR stability tests of the catalysts without F-coordination, with the CVs of the initial stability test and the stability test after 10,000 cycles for Pd/P-C. FIG. 32C depicts an EOR stability tests of the catalysts without F-coordination, with the CVs of the initial stability test and the stability test after 10,000 cycles for Pd/S-C. FIG. 32D depicts an EOR stability tests of the catalysts without F-coordination, with the CVs of the initial stability test and the stability test after 10,000 cycles for Pd/B-C. FIG. 32E depicts an EOR stability tests of the catalysts with mono-F-coordination, with the CVs of the initial stability test and the stability test after 10,000 cycles for Pd/F-C. FIG. 32F depicts the corresponding mass activity (MA) retention (%) after 10,000 cycles. Much lower MA retention was found on the catalysts without F-coordination and mono-F-coordinated catalysts compared with Pd/X&F-C, suggesting a synergism between F and other dopants (i.e., N, P, S, and B).

FIGS. 35A-35E depict a $^1$H nuclear magnetic resonance ("NMR") spectra of Pd/N&F-C, Pd/P&F-C, Pd/S&F-C, and Pd/B&F-C according to an embodiment of the present disclosure. FIG. 35A depicts a $^1$H NMR spectra of Pd/N&F-C in 1.0 M KOH+1.0 M ethanol solution. FIG. 35B depicts a $^1$H NMR spectra of Pd/P&F-C in 1.0 M KOH+1.0 M ethanol solution. FIG. 35C depicts a $^1$H NMR spectra of Pd/S&F-C in 1.0 M KOH+1.0 M ethanol solution FIG. 35D depicts a $^1$H NMR spectra of Pd/B&F-C in 1.0 M KOH+1.0 M ethanol solution. FIG. 35E depicts the FE of ethanol to acetate for the catalysts. The characteristic peak of acetate $(CH_3COO^-)$ at ~1.9 ppm for all four samples is barely visible, indicating the low $FE_{acetate}$ from EOR on these samples.

FIGS. 36A-36D depict a $^1$H NMR spectra of Pd/N-C, commercial Pd/C, and commercial Pt/C, according to an embodiment of the present disclosure. FIG. 36A depicts a $^1$H NMR spectra of Pd/N-C in 1.0 M KOH+1.0 M ethanol solution. FIG. 36B depicts a $^1$H NMR spectra of commercial Pd/C in 1.0 M KOH+1.0 M ethanol solution. FIG. 36C depicts a $^1$H NMR spectra of commercial Pt/C in 1.0 M KOH+1.0 M ethanol. The peak at ~1.9 ppm shown FIG. 36A and FIG. 36B is the characteristic peak of acetate $(CH_3COO^-)$ formed due to the incomplete EOR. FIG. 36D depicts the FE of ethanol to acetate for the catalysts. The analytes were collected from the electrolyte after continuous I-t tests for 3 hours.

FIGS. 37A-37E depict an electrochemical impedance spectroscopy (EIS) of the catalysts, according to an embodiment of the present disclosure. FIG. 37A and FIG. 37B depict an electrochemical impedance spectroscopy (EIS) of the catalysts showing Nyquist plots. FIG. 37C depicts an electrochemical impedance spectroscopy (EIS) of the catalysts showing Bode plots for the Pd/N&F-C at different potentials. FIG. 37D depicts an electrochemical impedance spectroscopy (EIS) of the catalysts showing Nyquist plots of the catalysts at 0.85 V. FIG. 37E depicts an electrochemical impedance spectroscopy (EIS) of the catalysts showing charge transfer resistance ($R_{CT}$) of the catalysts, as derived from FIG. 37D. The reduced $R_{CT}$ suggests improved EOR kinetics after F-coordination.

FIGS. 38A-38E depict an EOR performance of Pd/N&F-C (0.1%) and Pd/N&F-C (10%), according to an embodiment of the present disclosure. FIG. 38A and FIG. 38C depict an EOR performance of Pd/N&F-C (0.1%) and Pd/N&F-C (10%), specifically depicting the CVs of Pd/N&F-C (0.1%) and Pd/N&F-C (10%) tested in the Ar-saturated 1.0 M KOH solution. FIG. 38B and FIG. 38D depict an EOR performance of Pd/N&F-C (0.1%) and Pd/N&F-C (10%), specifically depicting the CVs of Pd/N&F-C (0.1%) and Pd/N&F-C (10%) tested in the Ar-saturated 1.0 M KOH+1.0 M ethanol solution. FIG. 38E depicts a ratio of the forward/backward peak current densities ($I_f/I_b$) of Pd/N&F-C (10%) and Pd/N&F-C (1%). No EOR activity was found on the Pd/N&F-C (0.1%) due to the unmet prerequisite to initiating EOR (i.e., at least three continuous Pd sites). The Pd/N&F-C (1%) shows a much higher $I_f/I_b$ than Pd/N&F-C (10%), indicating a much more efficient EOR to $CO_2$ and much less intermediate adsorbed on the catalysts surface.

FIGS. 39A-39B depict an DEFCs performance and stability of Pd/N&F-C, Pd/N-C, commercial Pd/C, and Pt/C, according to an embodiment of the present disclosure. FIG. 39A depicts an DEFCs performance and stability of Pd/N&F-C, Pd/N-C, commercial Pd/C, and Pt/C specifically showing polarization (i.e., solid line) and power density (i.e., dashed line) curves. FIG. 39B depicts an DEFCs performance and stability of Pd/N&F-C, Pd/N-C, commercial Pd/C, and Pt/C, specifically showing stability tests of DEFCs at 0.45 V. The current and power densities were normalized by the PGMs loading on membrane electrode assembly. The anode electrolyte is 1 M KOH+2 M ethanol with a flow rate of 20 mL min$^{-1}$, and cathode was fed with oxygen with 200 mL min$^{-1}$ without backpressure.

FIGS. 40A-40D depict a charge-to-product balance from ethanol to carbonate and acetate from single electrochemical cell operation at different potentials, according to an embodiment of the present disclosure. FIG. 40A depicts a charge-to-product balance from ethanol to carbonate and acetate from single electrochemical cell operation at different potentials specifically showing an anode polarization curves (black) and overall electrochemical cell polarization curves (blue) of DEFC with an external reference Hg/HgO electrode (Pd/N&F-C as both anode and cathode catalysts, the anode electrolyte is 1M KOH+2 M ethanol with a flow rate of 20 mL min$^{-1}$, and the cathode was fed with oxygen with 200 mL min$^{-1}$ without backpressure). FIG. 40B depicts a charge-to-product balance from ethanol to carbonate and acetate from single electrochemical cell operation at different potentials specifically showing an i-t test of DEFCs operated in glove box using Pd/N&F-C as catalyst operated in different potentials. FIG. 40C depicts a charge-to-product balance from ethanol to carbonate and acetate from single electrochemical cell operation at different potentials specifically showing an NMR results of DEFCs using Pd/N&F-C operated at different potentials for 3 hours. FIG. 40D depicts a charge-to-product balance from ethanol to carbonate and acetate from single electrochemical cell operation at different potentials specifically showing a Faradic efficiency of EOR to CO$_2$ and acetate on Pd/N&F-C operated at different potentials.

FIGS. 43A-43J depict a Faradic efficiency of DEFC with different catalysts, according to an embodiment of the present disclosure. FIG. 43A depicts a Faradic efficiency of DEFC with different catalysts, specifically showing an i-t test of DEFCs operated in glove box using Pd/N&F-C, Pd/N-C, Pd/C and Pt/C. FIG. 43C depicts a Faradic efficiency of DEFC with different catalysts, specifically showing an i-t test of DEFCs operated in glove box using Pd/P&F-C and Pd/P-C. FIG. 43E depicts a Faradic efficiency of DEFC with different catalysts, specifically showing an i-t test of DEFCs operated in glove box using Pd/S&F-C and Pd/S-C. FIG. 43G depicts a Faradic efficiency of DEFC with different catalysts, specifically showing an i-t test of DEFCs operated in glove box using Pd/B&F-C and Pd/B-C as catalysts, respectively. FIG. 43B, FIG. 43D, FIG. 43F, and FIG. 43H depict the corresponding optical photo of electrolyte before and after titration. FIG. 43I depicts the NMR results of DEFCs using different samples at 0.45 V after 3 hours, the chemical shift at δ=1.9 ppm is the typical acetate peaks. FIG. 43J depicts the Faradic efficiency of EOR to CO$_2$ and acetate on all samples. The anode electrolyte of DEFC is 1 M KOH+2M ethanol with a flow rate of 20 mL min$^{-1}$, and cathode was fed with oxygen with 200 mL min$^{-1}$ without backpressure. After potentiostatic i-t testing (0.45 V) for three hours, 30 mL post-reaction electrolyte was used for titration while 0.5 mL was used for NMR test.

FIGS. 44A-44C depict a carbon support corrosion rates in the DEFCs cathodes, according to an embodiment of the present disclosure. FIG. 44A depicts a carbon support corrosion rates in the DEFCs cathodes with GC-FID results after continuous operation of DEFCs for 100 hours (the peaks at 11.38, 12.93, 16.34, 20.51, and 21.20 min correspond to C$_2$H$_4$, C$_2$H$_6$, C$_2$H$_2$, CH$_4$, and CO, respectively). FIG. 44B depicts a carbon support corrosion rates in the DEFCs cathodes with enlarged regions of CO peaks. FIG. 44C depicts a carbon support corrosion rates in the DEFCs cathodes with carbon corrosion rates of the catalysts. The corrosion rate of Pd/N&F-C is much lower than those of the control samples, indicating the enhanced anti-corrosion property of carbon supports.

FIGS. 45A-45F depict a DEFCs performance and stability of the catalysts, according to an embodiment of the present disclosure. FIG. 45A depicts a DEFC's performance and stability of the catalysts with polarization (i.e., solid line) and power density (i.e., dashed line) curves of Pd/P&F-C and Pd/P-C. FIG. 45B depicts a DEFC's performance and stability of the catalysts with polarization (i.e., solid line) and power density (i.e., dashed line) curves of) Pd/S&F-C and Pd/S-C. FIG. 45C depicts a DEFC's performance and stability of the catalysts with polarization (i.e., solid line) and power density (i.e., dashed line) curves of Pd/B&F-C and Pd/B-C. FIG. 45D depicts a DEFC's performance and stability of the catalysts with stability tests of DEFC's at 0.45 V are shown for Pd/P&F-C and Pd/P-C. FIG. 45E depicts a DEFC's performance and stability of the catalysts with stability tests of DEFCs at 0.45 V are shown for Pd/S&F-C and Pd/S-C. FIG. 45F depicts a DEFC's performance and stability of the catalysts with stability tests of DEFCs at 0.45 V are shown for Pd/B&F-C and Pd/B-C. The current and power densities were normalized by the geometric areas of the membrane electrode assembly. The anode electrolyte of DEFC is 1 M KOH+2M ethanol with a flow rate of 20 mL min$^{-1}$, and cathode was fed with oxygen with 200 mL min$^{-1}$ without backpressure.

FIGS. 46A-46D depict a DEFCs performance of the catalysts with a low anode electrolyte flow rate, according to an embodiment of the present disclosure. FIG. 46A depicts a DEFC's performance of the catalysts with a low anode electrolyte flow rate, showing specifically steady-state DEFC's polarization (i.e., solid line) and power density (i.e., dashed line) curves of Pd/N&F-C, Pd/N-C, Pd/C, and Pt/C. FIG. 46B depicts a DEFC's performance of the catalysts with a low anode electrolyte flow rate, showing specifically steady-state DEFC's polarization (i.e., solid line) and power density (i.e., dashed line) curves of Pd/P&F-C and Pd/P-C. FIG. 46C depicts a DEFC's performance of the catalysts with a low anode electrolyte flow rate, showing specifically steady-state DEFC's polarization (i.e., solid line) and power density (i.e., dashed line) curves of Pd/S&F-C and Pd/S-C. FIG. 46D depicts a DEFC's performance of the catalysts with a low anode electrolyte flow rate, showing specifically steady-state DEFC's polarization (i.e., solid line) and power density (i.e., dashed line) curves of Pd/B&F-C and Pd/B-C. The temperature is 60° C., the anode electrolyte is 1M KOH+2 M ethanol with a flow rate of 5 mL min$^{-1}$, and cathode was fed with oxygen with 200 mL min$^{-1}$ without backpressure.

FIGS. 49A-49C depict a SEM, an EDX-mapping, and an elemental content of NiMn/N&F-C, according to an embodiment of the present disclosure. FIG. 49A depicts an SEM of NiMn/N&F-C. FIG. 49B depicts an EDX-mapping of NiMn/N&F-C. FIG. 49C depicts an elemental content of NiMn/N&F-C.

FIGS. 50A-50E depict an XPS spectrum of NiMn/N&F-C, according to an embodiment of the present disclosure. FIG. 50A depicts an XPS spectrum of NiMn/N&F-C with a survey. FIG. 50B depicts an XPS spectrum of NiMn/N&F-C with N 1s. FIG. 50C depicts an XPS spectrum of NiMn/N&F-C with C 1s. FIG. 50D depicts an XPS spectrum of NiMn/N&F-C with Ni 2p. FIG. 50E depicts an XPS spectrum of NiMn/N&F-C with Mn 2p.

FIGS. 51A-51D depict an ORR and DEFC performance of NiMn/N&F-C, according to an embodiment of the present disclosure. FIG. 51A depicts an ORR performance with ORR LSV curves of NiMn/N&F-C in $O_2$-saturated 0.1 M KOH solutions with a scan rate of 5 mV $s^{-1}$. FIG. 51B depicts an ORR performance with ORR LSV curves of different samples in $O_2$-saturated 0.1 M KOH solutions with a scan rate of 5 mV $s^{-1}$ at 1600 rpm. FIG. 51C depicts an ORR performance with ORR LSV curves of NiMn/N&F-C before and after 30 k cycles test. FIG. 51D depicts a DEFC performance using NiMn/N&F-C as cathode with a loading of 2 mg $cm^{-2}$, while Pd/N&F-C was used anode catalyst with a Pd loading of 0.3 mg $cm^{-2}$. The anode electrolyte is 1 M KOH+2 M ethanol with a flow rate of 20 ml $min^{-1}$, and the cathode was fed with oxygen with 200 ml $min^{-1}$ without backpressure. The test temperature is 60° C. and stable data was collected and used.

DETAILED DESCRIPTION OF THE INVENTION

Figure 1:
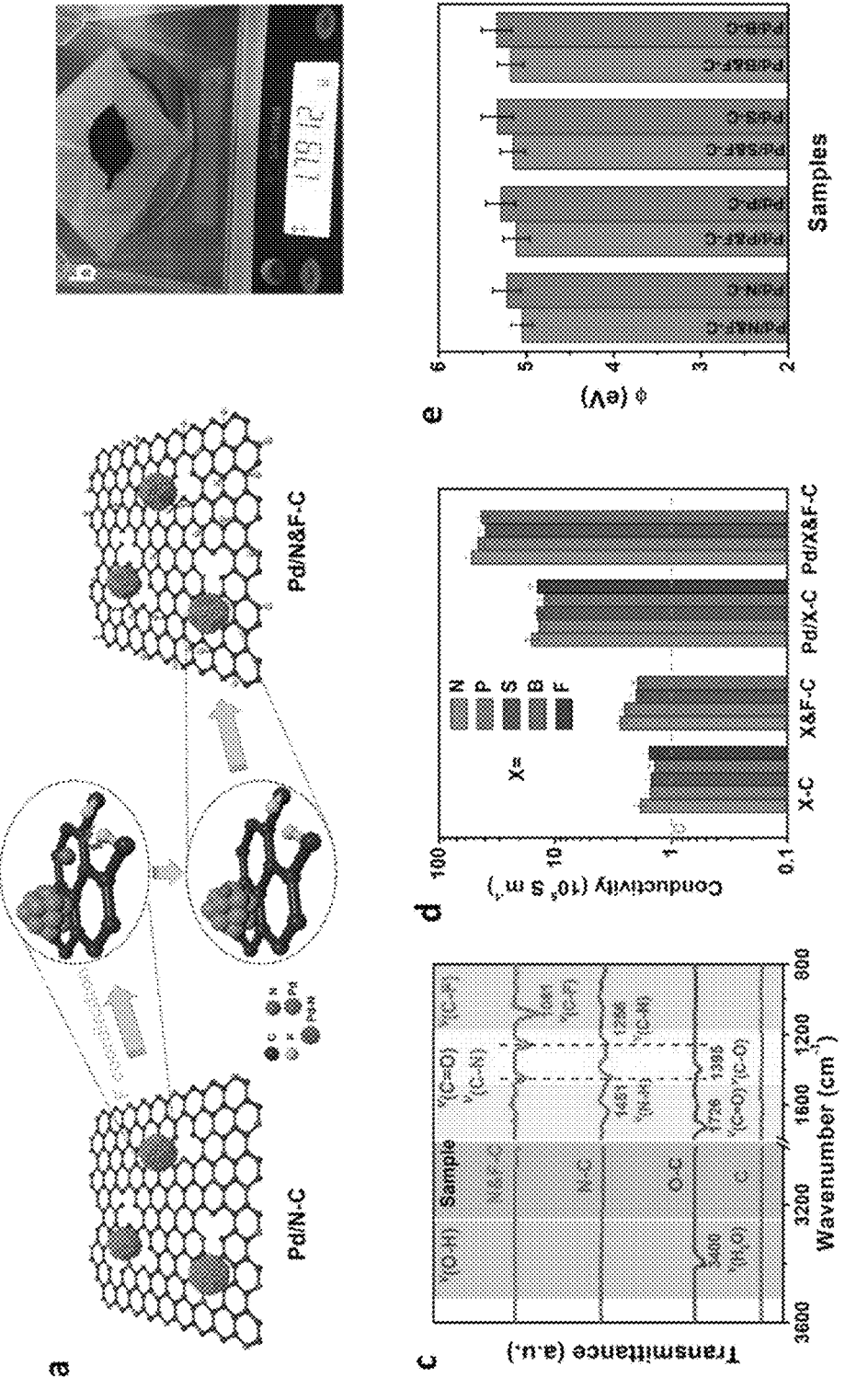
FIGS. 1A-1E depict a structural characterization of the local coordination environment of atoms within a cell, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification of for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments.

Definitions

Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supersedes any disclosure of an incorporated publication to the extent there is a contradiction.

As used herein, the singular forms "a," "an" and "the" include plural referents unless the context clearly dictates otherwise.

As used in this specification and the appended claims, the term "or" is generally employed in its sense including "and/or" unless the context clearly dictates otherwise.

As used herein, the term "comprising" is intended to mean that the products, compositions, and methods include the referenced components or steps, but not excluding others. "Consisting essentially of" when used to define products, compositions, and methods, shall mean excluding other components or steps of any essential significance. "Consisting of" shall mean excluding more than trace elements of other components or steps.

As used herein, the term "electrochemical cell" refers to any apparatus known in the art which generates electrical energy from chemical reactions and/or uses electrical energy to cause chemical reactions. The electrochemical cell may comprise a polymer electrolyte membrane fuel cell, a direct alcohol (ethanol) fuel cell, a direct methanol fuel cell, an alkaline fuel cell, a phosphoric acid fuel cell, a hydrogen fuel cell, an electrochemical cell comprising water electrolysis, an electrochemical cell comprising $CO_2$ reduction, and/or any electrochemical cell known in the art. For ease of reference, the exemplary embodiment described herein refers to a direct alcohol (ethanol) fuel cell, but this description should not be interpreted as exclusionary of other electrochemical cells.

As used herein, the term "M-X-C structure" refers to any chemical structure known in the art in which a fluorine atom may be introduced to the LCE site and inhibit a nonmetallic chemical element from occupying the LCE site. The metal ("M") of the M-X-C structure may comprise palladium, platinum, nickel, manganese, nitrogen, platinum, and/or any metallic chemical element and/or any transition metallic chemical element known in the art, which may stably bond to a nonmetallic chemical element and a carbon. The non-mental ("X") of the M-X-C structure may comprise phosphorus, sulfur, boron, and/or any nonmetal known in the art, which may stably bond to a metallic chemical element and a carbon. For ease of reference, the exemplary embodiment, described herein, refers to palladium, but this description should not be interpreted as exclusionary of other metals ("M"). Additionally, for ease of reference, the exemplary embodiment, described herein, refers to nitrogen, but this description should not be interpreted as exclusionary of other nonmetals ("X").

As used herein, the term "M-X moiety" refers to any stably bonded metal-nonmetal molecule known in the art, which may be created within a metal-nonmetal carbon catalyst. The metal ("M") of the M-X moiety may comprise palladium, platinum, nickel, manganese, nitrogen, platinum, and/or any metal known in the art, which may stably bond to a nonmetallic chemical element. The nonmetal ("X") of the M-X moiety may comprise phosphorus, sulfur, boron, and/or any nonmetal known in the art, which may stably bond to a metallic chemical element. For ease of reference, the exemplary embodiment described herein refers to palladium, but this description should not be interpreted as exclusionary of other metals ("M"). Additionally, for ease of reference, the exemplary embodiment described herein refers to nitrogen, but this description should not be interpreted as exclusionary of other nonmetals ("X").

As used herein, "about" means approximately or nearly and in the context of a numerical value or range set forth means±15% of the numerical.

All numerical designations, such as pH, temperature, time, concentration, and molecular weight, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of one or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of one or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Fluorinated Electrocatalyst:

The present disclosure pertains to a fluorinated electrocatalyst and method of regulating a local coordination environment (hereinafter "LCE") sites within the electrochemical cell. In an embodiment, the present disclosure may regulate LCE sites within the electrochemical cell by creating catalytic metal-nonmental (hereinafter "M-X") moieties within the metal-nonmetal-carbon (hereinafter "M-X-C") structure, such that a fluorine atom may be introduced to the LCE site, forming a fluorine-doped metal-nonmetal-carbon construct (hereinafter "M/X&F-C").

As shown in FIG. 1A, in an embodiment, the introduction of the fluorinated catalyst to the LCE site may weaken the C-X bonds and drive the X atoms to metal sites. Additionally, as shown in FIG. 1B, in an embodiment, a gram-scale approach may be developed to control a synthesis of the fluorinated electrocatalyst. In some embodiments, the development of the synthesis of the proposed fluorinated electrocatalyst, may be automated, such that a machine apparatus may measure the required components to synthesize the fluorinated electrocatalyst to participate in electrochemical reactions. The fluorinated electrocatalyst may also be used to participate in chemical reactions.

Figure 3:
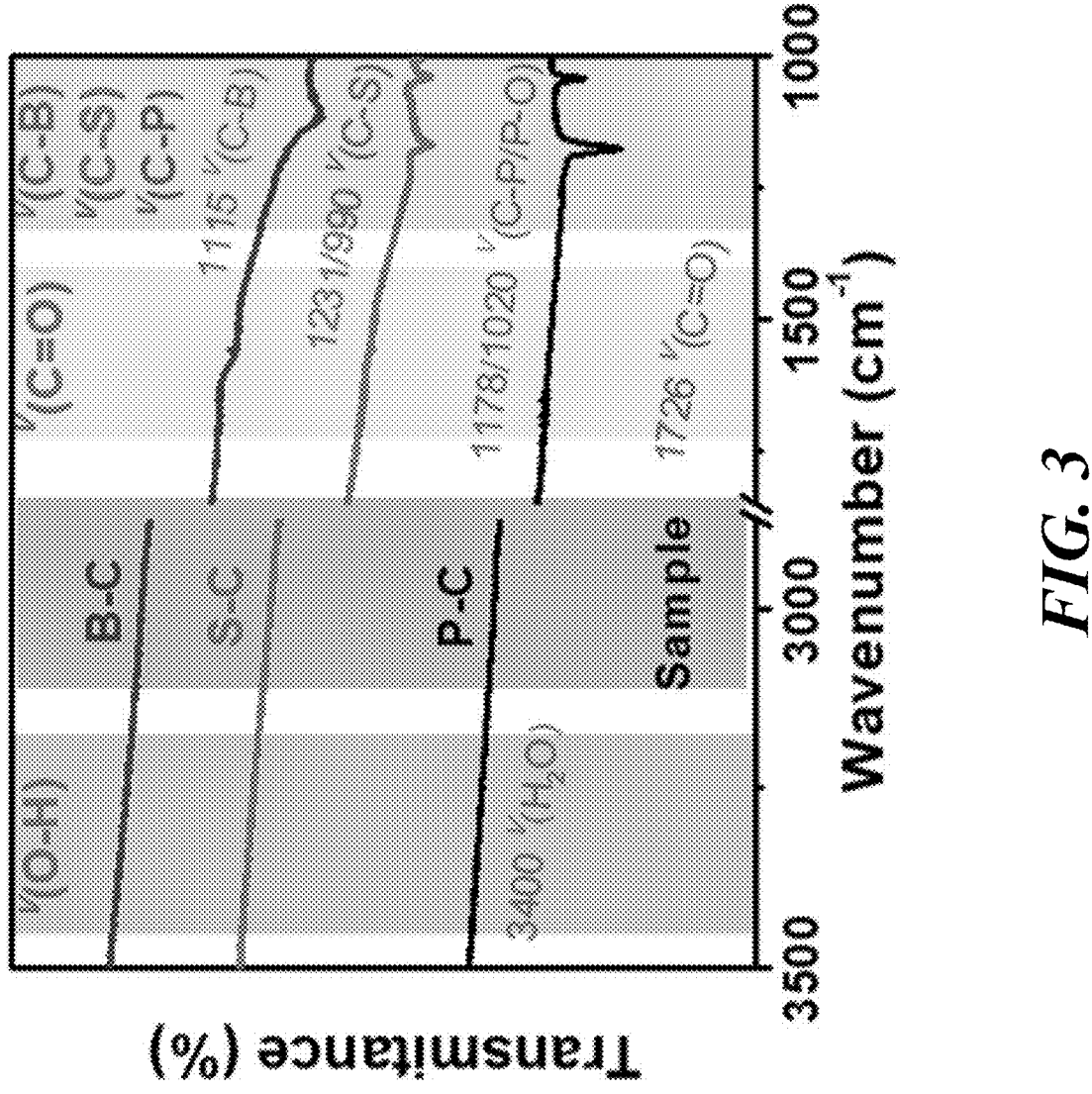
FIG. 3 depicts a FT-IR spectra of P-C, S-C, and B-C, with the surface functional groups detected from the P-C, S-C, and B-C indicating the regulated coordination environments achieved by the proposed treatments, according to an embodiment of the present disclosure.

Moreover, in an embodiment, the fluorinated electrocatalyst may incorporate sequential heteroatom-doping treatments in order to change the composition of the M-X-C structure. As shown in FIG. 1C and FIG. 3, the composition changes of the M-X-C structure may be depicted by the stretching vibration peaks of a carbon support (e.g., X-C and C-F) in a Fourier-transform infrared spectra. Additionally, as shown in FIGS. 4A-4C, an X-ray diffraction (XRD) patterns may be used to verify certain defections within a structure of the carbon support defective structure of carbon support in the catalysts.

Furthermore, in an embodiment, a trace amount of metal may be immobilized on a fluorine-doped carbon (hereinafter "X&F-C") support (e.g., M/N&F-C). Accordingly, in this embodiment, the X&F-C support may be synthesized from nitrogen, phosphorus, boron, sulfur, or any nonmetallic chemical element known in the art which may bond with carbon. In this manner, in some embodiments, X&F-C may include but is not limited to P&F-C, S&F-C, N&F-C, and B&F-C, synthesizing M/P&F-C, M/S&F-C, M/B&F-C, respectively.

In an embodiment, after metal loading a carbon support, the XRD patterns may depict the M/X&F-C construct with ultra-low loading. In this embodiment, without the presence of a metal peak due to the ultra-low loading, the M/X&F-C may comprise only a broad diffraction peak of defective carbon. Moreover, as shown in FIG. 1D, by fluorine-doping a heteroatom, the electrical conductivity of the M/X&F-C may increase, optimizing the regulation of the LCE site. Additionally, in this embodiment, work functions (hereinafter "WFs") may be significantly reduced while using a M/X&F-C as compared to the standardized M/X-C catalyst, as shown in FIG. 1E and FIGS. 5A-5H. Accordingly, the increase in electrical conductivity and WFs reduction indicated the optimization of electron transfer by F-doping for the associated electrochemical reactions. FIGS. 6A-9F depict an X-ray photoelectron spectroscopy (XPS) of M 3d profiles, which reveal the increased M contents in the fluorinated electrocatalyst, according to an embodiment of the present disclosure. As shown in the examples below, FIGS. 6A-9F provide an exemplary configuration comprising M 3d profiles as the metal used. The M 3d profiles were shown with increased $M^{2+}$ contents the F-doped catalyst. Accordingly, in this embodiment, the increase in M contents indicate the strengthened M-X interactions after F-doping. In this manner, the higher binding energies on the M/X&F-C as compared to the binding energies on the M/X-C and the M indicates M-X electronic interactions.

In an embodiment, the fluorine-doped electrocatalyst may further include multiple anchoring sites to immobilize the M on the carbon support. The presence of the multiple anchoring sites attributes to the extraordinary electrochemical activity and stability of the fluorinated electrocatalyst. Further, in this embodiment, the presence of the multiple anchoring sites may attribute to the extraordinary chemical activity and stability of the M/X&F-C. Accordingly, the under-coordination surface atoms of the metal in the M/X&F-C and the electronic interaction of M-X may lower the M 3d energy level. In this embodiment, the surface M-X formed on the M nanoparticles may inhibit the mobility and aggregation of M nanoparticles, and therefore avoid the Ostwald ripening. As such, the improved oxygen conversion efficiency to $OH^-$ and the reduced $H_2O_2$ yield enable the exceptional electrochemical stability of M/X&F-C. Additionally, in some embodiments, the improved oxygen conversion efficiency to $OH^-$ and the reduced $H_2O_2$ yield may enable the exceptional chemical stability of fluorinated electrocatalyst with significant ORR performance.

Figure 2:
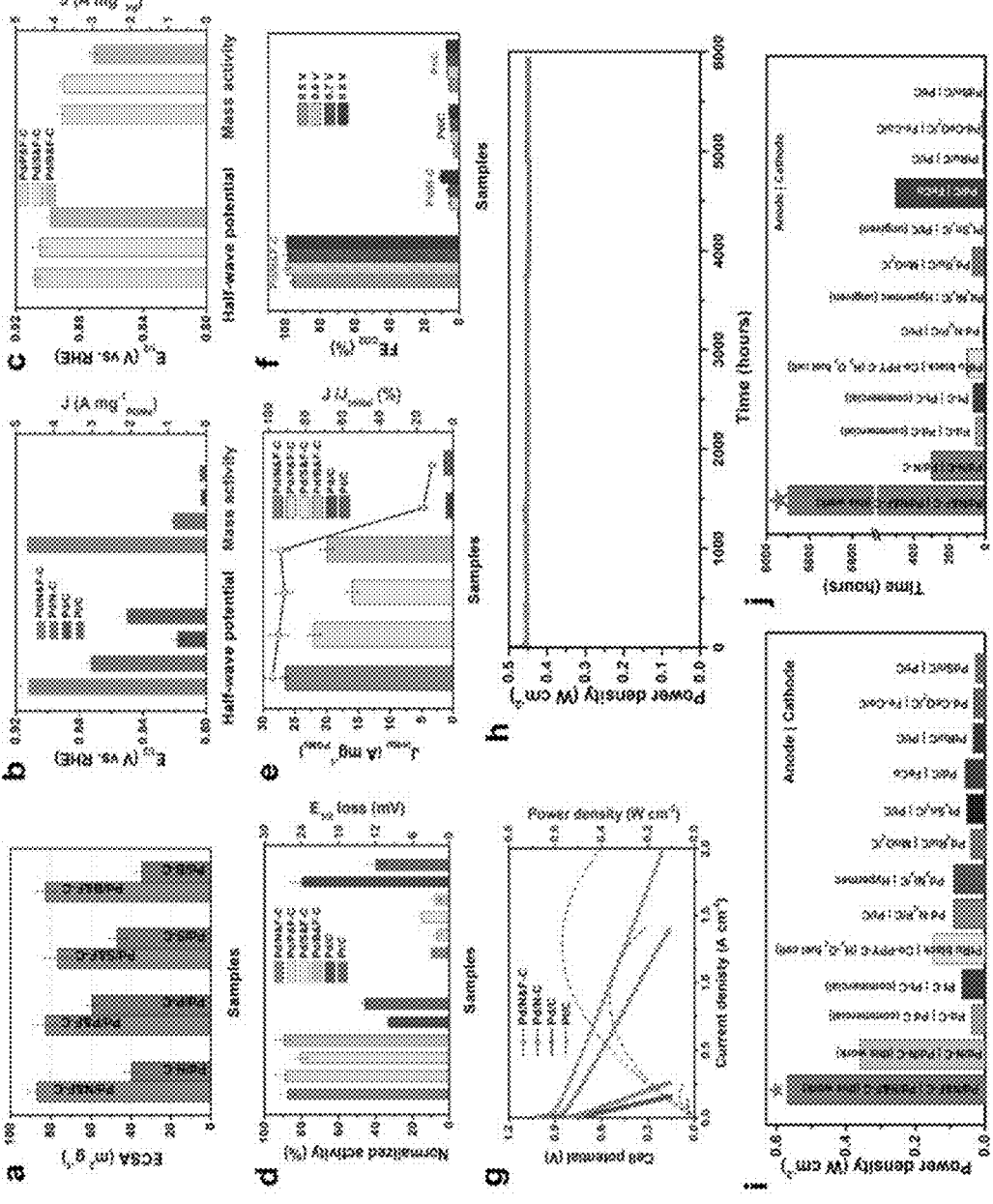
FIGS. 2A-2J graphically depict an electrochemical ORR, EOR, and DEFCs performances of the local coordination environment of atoms within a cell, according to an embodiment of the present disclosure.

Another aspect of the fluorinated electrocatalyst is that the fluorine atoms within the M/X&F-C may push the X atoms away from the defect sites and towards the M, resulting in the surface enrichment of X. Such surface X-rich layer may clean the M surface by removing CO at a low potential through a reaction, including but not limited to an oxidation reaction. The removal of CO is essential for many catalytic reactions, including but not limited to ORR and small molecule oxidation reactions. For example, many times, the ORR occurs at the cathode of an electrochemical cell and comprise substantially slow kinematics. In this embodiment, the fluorinated electrocatalyst may optimize the catalytic reactions through the increased removal of CO at the low potential. Moreover, in this embodiment, as the X atoms are pushed towards the M atoms, via repulsion by the fluorine atoms in the LCE site, such that M-X moieties may be created. Furthermore, as shown in FIG. 2A and FIGS. 12A-12K, the fluorinated electrocatalyst may impact an increased specific surface area of an electrochemical cell. Accordingly, the activation area of the electrochemical cell may be increased as the specific surface area of the electrochemical cell is increased. In this embodiment, the surface area used within an electrochemical cell comprising the fluorinated electrocatalyst may be estimated from the CO stripping, as shown in FIGS. 12A-12K, which was significantly higher than presented in the commercial catalysts, as depicted in FIG. 2A. Additionally, in some embodiments, the M/X&F-C requires less energy to conduct the catalytic reaction, as the potential required for the reaction is substantially reduced through the fluorinated electrocatalyst.

Additionally, in an embodiment, the introduction of the fluorinated electrocatalyst to the electrochemical cell may improve the anti-corrosion property of the carbon support of the M/X&F-C. In this manner, as shown in FIG. 26A, the electron transfer number for the fluorinated electrocatalyst catalysts was determined to be roughly 4.0 with a $H_2O_2$ yield of less than 1%, as shown in FIG. 26B. In this embodiment, the fluorinated electrocatalyst may provide a direct 4-e pathway for the catalytic reaction, with negligible byproducts, which may include but are not limited to, ethanol, acetate, water, oxygen, carbon monoxide, carbon dioxide, carbon trioxide, methane, or any other byproduct known in the art. Accordingly, the fluorinated electrocatalyst may eliminate the nucleophilic attack of the electrochemical cell, such that the anti-corrosion property of the carbon support is increased. In some embodiments, the fluorinated electrocatalyst may increase the anti-corrosion property of any electron-deficient species present within the electrochemical cell.

Figure 28:
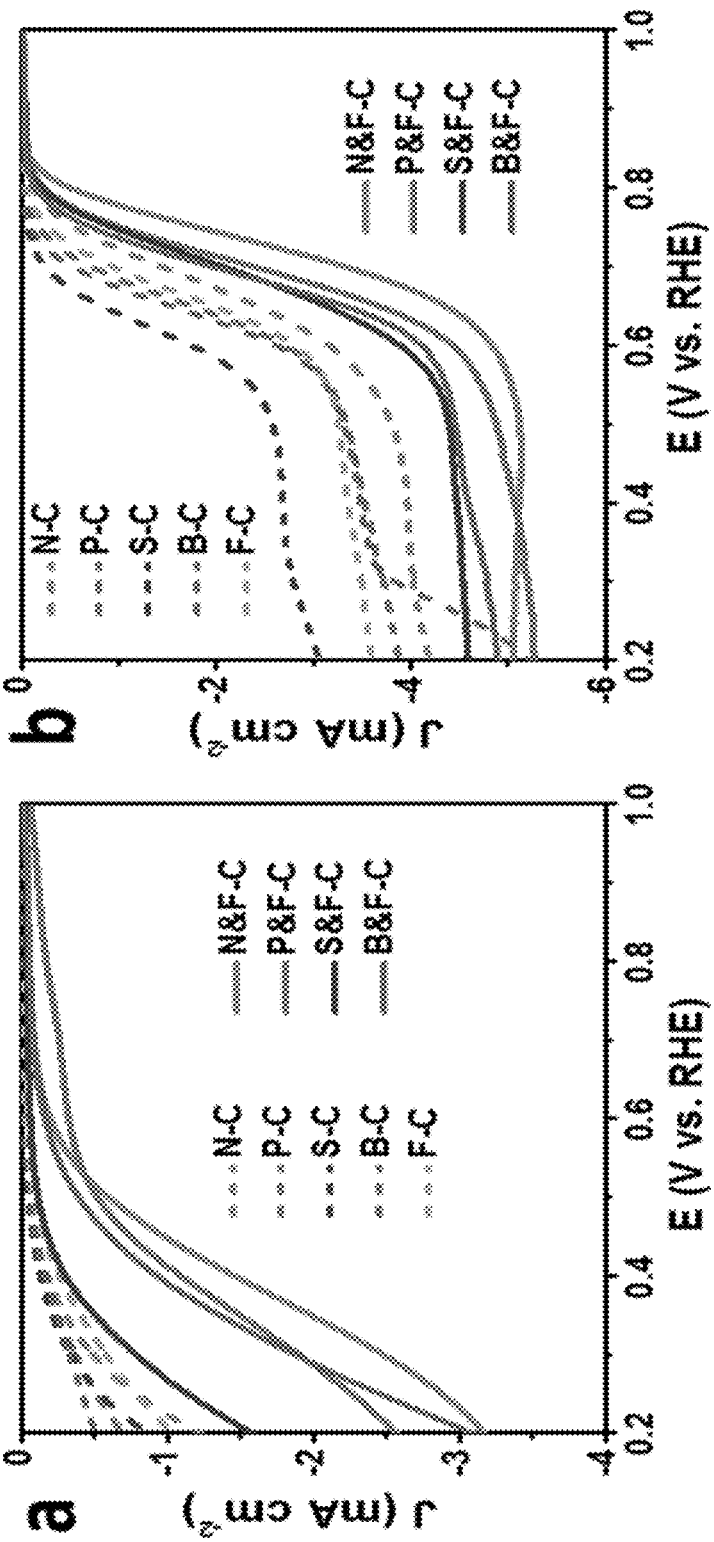
FIGS. 28A-28B depict an ORR performance of heteroatom X-doped carbon supports (X-C and X&F-C, X=N, P, S, B), according to an embodiment of the present disclosure.
Figure 29:
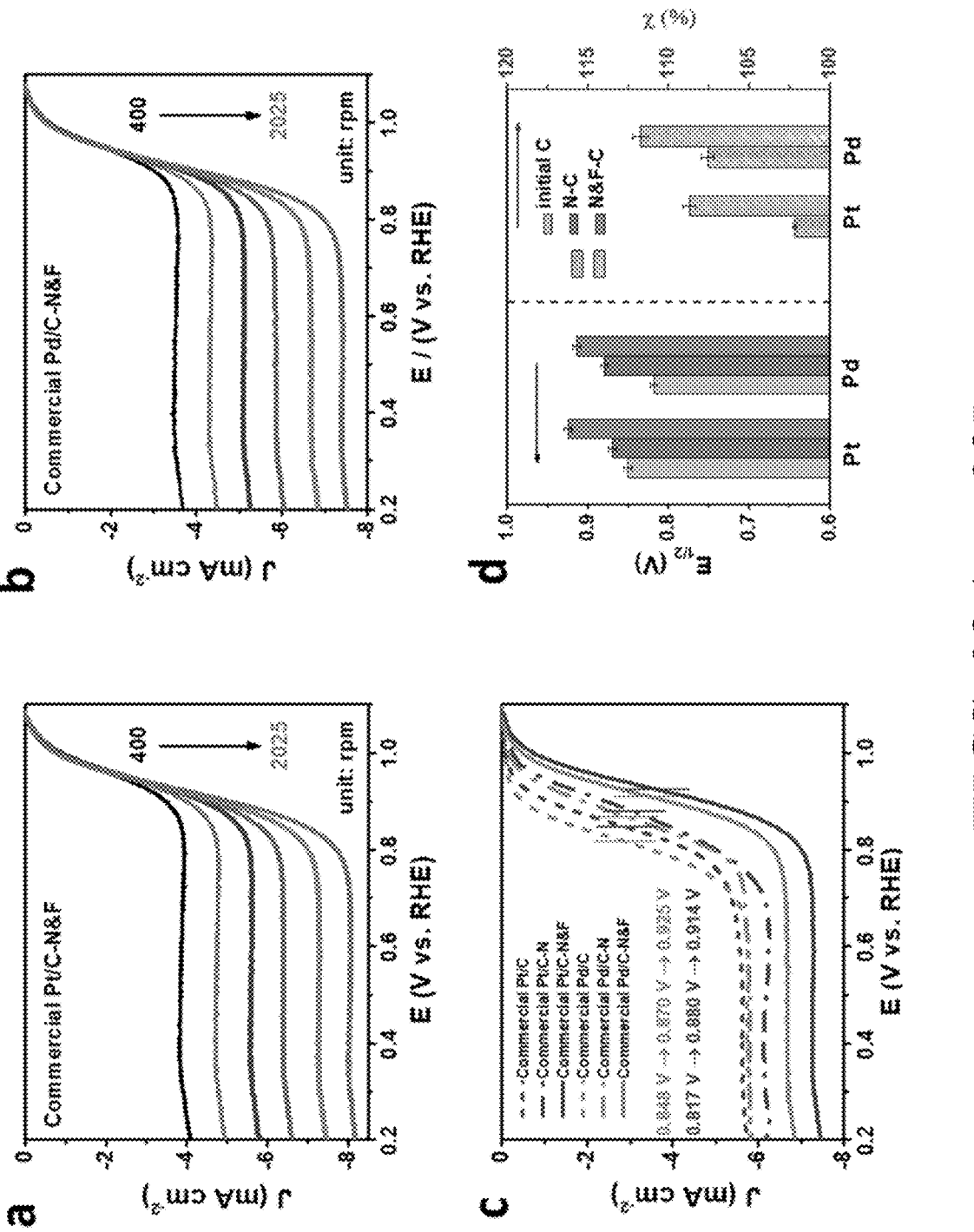
FIGS. 29A-29D depict an ORR performance of commercial Pt/C and Pd/C after N&F coordination, according to an embodiment of the present disclosure.

FIG. 2D depicts the accelerated stability test of the fluorinated electrocatalyst, according to an embodiment of the present disclosure. In an embodiment, the fluorinated electrocatalyst may be configured to have MA retentions of at least 90% for at least 10,000 cycles. In this embodiment, the fluorinated electrocatalyst may be configured to have MA retentions of at least 90% for at least 20,000 cycles. In some embodiments, the fluorinated electrocatalyst may be configured to have MA retentions of at least 90% for at least 30,000 cycles. Additionally, as shown in FIG. 2D, in these other embodiments, the fluorinated electrocatalyst may be configured to have degradation in $E_{1/2}$ of at most 5 mV, while commercial catalysts have been found having degradation in $E_{1/2}$ of at least 45 mV. Furthermore, in an embodiment, as shown in FIGS. 28A-28B, the X-C and X&F-C support without loading M may also have inferior ORR performance confirming that the ORR activity may be mainly from the M active sites of the M/X&F-C within the fluorinated electrocatalyst.

Figure 30:
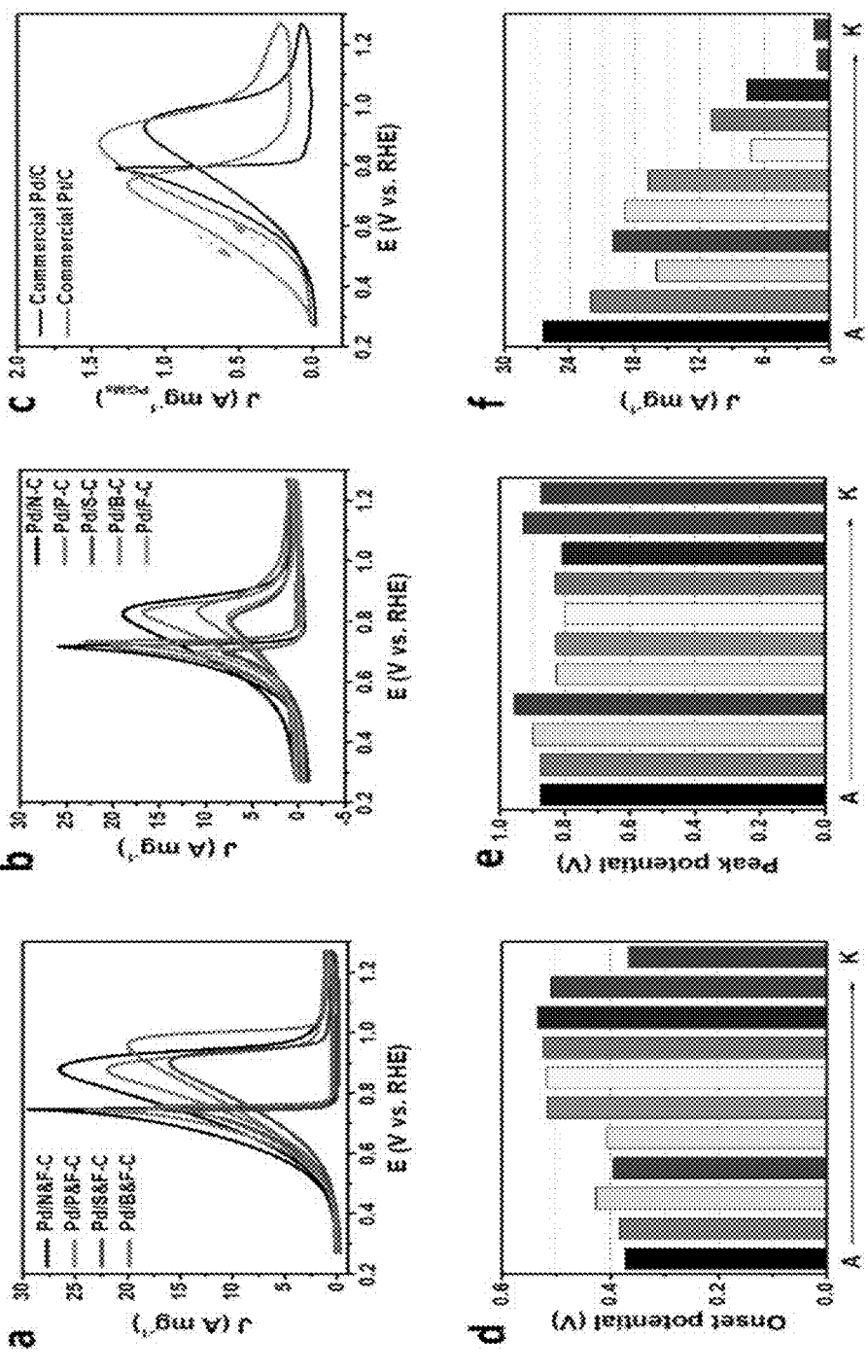
FIGS. 30A-30F depict an ethanol oxidation reaction ("EOR") activity of the catalysts, according to an embodiment of the present disclosure.
Figure 31:
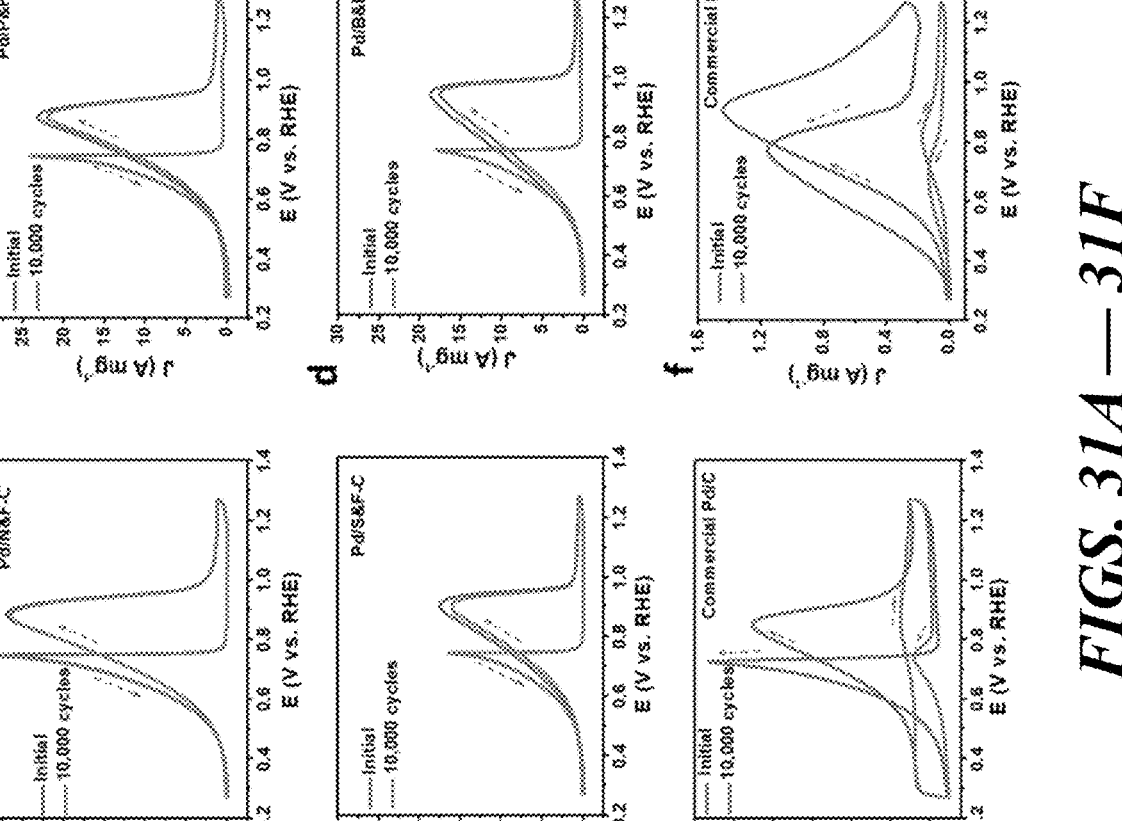
FIGS. 31A-31F graphically depict an EOR stability tests of the catalysts with F-coordination, with the CVs of the initial stability test and the stability test after 10,000 cycles, according to an embodiment of the present disclosure.

FIG. 30A depicts an ethanol oxidation reaction (EOR) activity of the fluorinated electrocatalyst and the commercial catalysts, according to an embodiment of the present disclosure. In an embodiment, the fluorinated electrocatalyst may be configured to decrease the activation barrier of the EOR. In an embodiment, as shown in FIG. 30D, the fluorinated electrocatalyst may have an onset potential of with a negative shift of at most 0.17 V as compared to the commercial catalysts, Pd/N-C and Pd/C, respectively.

Additionally, as shown in FIG. 2F, in an embodiment, a Faradaic efficiency (FE) of at least 90% was detected for M/X&F-C within a range of 0.1-1.0 V with $CO_2$ as the main product, similar to the other fluorinated electrocatalysts, as shown in FIGS. 34A-35E. In some embodiments, the fluorinated electrocatalyst may comprise the FE of at least 20% within a range of 0.1-1.0 V, encompassing every integer in between, with $CO_2$ as the main product. In some embodiments, the fluorinated electrocatalyst may comprise the FE of at least 30% within a range of 0.1-1.0 V, encompassing every integer in between, with $CO_2$ as the main product. In some embodiments, the fluorinated electrocatalyst may comprise the FE of at least 40% within a range of 0.1-1.0 V, encompassing every integer in between, with $CO_2$ as the main product. In some embodiments, the fluorinated electrocatalyst may comprise the FE of at least 50% within a range of 0.1-1.0 V, encompassing every integer in between, with $CO_2$ as the main product. In some embodiments, the fluorinated electrocatalyst may comprise the FE of at least 60% within a range of 0.1-1.0 V, encompassing every integer in between, with $CO_2$ as the main product. In some embodiments, the fluorinated electrocatalyst may comprise the FE of at least 70% within a range of 0.1-1.0 V, encompassing every integer in between, with $CO_2$ as the main product. In some embodiments, the fluorinated electrocatalyst may comprise the FE of at least 80% within a range of 0.1-1.0 V, encompassing every integer in between, with $CO_2$ as the main product. In some embodiments, the fluorinated electrocatalyst may be configured to have a FE of at least 95% within a range of at least 0.1 V to 1.0 V, encompassing every integer in between, with $CO_2$ as the main product. Additionally in these other embodiments, the main product of the fluorinated electrocatalyst may include but is not limited to CO, $H_2O$, ethanol, acetate or any other byproduct known in the art. In contrast, as depicted in FIG. 2F, the Pd/N-C, Pd/C, and Pt/C show much lower $FE_{CO_2}$ of below 20% with acetate as the main product.

FIGS. 37A-37E depict an electrochemical impedance spectroscopy of the fluorinated electrocatalyst according to an embodiment of the present disclosure. In an embodiment, the M/X&F-C, through fluorine-doping, the fluorinated electrocatalyst may completely cleave C-C, such that CO is easily removably from the system. Moreover, the fluorinated electrocatalyst may be configured to greatly reduce charge transfer resistance, facilitating EOR kinetics. In this embodiment, the fluorinated electrocatalyst may be configured to resist CO poisoning. The CO poisoning may include but is not limited to a nucleophilic attack or any other CO poisoning known in the art.

As shown in FIG. 2G, FIG. 39A, and FIGS. 40A-40D, in an embodiment, the fluorinated electrocatalyst may comprise an open-circuit voltage (hereinafter "OCV") of at least 1.10 V, which is close to the theoretical value of 1.14 V. In some embodiments, the fluorinated electrocatalyst may comprise the OCV of at least 1.00 V. In some embodiments, the fluorinated electrocatalyst may comprise the OCV of at least 1.02 V. In some embodiments, the fluorinated electrocatalyst may comprise the OCV of at least 1.04 V. In some embodiments, the fluorinated electrocatalyst may comprise the OCV of at least 1.06 V. In some embodiments, the fluorinated electrocatalyst may comprise the OCV of at least 1.08 V. Accordingly, in this embodiment, the increased OCV may enable a high cell efficiency and a high power density at a low applied load. In this manner, as shown in FIGS. 40A-40D, the anode potentials may be in the range of the potentials applied in the three-electrode system. In an embodiment, the anode potentially may be in the range of the potentials applied in the four-electrode system. Furthermore, as shown in FIG. 2I, in this embodiment, the fluorinated electrocatalyst may comprise a current density and a peak power density nearly identical to the magnitude of the electrochemical cell.

Figure 42:
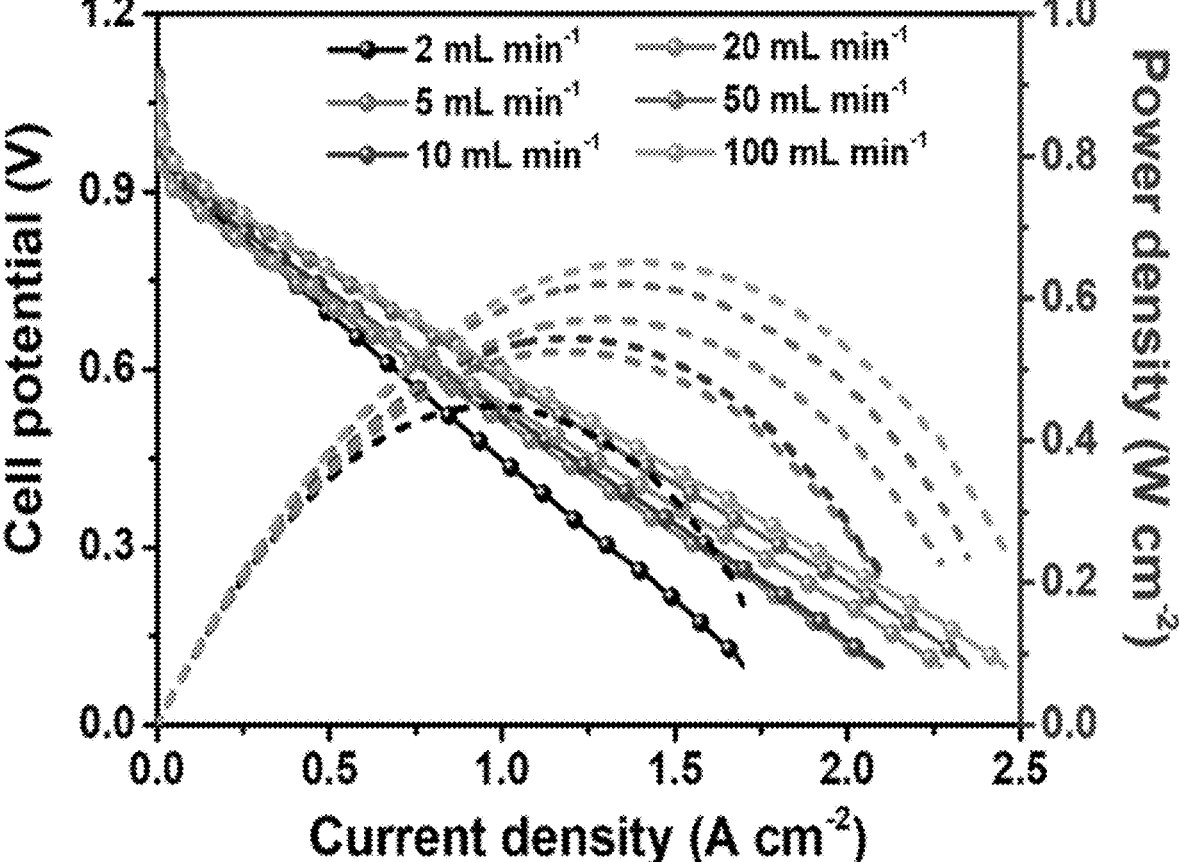
FIG. 42 depicts an effect of anode electrolyte flow rate (2 to 100 mL min$^{-1}$) on the DEFC performance at 60° C., according to an embodiment of the present disclosure. The Pd/N&F-C was used as both anode and cathode catalysts. The anode electrolyte was 1 M KOH+2 M ethanol, and the cathode was fed with oxygen with 200 mL min$^{-1}$ without backpressure.

FIG. 42 depicts an effect of anode electrolyte flow rate on the electrochemical cell performance, according to an embodiment of the present disclosure. In an embodiment, a polarization loss of the electrochemical cell may come from the anode EOR due to a sluggish 12-electron pathway. While the high anode electrolyte flow rate may minimize the mass transfer limitation and reduce the negative effect of the generated $CO_2$. Accordingly, as shown in FIG. 2H and FIG. 2J, in this embodiment, the fluorinated electrocatalyst may be configured to be operated continuously in the electrochemical cell for more than 5,900 hours, much longer than recently reported various electrochemical cells. In some embodiments, the fluorinated electrocatalyst may be operated continuously in the electrochemical cell for at least 4,000 hours. In some embodiments, the fluorinated electrocatalyst may be operated continuously in the electrochemical cell for at least 5,000 hours. In some embodiments, the fluorinated electrocatalyst may be operated continuously in the electrochemical cell for at least 6,000 hours. In some embodiments, the fluorinated electrocatalyst may be operated continuously in the electrochemical cell for at least 7,000 hours. In some embodiments, the fluorinated electrocatalyst may be operated continuously in the electrochemical cell for at least 8,000 hours. In some embodiments, the fluorinated electrocatalyst may be operated continuously in the electrochemical cell for at least 9,000 hours. In some embodiments, the fluorinated electrocatalyst may be operated continuously in the electrochemical cell for at least 10,000 hours.

Further, as shown in FIGS. 43A-43J, in an embodiment, the FE of the fluorinated electrocatalyst for EOR at the anode of electrochemical cell may be at least 90%, indicating a carbon balance with a complete 12-electron pathway. In some embodiments, the FE of the fluorinated electrocatalyst for EOR at the anode of electrochemical cell may be at least 20%. In some embodiments, the FE of the fluorinated electrocatalyst for EOR at the anode of electrochemical cell may be at least 30%. In some embodiments, the FE of the fluorinated electrocatalyst for EOR at the anode of electrochemical cell may be at least 40%. In some embodiments, the FE of the fluorinated electrocatalyst for EOR at the anode of electrochemical cell may be at least 50%. In some embodiments, the FE of the fluorinated electrocatalyst for EOR at the anode of electrochemical cell may be at least 60%. In some embodiments, the FE of the fluorinated electrocatalyst for EOR at the anode of electrochemical cell may be at least 70%. In some embodiments, the FE of the fluorinated electrocatalyst for EOR at the anode of electrochemical cell may be at least 80%. Additionally, in an embodiment, a carbon oxidation rate of the fluorinated electrocatalyst may be negligible during long-term operation. Therefore, the electrochemical cell performance degradation resulted from the oxidative corrosion of carbon support may be significantly reduced by fluorine-doping. As shown in FIGS. 46A-46D, even with a low anode electrolyte flow rate, the fluorinated electrocatalyst may comprise an optimized performance within the electrochemical cell, as compared to the commercial catalysts, much better performance than the samples without F-doping.

Results show that the F atoms introduced via the method of synthesis, described herein below, prefer to occupy the defect sites and dislodge X atoms from X-C, pushing X atoms to coordinate with M and form an X-rich layer on the M surface. The surface X-M bonds not only inhibit the migration and agglomeration of M, but also enhance the activity of the catalyst by regulating the LCE. Whereas in the catalysts without F-doping, X atoms strongly coordinate with C atoms at defect sites. The methods of synthesis, described herein below, were also shown to be efficient and versatile for regulating the LCE of other M-X-C(X=P, S, B) and commercially available catalysts (Pd/C and Pt/C). The methods of synthesis will be described herein below.
Method of Use:

Another aspect of the present disclosure pertains to a method of regulating LCE sites within the electrochemical cell by creating catalytic metal-nonmental (hereinafter "M-X") moieties within a metal-nonmetal-carbon (hereinafter "M-X-C") structure, such that a fluorine atom may be introduced to the LCE site, forming a fluorine-doped metal-nonmetal-carbon construct (hereinafter "M/X&F-C").

In an embodiment, all chemicals may be placed and treated within a solution. In this embodiment, the solution may include water, acetate, ethanol, or any other solution known in the art that may be used in an electrochemical cell. Additionally, in some embodiments, the fluorinated electrocatalyst may be formed and remain in a solid state until introduction into an electrochemical cell.

First, at least one carbon catalyst support comprised of at least one carbon atom may be pre-treated via sonication for a predetermined amount of time. In an embodiment, at least one carbon atom may be pre-treated via mixing and collision. As described herein, the predetermined amount of time may comprise at least 10 minutes, 15 minutes, 30 minutes, 1 hour, or any amount of time known in the art for carbon treatment via sonification. In some embodiments, at least one carbon atom may be refluxed and heated. In these other embodiments, at least one carbon atom may be heated in a solution comprising water, alcohol, oil, or any solution known in the art for heating carbon atoms. After being refluxed, in some embodiments, at least one carbon atom may be washed with water until the carbon atoms reach approximately a neutral pH value (e.g., 7.0).

Moreover, in an embodiment, at least one nonmetallic chemical element (e.g., N, P, S, B, and F) may be introduced into the solution containing at least one carbon atom. Further, at least one nonmetallic chemical element may be derived from a solid state structure. In this embodiment, at least one nonmetallic chemical element may be derived from liquid state, gaseous state, and plasma state structure. Additionally, at least one solid state carbon-oxides may be introduced to the solution. In these other embodiments, the solution may be heated while at least one solid state carbon-oxide is introduced into the solution. The required heat may vary depending on the nonmetallic chemical element chosen for the fluorinated electrocatalyst. In an embodiment, at least one nonmetallic chemical element, in a solid state, may be introduced and at least one solid-state carbon atoms may create a X-C structure, via heat treatment (e.g., pyrolysis). In this manner, the pyrolysis may take place within a gaseous atmosphere including but not limited argon, xenon, helium, neon, krypton, or any gas known in the art which may be used in heat treatment. In some embodiments, at least one nonmetallic chemical elements, in a liquid state, may be introduced to a solution and subsequently react with at least one carbon atom, via collision. In some embodiments, the solution may comprise water, ethanol, acetate, or any solution known in the art capable of bonding a nonmetal chemical element to a carbon, via collision.

Furthermore, the fluorine-doped nonmetal-carbon structure ("X&F-C" X may then be synthesized. In this embodiment, at least one fluorine atom may comprise a solid state fluorine-rich mixture, such that the solid state fluorine-rich mixture may be added to an acidic solution. In some embodiments, the fluorine mixture may be in a liquid state, gaseous state, or a plasma state. Moreover, in an embodiment, the acidic solution may include, but is not limited to acetate or ethanol. In this manner, in this embodiment, $H_2O$ may be added to the acidic solution. Furthermore, after being introduced to the acidic solution, the solid state fluorine-rich mixture may be subjected to sonification. Next, in an embodiment, the solid state fluorine-rich mixture may be incorporated into the X-C structure, via heat treatment (e.g., pyrolysis), and subsequently cooled and washed, with ethanol, acetate, and/or an aqueous solution. In some embodiments, when the fluorine-rich mixture is in a liquid state or a gaseous state, the fluorine-rich mixture may be incorporated into the X-C structure, via collision. Additionally, in some embodiments, the pyrolysis may take place within a gaseous atmosphere including but not limited argon, xenon, helium, neon, krypton, or any gas known in the art which may be used in pyrolysis.

The last step in creating the fluorinated electrocatalyst may comprise the immobilization of at least one metallic chemical element on X&F-C. In an embodiment, at least one metallic chemical element may react with the X&F-C structure via microwave reduction. In this embodiment, at least one metallic chemical element may react with the X&F-C structure via oxidation reduction or any reduction reaction known in the art, in which a metallic chemical element reacts with a nonmetallic chemical element. Furthermore, the at least one metallic chemical element and the X&F-C structure may be subjected to sonification dispersion within a solution, which may comprise but is not limited to acetate, ethanol, and/or water. In some embodiments the PH of a formed M/X&F-C construct may be transitioned from a highly basic state to a highly acidic state.

Finally, the fluorinated electrocatalyst may be placed within an electrochemical cell and optimize a catalytic reaction of the electrochemical cell, via at least one fluorine atom dislodging the nonmetallic chemical elements from the nonmetal-carbon bond of the M/X&F-C construct. In an embodiment, at least one fluorine atom occupies a local coordination environment ("LCE") site of the M/X&F-C construct and may prevent at least one nonmetallic chemical element from occupying the LCE site. In this embodiment, at least one nonmetallic chemical element may be pushed via fluorine repulsion towards at least one metallic chemical element within the M/X&F-C construct. Accordingly, at least one of nonmetallic chemical element may bond to the metallic chemical elements via electrovalent bonds or any other reactions known in the art which may bond a metallic chemical element to a nonmetallic chemical element. Furthermore, the electrovalent bonds form at least one M-X moiety. In some embodiments, the nonmetallic chemical element within the M-X moiety may be disposed on the surface of the M/X&F-C construct, forming a nonmetallic layer disposed on a surface of at least one of the nonmetallic chemical elements. Therefore, in these other embodiments, at least one metallic chemical element within the fluorinated electrocatalyst may be inhibited from agglomeration and/or migration, optimizing the fluorinated electrocatalyst activity in the electrochemical cell.

The following examples are provided for the purpose of exemplification and are not intended to be limiting.

EXAMPLES

Example 1

Synthesis of Pd/X&F-C Catalyst (X=N, P, S, B, and F)

All chemicals with analytical-grade purity were purchased and used directly without further treatment unless otherwise noted. All solutions were prepared with ultrapure water. Commercial Pd/C (10 wt. %, 8 nm Pd particles on activated carbon) and Pt/C (20 wt. %, 3 nm Pt particles on carbon black) were used as baseline catalysts. A diluted fluoropolymer-copolymer solution (5.0 wt. %), carbon paper, and anion-exchange membrane were used. Carbon black (such as that marketed under the trade name Vulcan XC-72™) was used as a catalyst support due to its excellent electrical conductivity and high specific surface area.

The carbon black as pre-treated as follows: 3.0 g of carbon black was dispersed in 150 mL concentrated nitric acid ($HNO_3$, 68 wt. %) by sonication for a half-hour, and was subsequently refluxed for 5 hours at 150° C. with an oil bath. The resulting products were centrifugally washed with water until the pH reached approximately 7.0. The obtained carbon black with plenty of defects and oxygen-containing functional groups (denoted as O-C) was dried at 60° C. overnight.

The heteroatom X-doped carbon (X-C, X=N, P, S, B, and F) was synthesized as follows: 0.2 g O-C and 1.0 g melamine ($C_3H_6N_6$) were grounded together in an agate mortar for 1 hour and subsequently pyrolyzed at 900° C. for 2 h in an argon atmosphere. After cooling to room temperature, N-C was obtained by washing with ethanol and water. The same method was used to synthesize P-C, S-C, B-C, and F-C with sodium hypophosphite anhydrous ($NaH_2PO_2$, 98%), sulfur powder (99.5%), boracic acid ($H_3BO_3$, 99.5%), and polyvinylidene difluoride (PVDF, 99%) as P, S, B, and F sources, respectively. The temperature for the synthesis of B-C was 1000° C.

The heteroatom X-F-CO-doped carbon (X&F-C, X=N, P, S, and B) was synthesized as follows: 0.1 g N-C and 0.8 g PVDF were grounded together in an agate mortar for 1 hour and subsequently added into a solution comprising 30 mL acetone and 10 mL $H_2O$. After sonication for a half-hour, the mixture was refluxed at 120° C. in an oil bath until fully dried. The mixture was further pyrolyzed at 600° C. for 2 h in an argon atmosphere. After cooling to room temperature, the samples were washed with ethanol and ultrapure water, followed by vacuum drying at 60° C. overnight to obtain the N&F-C. The same method was used to synthesize P&F-C, S&F-C, and B&F-C with P-C, S-C, and B-C, respectively, as precursors.

The immobilization of ultrafine Pd nanoparticles on X&F-C($Pd_1$/X&F-C, X=N, P, S, and B) was performed as follows: A microwave reduction method was used to synthesize Pd/N&F-C with a Pd loading of 1 wt. %. In brief, 99 mg N&F-C was ultrasonically dispersed in 50 mL ethylene glycol (EG) to form a uniform suspension. Then, 1.0 mL $Pd^{2+}$ solution (1.0 $mg_{Pd}$ $mL^{-1}$, $PdCl_2$ in 0.1 M HCl solution) was dropped stepwise into the suspension under stirring. The pH of the suspension was adjusted to 11.0 using 0.1 M NaOH solution. The suspension was then placed in a microwave oven for 90 seconds and further stirred for 2 hours. Lastly, the obtained products were washed with water and ethanol, followed by vacuum drying overnight at 60° C. to obtain the Pd/N&F-C. The same method was used to synthesize Pd/P&F-C, Pd/S&F-C, Pd/B&F-C. Also, the Pd/N-C, Pd/P-C, Pd/S-C, Pd/B-C, and Pd/F-C were prepared as control samples. The content of Pd in all samples was kept at 1.0 wt. %, which was determined by XPS.

Example 2

Pd/X&F-C Catalyst (X=N, P, S, B) Performance

The electrocatalytic ORR activities of M/X&F-C and M/X-C was evaluated and compared against the readily available commercial catalysts. Accordingly, as shown in FIGS. 10A-11C, cyclic voltammetry (hereinafter "CV") curves of the catalysts recorded in different $N_2$-saturated electrolytes indicates the significantly activated Pd nanoparticles, increased specific surface area, and weakened Pd-O binding induced by F-coordination. As shown in FIG. 2A and FIGS. 12A-12K, the electrochemically active surface area (ECSA) of Pd/X&F-C (86.9 $m^2$ $g^{-1}{}_{Pd}$) estimated from the CO stripping was much higher than those of Pd/X-C, Pd/C and Pt/C. As shown in FIGS. 10A-10L and FIGS. 11A-11C, the data collected is consistent with the CVs results. Furthermore, as shown in FIGS. 12A-12K, the onset and peak potentials for CO oxidation of Pd/X&F-C shift negatively compared with the Pd/X-C and Pd/C, manifesting the weaker adsorption and easier removal of CO at the lower potentials on the Pd/X&F-C.

Figure 13:
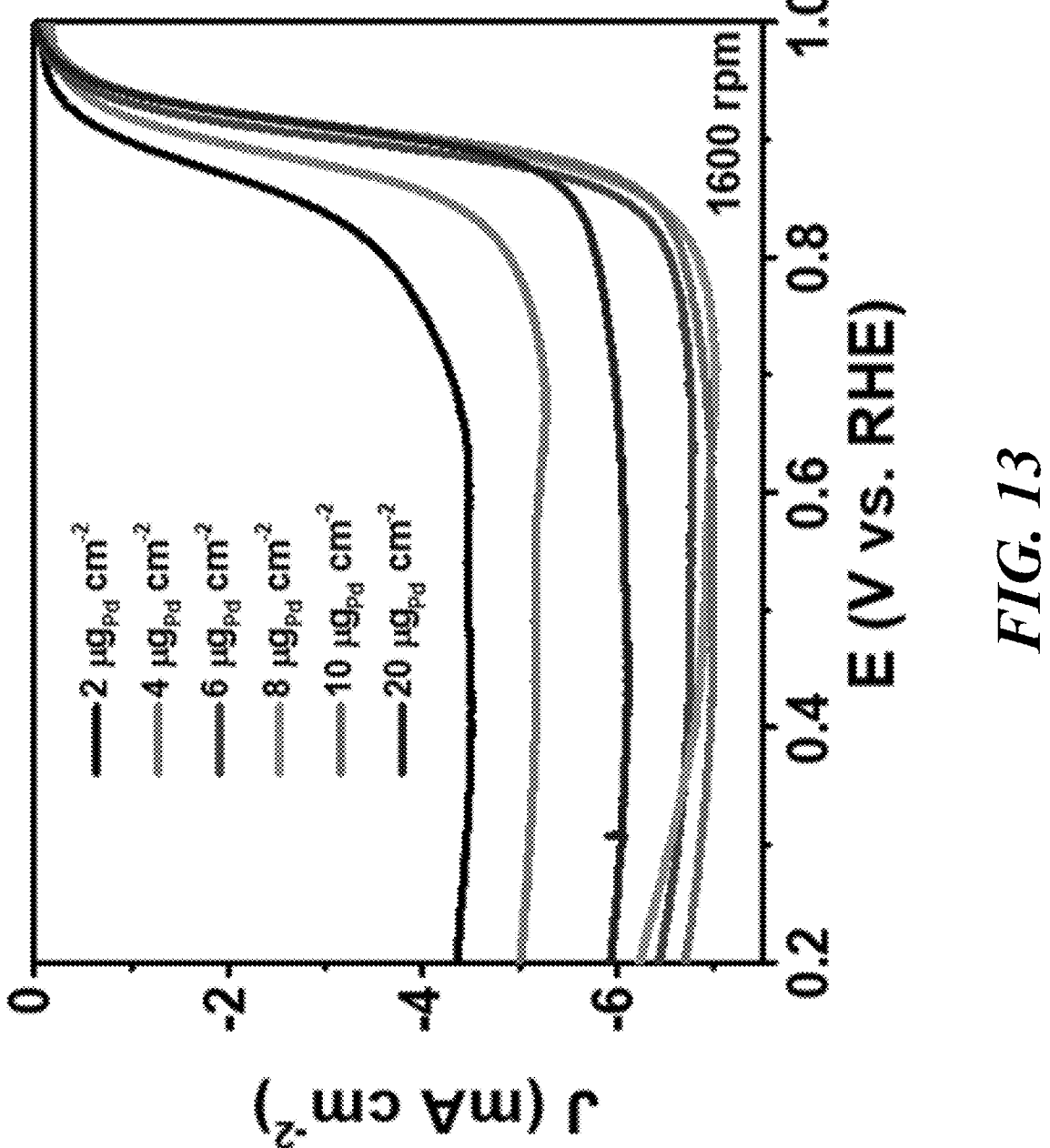
FIG. 13 depicts an ORR polarization curves of Pd/N&F-C with different Pd loading on the electrode under the following conditions: $O_2$-saturated 0.1 M KOH solutions, the scan rate is 5 mV s$^{-1}$ at 1600 rpm, according to an embodiment of the present disclosure.
Figure 25:
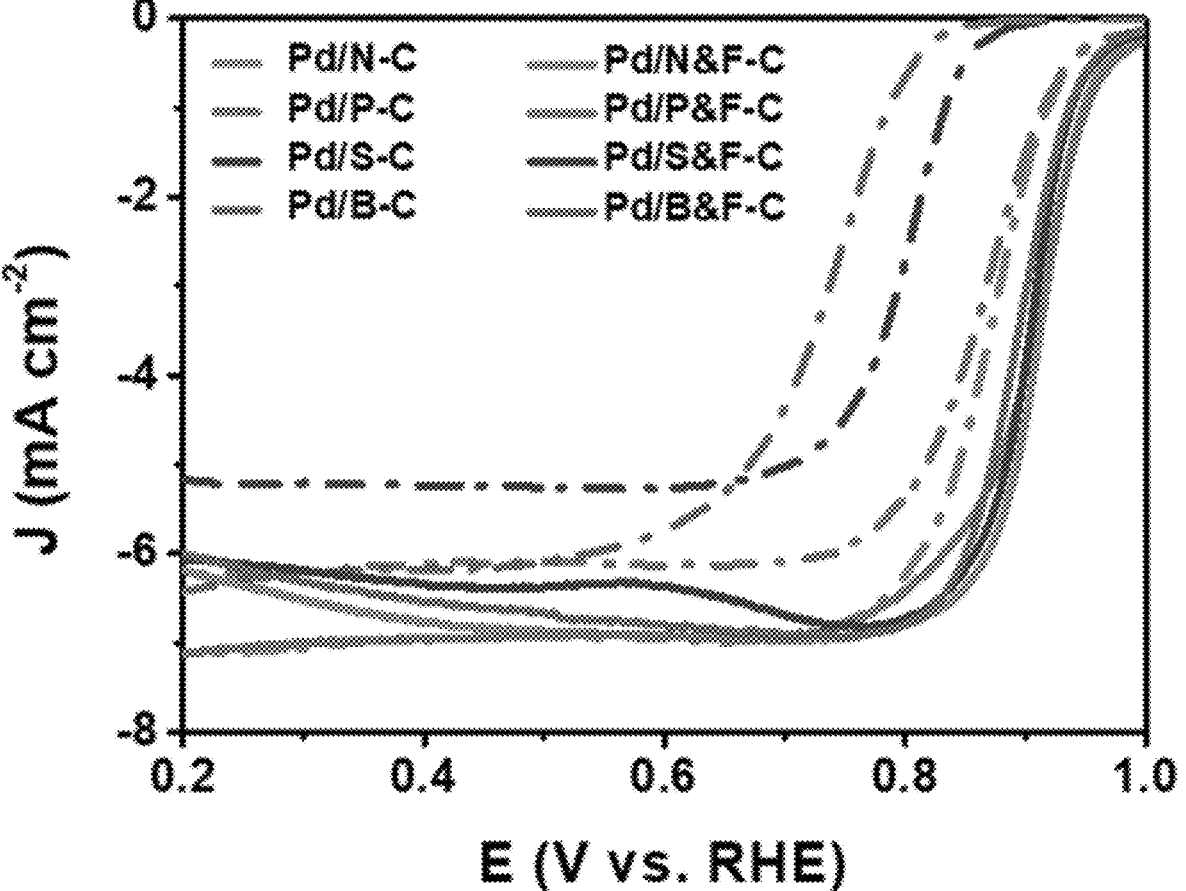
FIG. 25 graphically depicts a role of F-coordination in enhancing an ORR performance.

Moreover, as shown in FIG. 13, the catalyst loading on the electrode was first optimized, and as depicted in FIGS. 14A-24D, the ORR activities of the catalysts were evaluated in the $O_2$-saturated 0.1 M KOH solution by comparing the half-wave potentials (e.g., $E_{1/2}$), as shown in FIG. 2B and FIG. 25. Accordingly, the $E_{1/2}$ of Pd/N&F-C (0.91 V) is much more positive than those of Pd/N-C (0.87 V), Pd/C (0.82 V), and Pt/C (0.85 V). As shown in FIG. 2B, an outstanding ORR mass activity (MA) of 4.71 A $mg^{-1}{}_{Pd}$ was achieved at 0.9 V for the Pd/N&F-C, far surpassing the control catalysts. Furthermore, as shown in FIG. 2C, FIGS. 26A-26C, and FIG. 27, other Pd/X&F-C catalysts (X=P, S, B) also show significantly improved ORR activities than the Pd/X-C counterparts without F-doping, further proving the critical role of F in boosting ORR activities. Pd/X&F-C show the electron transfer numbers (n) of almost 4.0, as shown in FIG. 26A, and greatly reduced $H_2O_2$ yield (less than 1%), as shown in FIG. 26B, compared with Pd/N-C, Pd/C, and Pt/C, suggesting a direct 4-e pathway with negligible byproducts, improving the anti-corrosion property of carbon support by eliminating the nucleophilic attack, as shown in FIG. 26C.

Figure 27:
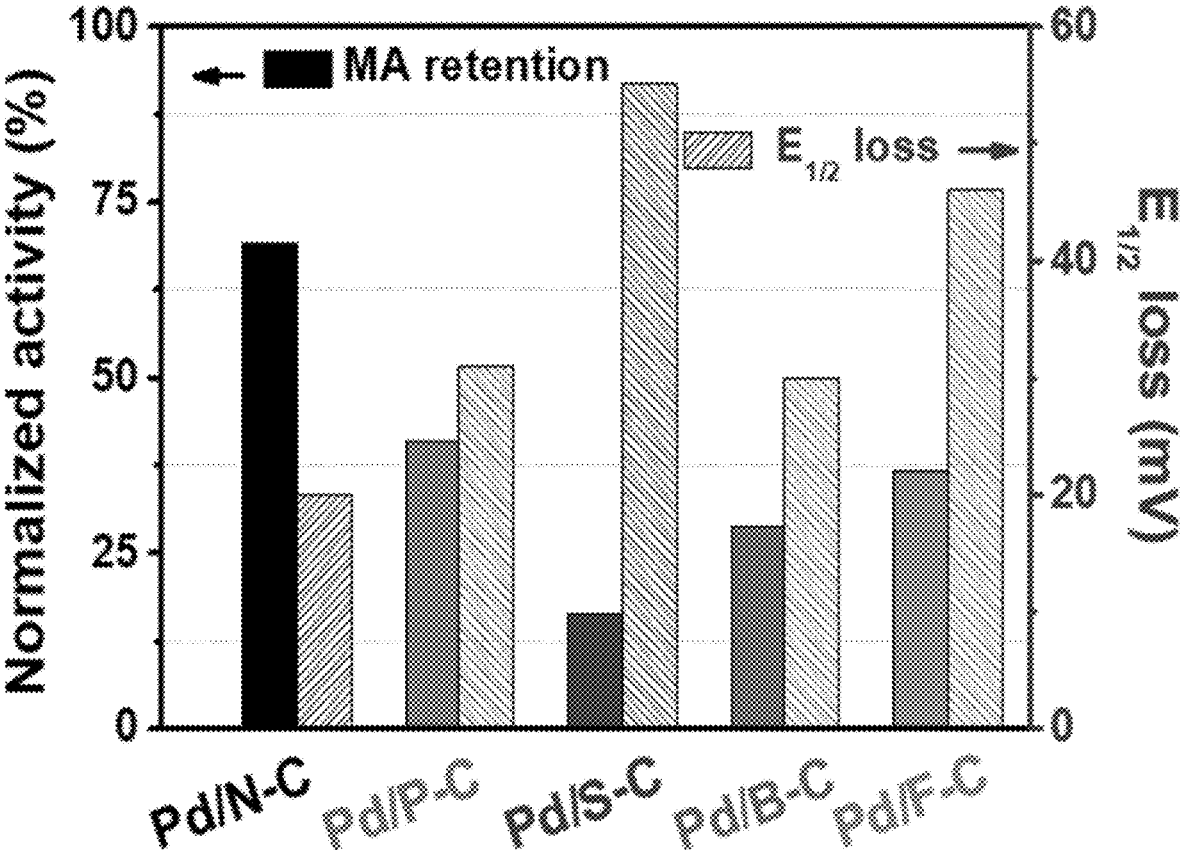
FIG. 27 depicts a mass activity ("MA") retention (%) and half-wave loss ($E_{1/2}$ loss) after 30,000 cycles, according to an embodiment of the present disclosure, with the improved MA retention and the reduced $E_{1/2}$ loss indicate the vital role of F-coordination in enhancing the activity and stability of the catalysts.

The accelerated stability tests (hereinafter "AST"), as depicted by FIGS. 14A-24D, further indicates the outstanding stability of Pd/X&F-C with MA retentions above 90% after 30,000 cycles, as shown in FIG. 2D, (except for the Pd/S&F-C with a MA retention of 80.4%), which are much higher than Pd/C (33.3%) and Pt/C (45.8%). Moreover, almost overlapped ORR polarization curves before and after the AST tests were observed with negligible degradation in $E_{1/2}$ (<5 mV) for the Pd/X&F-C, as shown in FIG. 2D. In contrast, Pd/C and Pt/C show much higher $E_{1/2}$ loss of 68 mV and 45 mV, respectively. The Pd/X-C catalysts without F-doping also show inferior MA retention and higher $E_{1/2}$ loss, as shown in FIG. 27, than the Pd/X&F-C, confirming the vital role of F in stabilizing the catalysts. The proposed Pd/X&F-C represents the most active and stable electrochemical performance than other materials, setting a new milestone for ORR catalysts. The X-C and X&F-C support without loading Pd were tested and demonstrated inferior ORR performance, as shown in FIGS. 28A-28B, confirming that the ORR activity is mainly from the Pd active sites.

In addition to the superior ORR performance, the Pd/X&F-C also shows excellent EOR activity, as shown in FIG. 30A. The onset potential of Pd/N&F-C at 0.1 A $mg^{-1}$, as shown in FIG. 30D, has negative shifts of 0.14 V and 0.17 V compared with Pd/N-C and Pd/C, respectively, indicating the decreased activation barrier for EOR. As shown in FIG. 2E and FIG. 30F, the Pd/N&F-C shows a MA of 26.5 A $mg^{-1}{}_{Pd}$ at 0.87 V, which is much higher than those of Pd/C (1.14 A $mg^{-1}{}_{Pd}$) and Pt/C (1.44 A $mg^{-1}{}_{Pd}$), far outperforming the benchmarking EOR catalysts. Meanwhile, the Pd/P&F-C, Pd/S&F-C, and Pd/B&F-C also show excellent MA of 22.0, 16.0, and 20.0 A $mg^{-1}{}_{Pd}$ for EOR, respectively, as shown in FIG. 2E and FIG. 30F.

Figure 32:
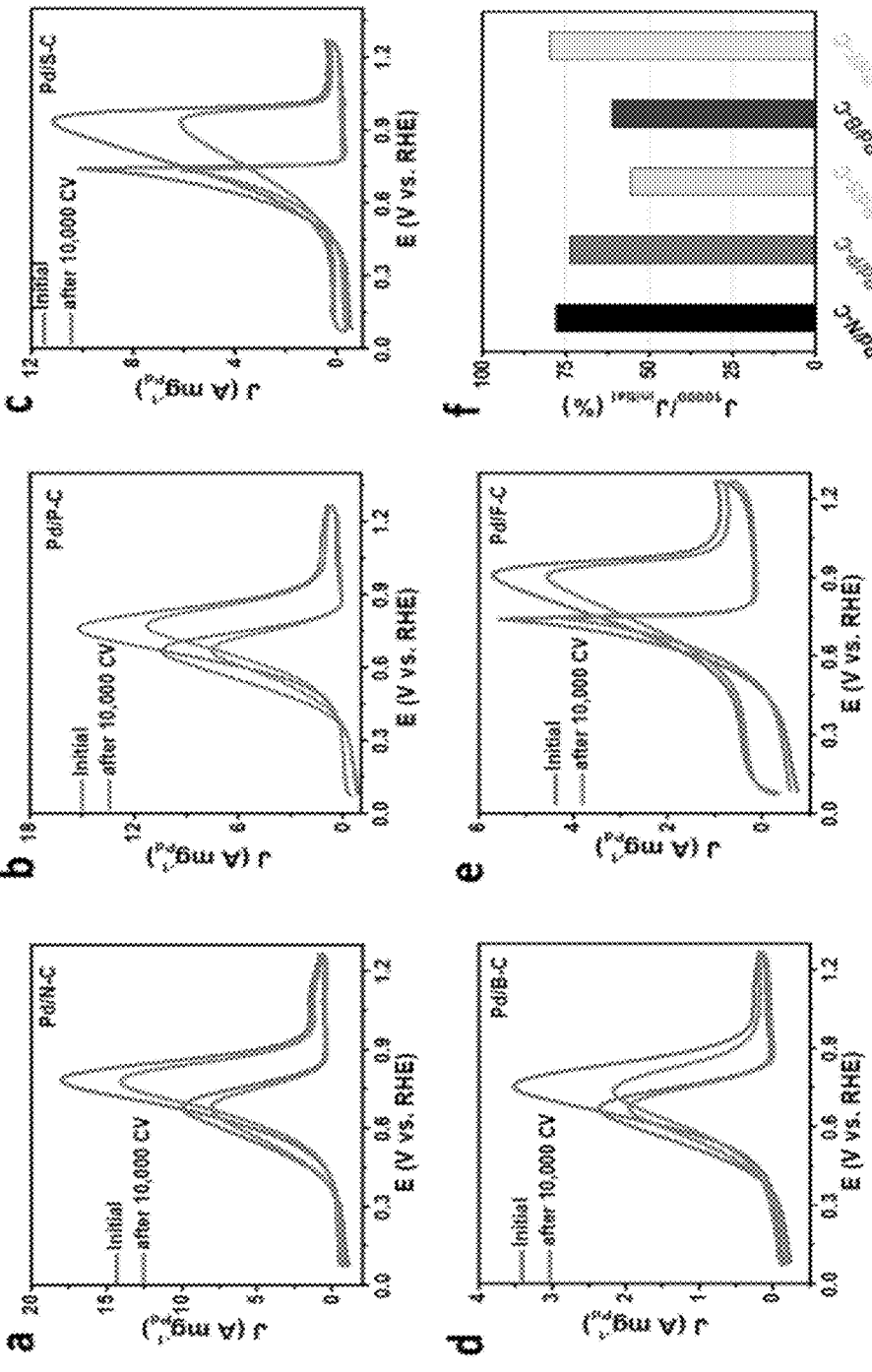
FIGS. 32A-32F depict an EOR stability tests of the catalysts without F-coordination, with the CVs of the initial stability test and the stability test after 10,000 cycles, according to an embodiment of the present disclosure.

As shown in FIG. 30B, FIG. 30C, and FIG. 30F, the EORs are higher than those of Pd/X-C without F-doping, confirming the irreplaceable role of F in boosting the activities of Pd/X&F-C. As shown in FIG. 2E and FIGS. 31A-32F, the stability was assessed by conducting continuous CVs tests for 10,000 cycles, which show negligible activity loss with a striking MA retention of ~90%. In contrast, Pd/C and Pt/C exhibit pronounced performance losses, as shown in FIG. 32E and FIG. 32F, with only 16.5% and 11.7% MA retentions, respectively. On the other hand, the Pd/X-C shows a noticeable performance decay after 10,000 cycles, as shown in FIGS. 32A-32F, implying the vital role of F in enhancing the catalyst stability.

Figure 33:
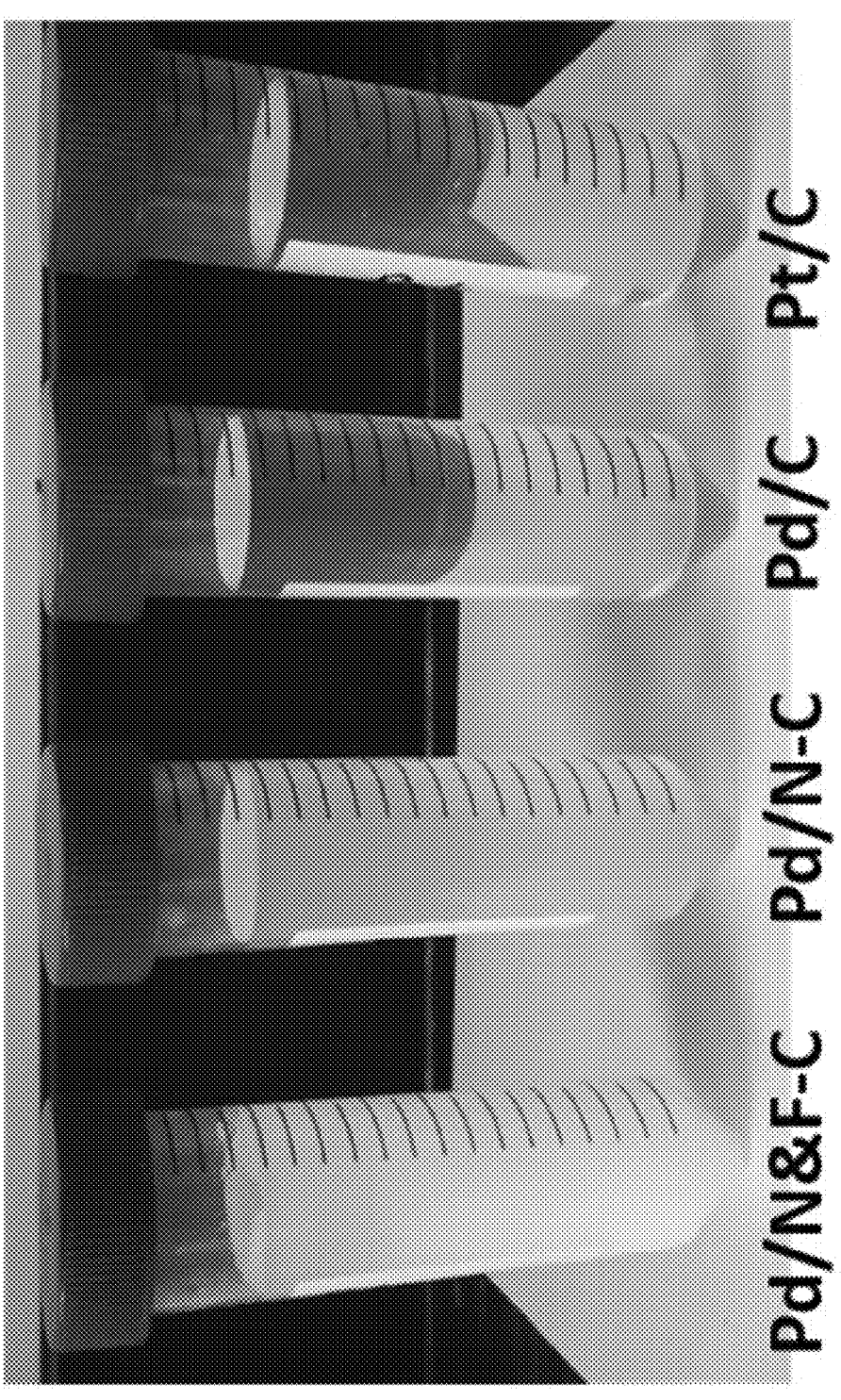
FIG. 33 depicts a photograph of reacted electrolyte (1 M KOH+1 M ethanol) using Pd/N&F-C, Pd/N-C, Pd/C, and Pt/C as catalysts after 3 hours i-t test at 0.8 V vs. RHE, according to an embodiment of the present disclosure. Excessive barium hydroxide was added into the electrolyte to detect the $CO_3^{2-}$. The Faraday efficiency (FE) of ethanol to $CO_2$ on different samples in 1 M KOH+1 M ethanol solution at different potentials is also shown in FIG. 2F.
Figure 34:
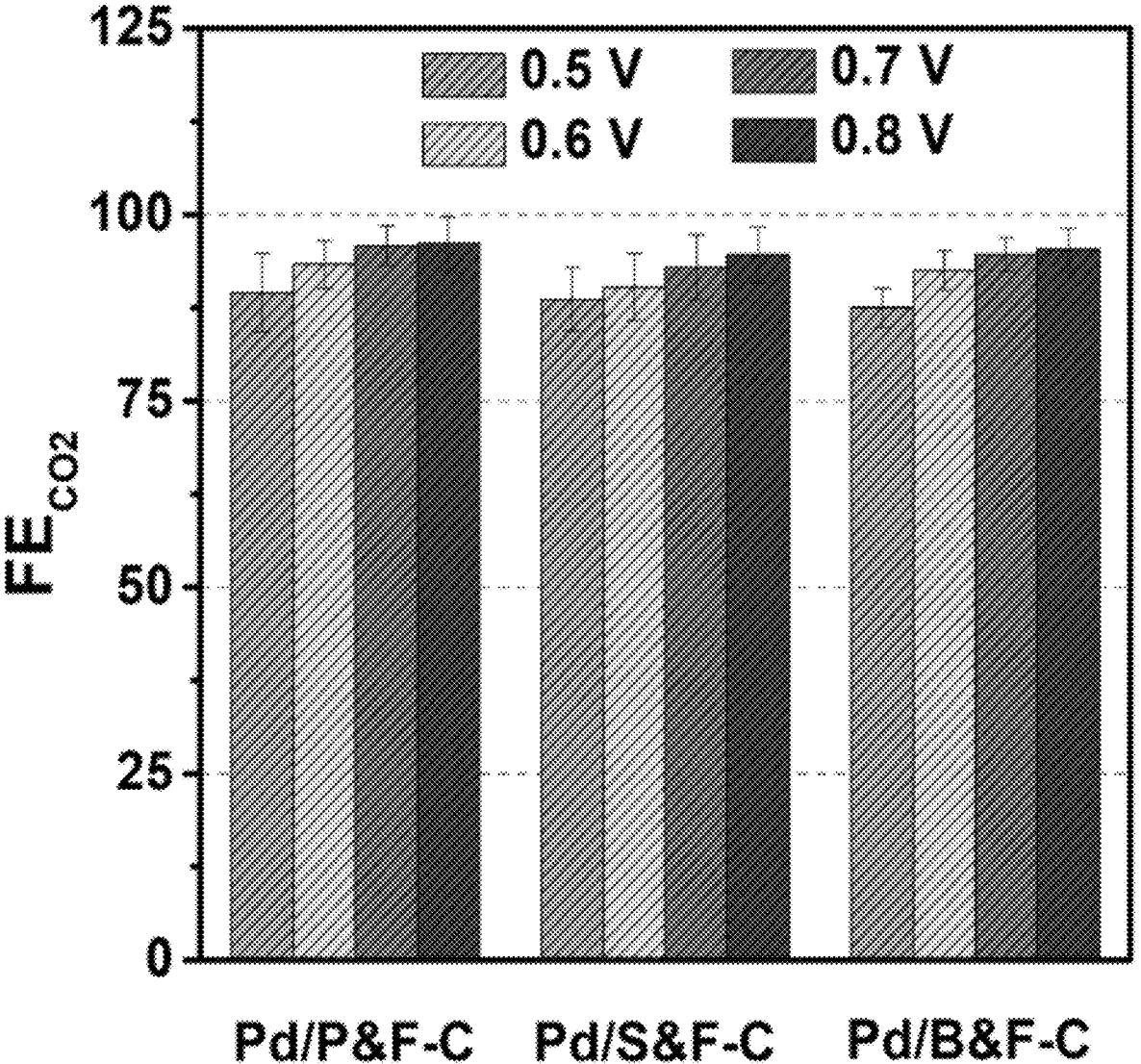
FIG. 34 graphically depicts a $FE_{CO_2}$ data for Pd/P&F-C, Pd/S&F-C, and Pd/B&F-C at different potentials determined by titration method, according to an embodiment of the present disclosure.

The synthesis—described in Example 1—was used to determine the content of $CO_3^{2-}$ from the reaction between the produced $CO_2$ and $OH^-$ in the solution, as shown in FIG. 33 and FIG. 34, while $^1H$ nuclear magnetic resonance (NMR), as shown in FIGS. 35A-36D, spectroscopy was employed to determine liquid products of EOR on the catalysts. As depicted in FIG. 2F, a Faradaic efficiency (FE) of above 95% was detected for Pd/N&F-C within a broad potential range of 0.5-0.8 V with $CO_2$ as the main product, similar to the other Pd/X&F-C catalysts, as shown in FIG. 34 and FIGS. 35A-35E. As shown in FIG. 2F and FIGS. 36A-36D, in contrast, the Pd/N-C, Pd/C, and Pt/C show much lower $FE_{CO_2}$ of below 20% with acetate as the main product.

Furthermore, the outstanding EOR activity of Pd/X&F-C can be attributed to the complete C-C cleavage and easy CO removal enabled by F-doping. Electrochemical impedance spectroscopy, as shown in FIGS. 37A-37E, shows a greatly reduced charge transfer resistance for Pd/X&F-C, revealing a facilitated EOR kinetics. The catalyst loading effect was also studied by varying the Pd loading on the N&F-C support, such as by using 0.1 wt. % and 10 wt. %. Both of these two samples show inferior performance than Pd/N&F-C with Pd loading of 1 wt. %, as shown in FIGS. 38A-38E, due to the unmet prerequisite to provide sufficient Pd sites for EOR or easy CO poisoning on the catalyst.

The practical DEFCs performance of Pd/N&F-C as both anode and cathode was tested on membrane electrode assembly, as shown in FIG. 2G and FIGS. 39A-39B. The open-circuit voltage (OCV) of 1.10 V was acquired for Pd/N&F-C, which is very close to the theoretical value of 1.14 V and much higher than those of Pd/N-C (0.955 V), Pd/C (0.928 V), and Pt/C (0.866 V). The increased OCV enables high cell efficiency and high power density at a low applied load.

As shown in FIGS. 40A-40D, the anode potentials are in the range of the potentials applied in the three-electrode system (0.5 V to 0.8 V). The DEFC (Pd/N&F-C) delivers a current density of 1.27 A cm$^{-2}$ at 0.45 V and a peak power density of 0.57 W cm$^{-2}$ (1.90 W mg$^{-1}{}_{Pd}$), as shown in FIG. 2G and FIGS. 39A-39B, which is few-fold higher than those of Pd/N-C (0.36 W cm$^{-2}$), commercial Pd/C (0.031 W cm$^{-2}$), Pt/C (0.064 W cm$^{-2}$), and other benchmarking catalysts, almost reaching the same magnitude of H$_2$-electrochemical cells, as shown in FIG. 2I.

Figure 41:
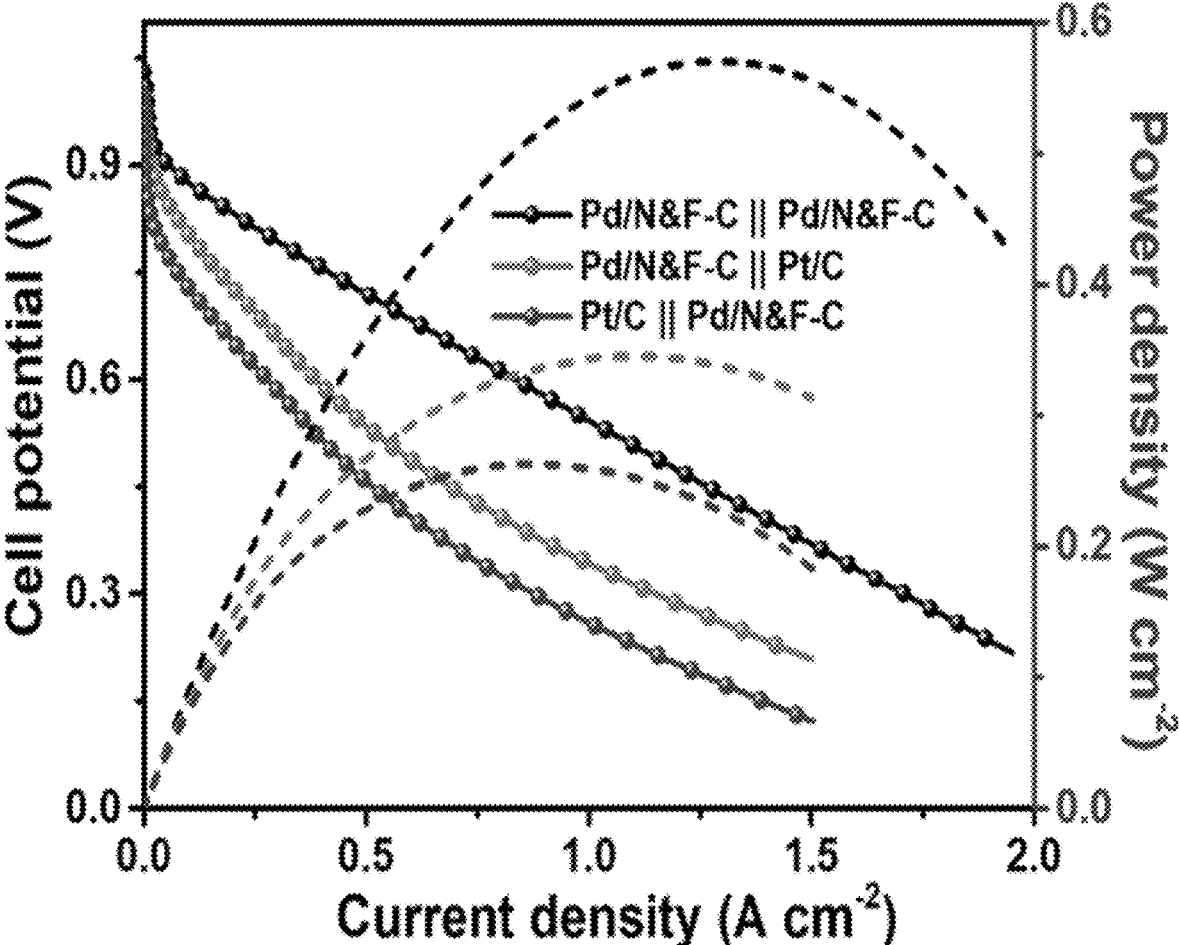
FIG. 41 depicts a steady polarization (solid line) and power density (dashed line) curves for different MEA at 60° C., according to an embodiment of the present disclosure. The anode electrolyte is 1 M KOH+2 M ethanol with a flow rate of 20 mL min$^{-1}$, and the cathode was fed with oxygen with 200 mL min$^{-1}$ without backpressure.

In addition, as shown in FIG. 41, different catalysts were employed as anode and cathode catalysts to understand the influence of Pd/N&F-C on each side of the electrochemical cells. It is found that the polarization loss of the cell mainly comes from the anode EOR due to the sluggish 12-electron pathway. A shown in FIG. 42, while the high anode electrolyte flow rate can minimize the mass transfer limitation and reduce the negative effect of the generated CO$_2$. Furthermore, the proposed Pd/N&F-C can be operated continuously in the DEFC for more than 5,900 hours, as shown in FIG. 2H, which is extremely longer than recently reported various electrochemical cells, as shown in FIG. 2J.

Furthermore, as shown in FIGS. 43A-43J, the FE$_{CO_2}$ of all Pd/X&F-C for EOR at the anode of DEFC can attain 90%, indicating a carbon balance with a complete 12-electron pathway. In contrast, the FE$_{CO_2}$ of Pd/X-C, Pd/C and Pt/C were found to be <20% with the primary product of acetate, as shown in FIG. 43J. Moreover, quick performance degradations were found on Pd/N-C, Pd/C, and Pt/C catalysts during the initial hundreds of hours, as shown in FIG. 39B, accompanied by quick corrosion of carbon support, as shown in FIGS. 44A-44C. Additionally, as shown in FIGS. 45A-45F, the Gas chromatography results show that the carbon oxidation rate of Pd/N&F-C during the long-term operation is negligible (2.14 ng min$^{-1}$), as do the other Pd/X&F-C catalysts (X=P, S, B). Therefore, the electrochemical cell performance degradation resulted from the oxidative corrosion of carbon support can be significantly reduced by F-doping. As shown in FIGS. 46A-46D, even with a low anode electrolyte flow rate, the Pd/X&F-C still shows a much better performance than the samples without F-doping.

Example 3

Synthesis of NiMn/N& F-C Catalyst

Figure 47:
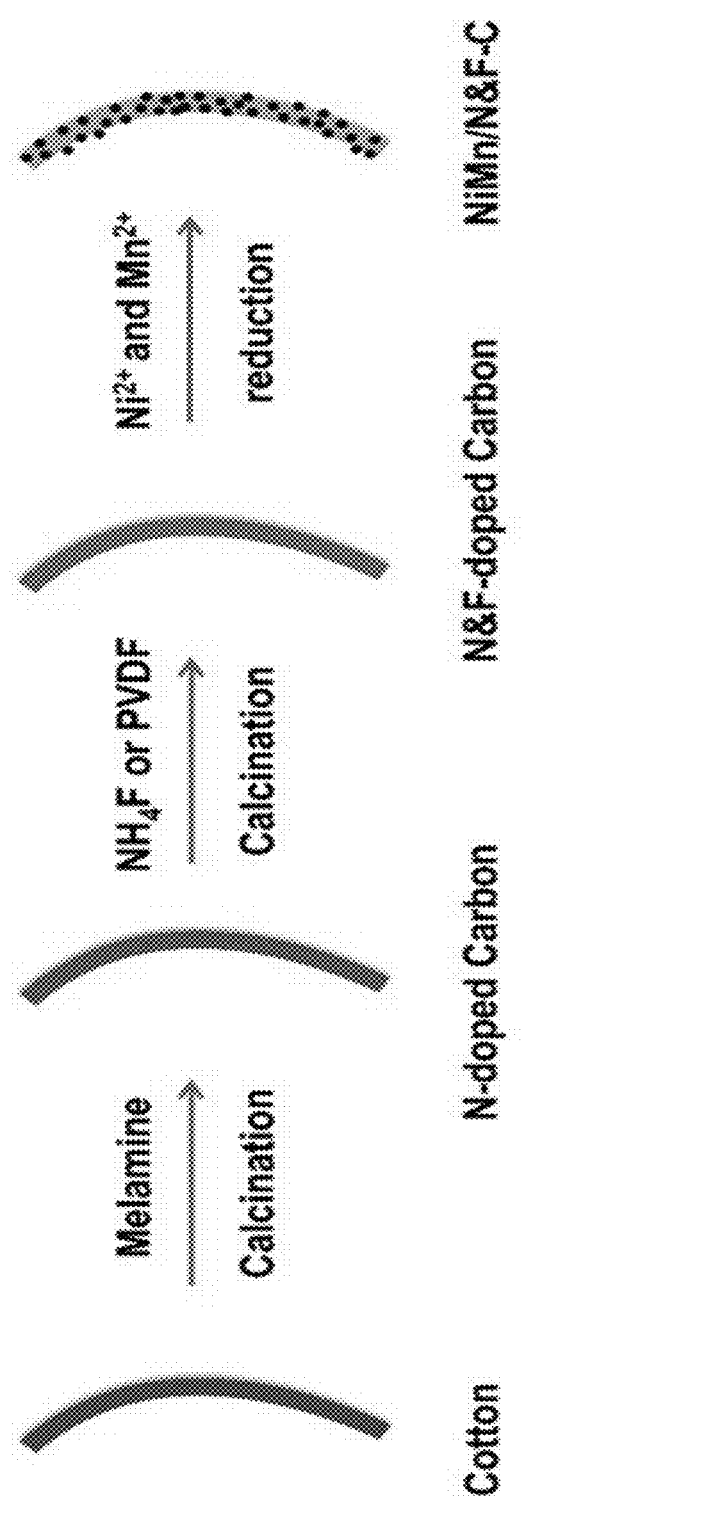
FIG. 47 depicts an exemplary illustration of a synthesis NiMn/N&F-C, according to an embodiment of the present disclosure.

FIG. 47 depicts the synthesis of NiMn/N&F-C, according to an embodiment of the present disclosure. Briefly, a cotton ball (ca. 700 mg) and 1 g melamine were immersed 20 mL ethanol and 10 mL water mixture, after sonification treatment (e.g., ultrasound) with 60 min, the solution was evaporation in vacuum oven under 105° C. Then, the melamine functioned cotton was annealed at 800° C. for 2 hours under N$_2$ protection, the products was grinded into fine powder and washed with plenty of water and ethanol, then the nitrogen doped caron fiber (N-doped carbon) was obtained.

0.2 g NH4F (or an appropriate amount of PVDF) and 0.1 g of the above obtained N-doped carbon was placed in two separate heated positions in the CVD tube furnace with N-doped carbon at the downstream side. Then, the CVD was heated to 300° C. for 2 hours under the protection of N$_2$. After cooling, the N&F-C was obtained.

80 mg N&F-C, 31.8 mg NiCl$_2$ 6HO$_2$, and 16.49 mg MnCl$_2$ 4H$_2$O were dispersion into 20 mL water and 80 mL ethanol, after 60 min sonification and stirring treatment, the suspension was evaporation in vacuum oven under 105° C. After that, it was annealed at 500° C. for 2 hours under H2/N$_2$ (10 v %/90 v %) to reduce Ni and Mn. The obtained products were washed with plenty of water and ethanol, and the NiMn/N&F-C was obtained.

Example 4

NiMn/N& F-C Catalyst Performance

Figure 48:
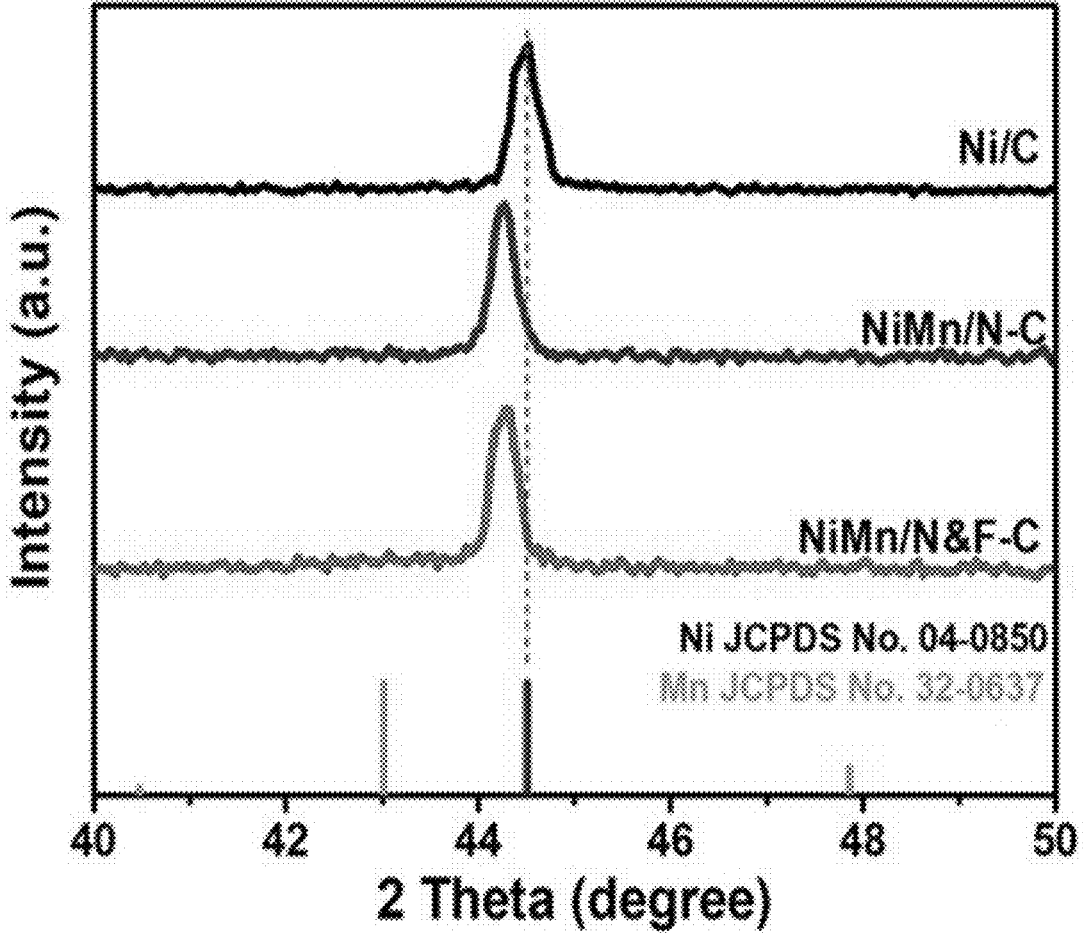
FIG. 48 depicts an XRD analysis of patterns of NiMn/N&F-C and NiMn/N-C, according to an embodiment of the present disclosure.

As shown in FIG. 48, the XRD patterns show that the diffraction peaks position of NiMn/N&F-C and NiMn/N-C have a negative shift to low 2 theta value compared to the Ni/C and Ni standard card, due to the Mn-doping into Ni lattice. Additionally, as shown in FIG. 49A an SEM and an EDX-mapping images show that the uniform NiMn nanoparticles supported on the carbon fibers. Further, as shown in FIG. 49C, the metal content on the total catalyst is ca. 21.6 wt %, with a Ni and Mn atomic ration of 2:1. The N and F has an atomic ration of 2.8 at. % and 2.3 at. %, respectively.

As shown in FIGS. 50A-50E, the XPS results further indicates the successfully synthesized NiMn/N&F-C. The oxygen reduction reaction (ORR) performance was tested in O$_2$-saturated 0.1 M KOH solution, with a scan rate of 5 mV s$^{-1}$, as shown in FIG. 51A. In addition, as depicted in FIG. 51B, the ORR performance at 1600 rpm was used to compare the different samples. After fluorine treatment, the ORR half-wave potential (E$_{1/2}$) of NiMn/N&F-Cis 0.899 V, which is 61 mV and 49 mV negative shifted compared to the sample of NiMn/N-C and commercial Pt/C catalysts. In addition, the NiMn/N&F-C also shows improved stability, after 30 k cycles stability test, the ORR performance can be well reserved. The direct ethanol electrochemical cell performance was evaluated using NiMn/N&F-C as cathode catalyst. The maximum power density of 0.505 W cm$^{-2}$ was acquired.

REFERENCES

Li, X., Rong, H., Zhang, J., Wang, D. & Li, Y. Modulating the local coordination environment of single-atom catalysts for enhanced catalytic performance. Nano Research 13, 1842-1855, (2020).

Zhang, J. et al. Tuning the Coordination Environment in Single-Atom Catalysts to Achieve Highly Efficient Oxygen Reduction Reactions. Journal of the American Chemical Society 141, 20118-20126, (2019).

Bianchini, C. & Shen, P. K. Palladium-Based Electrocatalysts for Alcohol Oxidation in Half Cells and in Direct Alcohol Fuel Cells. Chemical Reviews 109, 4183-4206, (2009).

Ramaswamy, N. & Mukerjee, S. Alkaline Anion-Exchange Membrane Fuel Cells: Challenges in Electrocatalysis and Interfacial Charge Transfer. Chemical Reviews 119, 11945-11979, (2019).

Li, Z. et al. Boosting alkaline hydrogen evolution: the dominating role of interior modification in surface electrocatalysis. Energy & Environmental Science 13, 3110-3118, (2020).

Li, Z. et al. Stabilizing atomic Pt with trapped interstitial F in alloyed PtCo nanosheets for high-performance zinc-air batteries. Energy & Environmental Science 13, 884-895, (2020).

Niu, W. et al. Surface-Modified Porous Carbon Nitride Composites as Highly Efficient Electrocatalyst for Zn-Air Batteries. Advanced Energy Materials 8, 1701642, (2018).

Wu, G., More, K. L., Johnston, C. M. & Zelenay, P. High-Performance Electrocatalysts for Oxygen Reduction Derived from Polyaniline, Iron, and Cobalt. Science 332, 443-447, (2011).

Sun, T. et al. Design of Local Atomic Environments in Single-Atom Electrocatalysts for Renewable Energy Conversions. Advanced Materials 33, 2003075, (2021).

Yuan, K. et al. Boosting Oxygen Reduction of Single Iron Active Sites via Geometric and Electronic Engineering: Nitrogen and Phosphorus Dual Coordination. Journal of the American Chemical Society 142, 2404-2412, (2020).

Zhang, J. & Dai, L. Nitrogen, Phosphorus, and Fluorine Tri-doped Graphene as a Multifunctional Catalyst for Self-Powered Electrochemical Water Splitting. Angewandte Chemie International Edition 55, 13296-13300, (2016).

Wang, Y. et al. Advanced Electrocatalysts with Single-Metal-Atom Active Sites. Chemical Reviews 120, 12217-12314, (2020).

Kowal, A. et al. Ternary Pt/Rh/SnO2 electrocatalysts for oxidizing ethanol to $CO_2$. Nature Materials 8, 325-330, (2009).

Liang, Z. et al. Direct 12-Electron Oxidation of Ethanol on a Ternary Au(core)-PtIr(Shell) Electrocatalyst. Journal of the American Chemical Society 141, 9629-9636, (2019).

Kim, I. et al. Catalytic reactions in direct ethanol fuel cells. Angew. Chem. Int. Ed. 50, 2270-2274, (2011).

Kavanagh, R., Cao, X. M., Lin, W. F., Hardacre, C. & Hu, P. Origin of low $CO_2$ selectivity on platinum in the direct ethanol fuel cell. Angew. Chem. Int. Ed. 51, 1572-1575, (2012).

Wang, X. X., Swihart, M. T. & Wu, G. Achievements, challenges and perspectives on cathode catalysts in proton exchange membrane fuel cells for transportation. Nature Catalysis 2, 578-589, (2019).

Shao, Y., Dodelet, J. P., Wu, G. & Zelenay, P. PGM-Free Cathode Catalysts for PEM fuel cells: A Mini-Review on Stability Challenges. Adv. Mater. 31, 1807615, (2019).

Zheng, T. et al. Large-Scale and Highly Selective $CO_2$ Electrocatalytic Reduction on Nickel Single-Atom Catalyst. Joule 3, 265-278, (2019).

Zhou, Y. et al. A Universal Method to Produce Low-Work Function Electrodes for Organic Electronics. Science 336, 327-332 (2012).

Vayenas, C. G., Bebelis, S. & Ladas, S. Dependence of catalytic rates on catalyst work function. Nature 343, 625-627 (1990).

Tian, N., Zhou, Z. Y., Sun, S. G., Ding, Y. & Wang, Z. L. Synthesis of tetrahexahedral platinum nanocrystals with high-index facets and high electro-oxidation activity. Science 316, 732-735, (2007).

Chong, L. et al. Ultralow-loading platinum-cobalt fuel cell catalysts derived from imidazolate frameworks. Science 362, 1276-1281, (2018).

Luo, M. et al. PdMo bimetallene for oxygen reduction catalysis. Nature 574, 81-85, (2019).

Byungkwon Lim, M. J., Pedro H. C. Camargo, Eun Chul Cho, Jing Tao, Xianmao Lu, Yimei Zhu, Younan Xia. Pd-Pt Bimetallic Nanodendrites with High Activity for Oxygen Reduction. Science 324, 1302-1305 (2009).

Wang, M., Árnadóttir, L., Xu, Z. J. & Feng, Z. In Situ X-ray Absorption Spectroscopy Studies of Nanoscale Electrocatalysts. Nano-Micro Letters 11, 47, (2019).

Wang, Y., Sun, D., Wang, M., Feng, Z. & Hall, A. S. Oxygen Reduction Electrocatalysis on Ordered Intermetallic Pd- Bi Electrodes Is Enhanced by a Low Coverage of Spectator Species. The Journal of Physical Chemistry C 124, 5220-5224, (2020).

Liao, H. et al. A Multisite Strategy for Enhancing the Hydrogen Evolution Reaction on a Nano-Pd Surface in Alkaline Media. Advanced Energy Materials 7, 1701129, (2017).

Funke, H., Scheinost, A. C. & Chukalina, M. Wavelet analysis of extended x-ray absorption fine structure data. Physical Review B 71, 094110, (2005).

Funke, H., Chukalina, M. & Scheinost, A. C. A new FEFF-based wavelet for EXAFS data analysis. Journal of Synchrotron Radiation 14, 426-432, (2007).

Liu, Y. et al. A Highly Efficient Metal-Free Electrocatalyst of F-Doped Porous Carbon toward $N_2$ Electroreduction. Advanced Materials 32, e1907690, (2020).

Li, M. et al. Single-atom tailoring of platinum nanocatalysts for high-performance multifunctional electrocatalysis. Nature Catalysis 2, 495-503, (2019).

Zhao, X. et al. Enhanced activity of Pt nano-crystals supported on a novel TiO2@N-doped C nano-composite for methanol oxidation reaction. J. Mater. Chem. 22, 19718-19725 (2012).

Chen, X., Wu, G., Chen, J., Xie, Z. & Wang, X. Synthesis of "clean" and well-dispersive Pd nanoparticles with excellent electrocatalytic property on graphene oxide. J. Am. Chem. Soc. 133, 3693-3695, (2011).

Tian, X. et al. Engineering bunched Pt-Ni alloy nanocages for efficient oxygen reduction in practical fuel cells. Science 366, 850-856, (2019).

Chang, J., Feng, L., Liu, C., Xing, W. & Hu, X. $Ni_2P$ enhances the activity and durability of the Pt anode catalyst in direct methanol fuel cells. Energy Environ. Sci. 7, 1628, (2014).

von Weber, A. et al. Size-dependent electronic structure controls activity for ethanol electro-oxidation at Ptn/indium tin oxide (n=1 to 14). Physical Chemistry Chemical Physics 17, 17601-17610, (2015).

Li, Z. et al. Iridium single-atom catalyst on nitrogen-doped carbon for formic acid oxidation synthesized using a general host-guest strategy. Nature Chemistry, (2020).

Chung, H. T. et al. Direct atomic-level insight into the active sites of a high-performance PGM-free ORR catalyst. Science 357, 479-484, (2017).

DOE, U. S. Technical Targets: Electrocatalysts for Transportation Applications. https://www.energy.gov/eere/fuel-cells/doe-technical-targets-polymer-electrolyte-membrane-fuel-cell-components (2020).

Tian, H. et al. Stable, high-performance, dendrite-free, seawater-based aqueous batteries. Nature Communications 12, 237, (2021).

Greeley, J. et al. Alloys of platinum and early transition metals as oxygen reduction electrocatalysts. Nature Chemistry 1, 552-556 (2009).

All referenced publications are incorporated herein by reference in their entirety, to the same extent as if each were incorporated by reference individually. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A fluorinated electrocatalyst comprising:

at least one carbon atom, wherein the at least one carbon atom is chemically bonded to at least one nonmetallic chemical element, thereby forming a nonmetal-carbon ("X-C") structure;

at least one fluorine atom, wherein the at least one fluorine atom is chemically bonded to the X-C structure forming a fluorine-doped nonmetal-carbon ("X&F-C") structure;

at least one metallic chemical element, wherein the at least one metallic chemical element is immobilized on the X&F-C structure, thereby forming a fluorine-doped metal-nonmetal-carbon ("M/X&F-C") structure; and at least one metal-nonmetal ("M-X") moiety, wherein the at least one M-X moiety is disposed on the surface of the M/X&F-C structure wherein the at least one nonmetallic chemical element is selected from the group consisting of nitrogen, phosphorus, sulfur and boron.

2. The fluorinated electrocatalyst of claim 1, wherein the at least one metallic chemical element is selected from the group consisting of palladium, platinum, nickel, and manganese.

3. The fluorinated electrocatalyst of claim 1, wherein the M/X&F-C structure comprises metal-oxide bonds.

4. The fluorinated electrocatalyst of claim 1, wherein the M/X&F-C structure is non-corrosive.

5. The fluorinated electrocatalyst of claim 1, wherein the M/X&F-C structure comprises negative shifts of 0.14 V and 0.17 V of an onset potential at 0.1 A mg$^{-1}$.

6. A method of synthesizing a fluorinated electrocatalyst of claim 1, the method comprising:

pretreating a carbon catalyst support comprised of at least one carbon atom;

chemically bonding at least one nonmetallic chemical element to the at least one carbon atom to form a nonmetal-carbon ("X-C") structure;

chemically bonding at least one fluorine atom into the X-C structure to form a fluorine-doped nonmetal-carbon ("X&F-C") structure; and immobilizing at least one metallic chemical element on the X&F-C structure to form the fluorinated electrocatalyst which is a fluorine-doped metal-nonmetal-carbon ("M/X&F-C") structure.

7. The method of claim 6, wherein sonification is used to pretreat the at least one carbon atom.

8. The method of claim 6, further comprising the step of, after pretreating the carbon catalyst support comprised of at least one carbon atom, refluxing the carbon catalyst support comprised of the at least one carbon atom.

9. The method of claim 8, wherein heat treatment is used to reflux the at least one carbon atom.

10. The method of claim 6, wherein heat treatment is used to chemically bond the at least one nonmetallic chemical element to the at least one carbon atom.

11. The method of claim 6, wherein heat treatment is used to chemically bond the at least one fluorine atom into the X-C structure.

12. The method of claim 6, wherein microwave energy and a reductant is used to synthesize the X&F-C structure with a X loading of 1 wt. %.

* * * * *